(12) United States Patent
Wang et al.

(10) Patent No.: US 8,720,781 B2
(45) Date of Patent: May 13, 2014

(54) IMAGE READER HAVING IMAGE SENSOR ARRAY

(75) Inventors: Ynjiun Wang, Cupertino, CA (US); William H. Havens, Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/437,439

(22) Filed: Apr. 2, 2012

(65) Prior Publication Data

US 2012/0187190 A1 Jul. 26, 2012

Related U.S. Application Data

(60) Continuation of application No. 12/610,892, filed on Nov. 2, 2009, now Pat. No. 8,146,820, which is a division of application No. 11/077,976, filed on Mar. 11, 2005, now Pat. No. 7,611,060.

(51) Int. Cl.
*G03B 7/08* (2006.01)

(52) U.S. Cl.
USPC ............ 235/462.23; 235/462.11; 235/462.24; 235/462.32; 235/462.41

(58) Field of Classification Search
USPC .............. 235/462.45, 462.1, 462.11, 462.24, 235/462.41, 462.07
See application file for complete search history.

(56) References Cited

U.S. PATENT DOCUMENTS

| | | |
|---|---|---|
| 3,684,868 A | 8/1972 | Christie et al. |
| 3,716,699 A | 2/1973 | Eckert et al. |
| 3,971,065 A | 7/1976 | Bayer |
| 4,047,203 A | 9/1977 | Dillon |
| 4,121,244 A | 10/1978 | Nakabe et al. |
| 4,253,447 A | 3/1981 | Moore et al. |
| 4,261,344 A | 4/1981 | Moore et al. |
| 4,350,418 A | 9/1982 | Taguchi et al. |
| RE31,289 E | 6/1983 | Moore et al. |
| RE31,290 E | 6/1983 | Moore et al. |
| 4,390,895 A | 6/1983 | Sato et al. |
| 4,437,112 A | 3/1984 | Tanaka et al. |
| 4,491,865 A | 1/1985 | Danna et al. |
| 4,516,017 A | 5/1985 | Hara et al. |
| 4,523,224 A | 6/1985 | Longacre, Jr. |
| 4,546,379 A | 10/1985 | Sarofeen et al. |
| 4,605,956 A | 8/1986 | Cok |
| 4,630,307 A | 12/1986 | Cok |
| 4,760,411 A | 7/1988 | Ohmura et al. |
| 4,793,689 A | 12/1988 | Aoyagi et al. |

(Continued)

FOREIGN PATENT DOCUMENTS

| | | |
|---|---|---|
| CN | 1504824 A | 6/2004 |
| CN | 1511412 A | 7/2004 |

(Continued)

OTHER PUBLICATIONS

Feb. 25, 2008 Office Action in U.S. Appl. No. 11/077,975.

(Continued)

*Primary Examiner* — Kristy A Haupt
(74) *Attorney, Agent, or Firm* — Alston & Bird LLP

(57) ABSTRACT

An image reader can include an image sensor array. An image reader in one embodiment can include an optical system capable of directing light reflected from a target onto the image sensor array. An image reader can be used for reading a dataform.

14 Claims, 30 Drawing Sheets

(56) References Cited

U.S. PATENT DOCUMENTS

| | | |
|---|---|---|
| 4,806,776 A | 2/1989 | Kley |
| 4,807,981 A | 2/1989 | Takizawa et al. |
| 4,823,186 A | 4/1989 | Muramatsu |
| 4,853,774 A | 8/1989 | Danna et al. |
| 4,854,302 A | 8/1989 | Allred, III |
| 4,858,020 A | 8/1989 | Homma |
| 4,862,253 A | 8/1989 | English et al. |
| 4,877,949 A | 10/1989 | Danielson et al. |
| 4,941,456 A | 7/1990 | Wood et al. |
| 4,957,346 A | 9/1990 | Wood et al. |
| 4,962,419 A | 10/1990 | Hibbard et al. |
| 4,963,756 A | 10/1990 | Quan et al. |
| 5,018,006 A | 5/1991 | Hashimoto |
| 5,019,699 A | 5/1991 | Koenck |
| 5,059,146 A | 10/1991 | Thomas et al. |
| 5,144,190 A | 9/1992 | Thomas et al. |
| 5,222,477 A | 6/1993 | Lia |
| 5,227,614 A | 7/1993 | Danielson et al. |
| 5,278,642 A | 1/1994 | Danna et al. |
| 5,291,008 A | 3/1994 | Havens et al. |
| 5,305,122 A | 4/1994 | Hayashi et al. |
| 5,308,962 A | 5/1994 | Havens et al. |
| 5,323,233 A | 6/1994 | Yamagami et al. |
| 5,337,361 A | 8/1994 | Wang et al. |
| 5,374,956 A | 12/1994 | D'Luna |
| 5,378,883 A * | 1/1995 | Batterman et al. ....... 235/462.21 |
| 5,393,965 A | 2/1995 | Bravman et al. |
| 5,399,846 A | 3/1995 | Pavlidis et al. |
| 5,401,944 A | 3/1995 | Bravman et al. |
| 5,406,032 A | 4/1995 | Clayton et al. |
| 5,406,062 A | 4/1995 | Hasegawa et al. |
| 5,410,141 A | 4/1995 | Koenck et al. |
| 5,471,533 A | 11/1995 | Wang et al. |
| 5,504,322 A | 4/1996 | Pavlidis et al. |
| 5,506,619 A | 4/1996 | Adams, Jr. et al. |
| 5,513,264 A | 4/1996 | Wang et al. |
| 5,521,366 A | 5/1996 | Wang et al. |
| 5,527,262 A | 6/1996 | Monroe et al. |
| 5,541,777 A | 7/1996 | Sakamoto et al. |
| 5,572,006 A | 11/1996 | Wang et al. |
| 5,576,529 A | 11/1996 | Koenck et al. |
| 5,591,955 A | 1/1997 | Laser |
| 5,602,377 A | 2/1997 | Beller et al. |
| 5,602,379 A | 2/1997 | Uchimura et al. |
| 5,629,734 A | 5/1997 | Hamilton, Jr. et al. |
| 5,637,849 A | 6/1997 | Wang et al. |
| 5,646,390 A | 7/1997 | Wang et al. |
| 5,652,621 A | 7/1997 | Adams, Jr. et al. |
| 5,654,533 A | 8/1997 | Suzuki et al. |
| 5,659,167 A | 8/1997 | Wang et al. |
| 5,662,586 A | 9/1997 | Monroe et al. |
| 5,691,773 A | 11/1997 | Wang et al. |
| 5,702,058 A | 12/1997 | Dobbs et al. |
| 5,702,059 A | 12/1997 | Chu et al. |
| 5,703,349 A | 12/1997 | Meyerson et al. |
| 5,714,745 A | 2/1998 | Ju et al. |
| 5,717,195 A | 2/1998 | Feng et al. |
| 5,739,518 A | 4/1998 | Wang |
| 5,756,981 A | 5/1998 | Roustaei et al. |
| 5,763,864 A | 6/1998 | O'Hagan et al. |
| 5,763,866 A | 6/1998 | Seo et al. |
| 5,770,847 A | 6/1998 | Olmstead |
| 5,773,810 A | 6/1998 | Hussey et al. |
| 5,773,814 A | 6/1998 | Phillips |
| 5,777,314 A | 7/1998 | Roustaei |
| 5,783,811 A | 7/1998 | Feng et al. |
| 5,784,102 A | 7/1998 | Hussey et al. |
| 5,786,582 A | 7/1998 | Roustaei et al. |
| 5,786,586 A | 7/1998 | Pidhirny et al. |
| 5,793,033 A | 8/1998 | Feng et al. |
| 5,811,774 A | 9/1998 | Ju et al. |
| 5,811,784 A | 9/1998 | Tausch et al. |
| 5,811,828 A | 9/1998 | Laser |
| 5,814,801 A | 9/1998 | Wang et al. |
| 5,815,200 A | 9/1998 | Ju et al. |
| 5,818,023 A | 10/1998 | Meyerson et al. |
| 5,818,028 A | 10/1998 | Meyerson et al. |
| 5,821,518 A | 10/1998 | Sussmeier et al. |
| 5,831,254 A | 11/1998 | Karpen et al. |
| 5,834,754 A | 11/1998 | Feng et al. |
| 5,837,987 A | 11/1998 | Koenck et al. |
| 5,841,121 A | 11/1998 | Koenck |
| 5,861,960 A | 1/1999 | Suzuki et al. |
| 5,877,487 A | 3/1999 | Tani et al. |
| 5,883,375 A | 3/1999 | Knowles et al. |
| 5,914,476 A | 6/1999 | Gerst, III et al. |
| 5,917,913 A | 6/1999 | Wang |
| 5,936,218 A | 8/1999 | Ohkawa et al. |
| 5,940,163 A | 8/1999 | Byrum |
| 5,949,052 A | 9/1999 | Longacre, Jr. et al. |
| 5,949,056 A | 9/1999 | White |
| 5,979,753 A | 11/1999 | Roslak |
| 5,979,757 A | 11/1999 | Tracy et al. |
| 5,979,763 A | 11/1999 | Wang et al. |
| 5,986,297 A | 11/1999 | Guidash et al. |
| 5,988,506 A | 11/1999 | Schaham et al. |
| 5,992,744 A | 11/1999 | Smith et al. |
| 6,003,008 A | 12/1999 | Postrel et al. |
| 6,006,990 A | 12/1999 | Ye et al. |
| 6,010,070 A | 1/2000 | Mizuochi et al. |
| 6,010,073 A | 1/2000 | Bianchi |
| 6,019,286 A | 2/2000 | Li et al. |
| 6,042,012 A | 3/2000 | Olmstead et al. |
| 6,045,047 A | 4/2000 | Pidhirny et al. |
| 6,045,238 A | 4/2000 | Wheeler et al. |
| 6,049,813 A | 4/2000 | Danielson et al. |
| 6,053,407 A | 4/2000 | Wang et al. |
| 6,053,408 A | 4/2000 | Stoner |
| 6,060,722 A | 5/2000 | Havens et al. |
| 6,062,455 A | 5/2000 | Giannuzzi et al. |
| 6,062,475 A | 5/2000 | Feng |
| 6,062,477 A | 5/2000 | Wike, Jr. et al. |
| 6,073,851 A | 6/2000 | Olmstead et al. |
| 6,075,240 A | 6/2000 | Watanabe et al. |
| 6,084,528 A | 7/2000 | Beach et al. |
| 6,097,835 A | 8/2000 | Lindgren |
| 6,102,295 A | 8/2000 | Ogami |
| 6,105,869 A | 8/2000 | Scharf et al. |
| 6,118,552 A | 9/2000 | Suzuki et al. |
| 6,123,261 A | 9/2000 | Roustaei |
| 6,123,263 A | 9/2000 | Feng |
| 6,142,934 A | 11/2000 | Lagerway et al. |
| 6,152,368 A | 11/2000 | Olmstead et al. |
| 6,155,488 A | 12/2000 | Olmstead et al. |
| 6,155,491 A | 12/2000 | Dueker et al. |
| 6,157,027 A | 12/2000 | Watanabe et al. |
| 6,179,208 B1 | 1/2001 | Feng |
| 6,184,534 B1 | 2/2001 | Stephany et al. |
| 6,186,404 B1 | 2/2001 | Ehrhart et al. |
| 6,223,988 B1 | 5/2001 | Batterman et al. |
| 6,230,975 B1 | 5/2001 | Colley et al. |
| 6,234,394 B1 | 5/2001 | Kahn et al. |
| 6,247,645 B1 | 6/2001 | Harris et al. |
| 6,254,003 B1 | 7/2001 | Pettinelli et al. |
| 6,262,804 B1 | 7/2001 | Friend et al. |
| 6,276,605 B1 | 8/2001 | Olmstead et al. |
| 6,289,176 B1 | 9/2001 | Mutter et al. |
| 6,298,176 B2 | 10/2001 | Longacre, Jr. et al. |
| 6,304,660 B1 | 10/2001 | Ehrhart et al. |
| 6,311,895 B1 | 11/2001 | Olmstead et al. |
| 6,311,896 B1 | 11/2001 | Mulla et al. |
| 6,313,917 B1 | 11/2001 | Tang et al. |
| 6,315,203 B1 | 11/2001 | Ikeda et al. |
| 6,315,204 B1 | 11/2001 | Knighton et al. |
| 6,318,635 B1 | 11/2001 | Stoner |
| 6,340,114 B1 | 1/2002 | Correa et al. |
| 6,347,163 B2 | 2/2002 | Roustaei |
| 6,375,075 B1 | 4/2002 | Ackley et al. |
| 6,386,452 B1 | 5/2002 | Kawamura |
| 6,405,929 B1 | 6/2002 | Ehrhart et al. |
| 6,419,157 B1 | 7/2002 | Ehrhart et al. |
| 6,452,153 B1 | 9/2002 | Lauxtermann et al. |
| 6,460,766 B1 | 10/2002 | Olschafskie et al. |
| 6,474,865 B2 | 11/2002 | Nakajo |

(56) References Cited

U.S. PATENT DOCUMENTS

| | | |
|---|---|---|
| 6,476,865 B1 | 11/2002 | Gindele et al. |
| 6,491,223 B1 | 12/2002 | Longacre, Jr. et al. |
| 6,522,323 B1 | 2/2003 | Sasaki et al. |
| 6,522,441 B1 | 2/2003 | Rudeen |
| 6,533,168 B1 | 3/2003 | Ching |
| 6,552,323 B2 | 4/2003 | Guidash et al. |
| 6,561,428 B2 | 5/2003 | Meier et al. |
| 6,575,367 B1 | 6/2003 | Longacre, Jr. |
| 6,575,368 B1 | 6/2003 | Tamburrini et al. |
| 6,598,797 B2 | 7/2003 | Lee |
| 6,621,598 B1 | 9/2003 | Oda |
| 6,637,658 B2 | 10/2003 | Barber et al. |
| 6,646,246 B1 | 11/2003 | Gindele et al. |
| 6,654,062 B1 | 11/2003 | Numata et al. |
| 6,655,597 B1 | 12/2003 | Swartz et al. |
| 6,676,016 B1 | 1/2004 | Coskrey, IV |
| 6,681,994 B1 | 1/2004 | Koenck |
| 6,694,064 B1 | 2/2004 | Benkelman |
| 6,695,209 B1 | 2/2004 | La |
| 6,714,239 B2 | 3/2004 | Guidash |
| 6,722,569 B2 | 4/2004 | Ehrhart et al. |
| 6,752,319 B2 | 6/2004 | Ehrhart et al. |
| 6,811,088 B2 | 11/2004 | Lanzaro et al. |
| 6,813,046 B1 | 11/2004 | Gindele et al. |
| 6,814,290 B2 | 11/2004 | Longacre |
| 6,821,810 B1 | 11/2004 | Hsiao et al. |
| 6,824,059 B2 | 11/2004 | Jam et al. |
| 6,832,725 B2 | 12/2004 | Gardiner et al. |
| 6,834,807 B2 | 12/2004 | Ehrhart et al. |
| 6,877,664 B1 | 4/2005 | Oliva |
| 6,879,340 B1 | 4/2005 | Chevallier |
| 6,880,759 B2 | 4/2005 | Wilde et al. |
| 6,889,904 B2 | 5/2005 | Bianculli et al. |
| 6,910,633 B2 | 6/2005 | Swartz et al. |
| 6,917,381 B2 | 7/2005 | Acharya et al. |
| 6,937,774 B1 | 8/2005 | Specht et al. |
| 6,956,544 B2 | 10/2005 | Valliath et al. |
| 6,959,865 B2 | 11/2005 | Walczyk et al. |
| 6,976,626 B2 | 12/2005 | Schmidt et al. |
| 6,976,631 B2 | 12/2005 | Kashi et al. |
| 7,009,638 B2 | 3/2006 | Gruber et al. |
| 7,044,378 B2 | 5/2006 | Patel et al. |
| 7,055,747 B2 | 6/2006 | Havens et al. |
| 7,057,654 B2 | 6/2006 | Roddy et al. |
| 7,073,715 B2 | 7/2006 | Patel et al. |
| 7,083,098 B2 | 8/2006 | Joseph et al. |
| 7,086,595 B2 | 8/2006 | Zhu et al. |
| 7,086,596 B2 | 8/2006 | Meier et al. |
| 7,090,132 B2 | 8/2006 | Havens et al. |
| 7,111,787 B2 | 9/2006 | Ehrhart |
| 7,121,470 B2 | 10/2006 | McCall et al. |
| 7,128,266 B2 | 10/2006 | Zhu et al. |
| 7,130,047 B2 | 10/2006 | Chinnock |
| 7,148,923 B2 | 12/2006 | Harper et al. |
| 7,159,783 B2 | 1/2007 | Walczyk et al. |
| 7,187,442 B2 | 3/2007 | Chinnock |
| 7,219,841 B2 | 5/2007 | Biss et al. |
| 7,219,843 B2 | 5/2007 | Havens et al. |
| 7,222,789 B2 | 5/2007 | Longacre, Jr. et al. |
| 7,234,641 B2 | 6/2007 | Olmstead |
| 7,268,924 B2 | 9/2007 | Hussey et al. |
| 7,270,273 B2 | 9/2007 | Barber et al. |
| 7,270,274 B2 | 9/2007 | Hennick et al. |
| 7,276,025 B2 | 10/2007 | Roberts et al. |
| 7,277,562 B2 | 10/2007 | Zyzdryn |
| 7,287,696 B2 | 10/2007 | Attia et al. |
| 7,293,712 B2 | 11/2007 | Wang |
| 7,303,126 B2 | 12/2007 | Patel et al. |
| 7,327,504 B2 | 2/2008 | Gallagher |
| 7,343,865 B2 | 3/2008 | Shuert |
| 7,446,753 B2 | 11/2008 | Fitch et al. |
| 7,568,628 B2 | 8/2009 | Wang et al. |
| 7,611,060 B2 | 11/2009 | Wang et al. |
| 7,636,486 B2 | 12/2009 | Steinberg et al. |
| 7,637,430 B2 | 12/2009 | Hawley et al. |
| 7,639,888 B2 | 12/2009 | Steinberg et al. |
| 7,639,889 B2 | 12/2009 | Steinberg et al. |
| 7,660,478 B2 | 2/2010 | Steinberg et al. |
| 7,690,572 B2 | 4/2010 | Meier et al. |
| 7,717,342 B2 | 5/2010 | Wang |
| 7,740,176 B2 | 6/2010 | Wang et al. |
| 7,770,799 B2 | 8/2010 | Wang |
| 7,773,118 B2 | 8/2010 | Florea et al. |
| 7,780,089 B2 | 8/2010 | Wang |
| 7,784,696 B2 | 8/2010 | Wang |
| 7,874,483 B2 | 1/2011 | Wang et al. |
| 7,909,257 B2 | 3/2011 | Wang et al. |
| 7,984,855 B2 | 7/2011 | Wang |
| 8,002,188 B2 | 8/2011 | Wang et al. |
| 8,016,196 B2 | 9/2011 | Meier et al. |
| 8,025,232 B2 | 9/2011 | Wang |
| 8,146,820 B2 * | 4/2012 | Wang et al. ............ 235/462.23 |
| 8,169,486 B2 | 5/2012 | Corcoran et al. |
| 8,196,839 B2 | 6/2012 | Wang |
| 8,218,027 B2 | 7/2012 | Wang |
| 2001/0003071 A1 | 6/2001 | Mansutti et al. |
| 2001/0003346 A1 | 6/2001 | Feng |
| 2001/0013549 A1 | 8/2001 | Harris et al. |
| 2001/0027999 A1 | 10/2001 | Lee |
| 2002/0125317 A1 | 9/2002 | Hussey et al. |
| 2002/0130957 A1 | 9/2002 | Gallagher et al. |
| 2002/0171745 A1 | 11/2002 | Ehrhart |
| 2002/0179713 A1 | 12/2002 | Pettinelli et al. |
| 2003/0004827 A1 | 1/2003 | Wang |
| 2003/0018897 A1 | 1/2003 | Bellis et al. |
| 2003/0019934 A1 | 1/2003 | Hunter et al. |
| 2003/0022144 A1 | 1/2003 | Cliff |
| 2003/0022147 A1 | 1/2003 | Segall et al. |
| 2003/0029917 A1 | 2/2003 | Hennick et al. |
| 2003/0034394 A1 | 2/2003 | Gannon et al. |
| 2003/0062413 A1 | 4/2003 | Gardiner et al. |
| 2003/0086008 A1 | 5/2003 | Nagano |
| 2003/0089775 A1 | 5/2003 | Yeakley et al. |
| 2003/0095299 A1 | 5/2003 | Oda et al. |
| 2003/0102376 A1 | 6/2003 | Meier et al. |
| 2003/0127519 A1 | 7/2003 | Ehrhart et al. |
| 2003/0132292 A1 | 7/2003 | Gomez et al. |
| 2003/0168512 A1 | 9/2003 | Longacre, Jr. et al. |
| 2003/0178492 A1 | 9/2003 | Tamburrini et al. |
| 2003/0197063 A1 | 10/2003 | Longacre, Jr. |
| 2003/0201328 A1 | 10/2003 | Jam et al. |
| 2003/0206150 A1 | 11/2003 | Hussey et al. |
| 2003/0210332 A1 | 11/2003 | Frame |
| 2003/0222144 A1 | 12/2003 | Meier et al. |
| 2003/0222147 A1 | 12/2003 | Havens et al. |
| 2003/0226895 A1 | 12/2003 | Havens et al. |
| 2004/0004128 A1 | 1/2004 | Pettinelli et al. |
| 2004/0020990 A1 | 2/2004 | Havens et al. |
| 2004/0031851 A1 | 2/2004 | Bianculli et al. |
| 2004/0035933 A1 | 2/2004 | Havens et al. |
| 2004/0046881 A1 | 3/2004 | Utagawa |
| 2004/0109081 A1 | 6/2004 | Sumi |
| 2004/0118921 A1 | 6/2004 | Breytman et al. |
| 2004/0129783 A1 | 7/2004 | Patel |
| 2004/0155110 A1 | 8/2004 | Ehrhart et al. |
| 2004/0164165 A1 | 8/2004 | Havens et al. |
| 2004/0174576 A1 | 9/2004 | Kamisuwa et al. |
| 2004/0190092 A1 | 9/2004 | Silverbrook et al. |
| 2004/0206825 A1 | 10/2004 | Schmidt et al. |
| 2005/0001035 A1 | 1/2005 | Hawley et al. |
| 2005/0041296 A1 | 2/2005 | Hsiao et al. |
| 2005/0072847 A1 | 4/2005 | Barkan et al. |
| 2005/0103854 A1 | 5/2005 | Zhu et al. |
| 2005/0103864 A1 | 5/2005 | Zhu et al. |
| 2005/0134936 A1 | 6/2005 | Haug et al. |
| 2005/0145698 A1 | 7/2005 | Havens et al. |
| 2005/0161511 A1 | 7/2005 | Parker et al. |
| 2005/0167507 A1 | 8/2005 | Swartz et al. |
| 2005/0279836 A1 | 12/2005 | Havens et al. |
| 2005/0281474 A1 | 12/2005 | Huang |
| 2006/0011724 A1 | 1/2006 | Joseph et al. |
| 2006/0016335 A1 | 1/2006 | Cox et al. |
| 2006/0043194 A1 | 3/2006 | Barkan et al. |
| 2006/0071081 A1 | 4/2006 | Wang |

(56) References Cited

U.S. PATENT DOCUMENTS

| | | |
|---|---|---|
| 2006/0098954 A1 | 5/2006 | Takagi |
| 2006/0113386 A1 | 6/2006 | Olmstead |
| 2006/0119738 A1 | 6/2006 | Kido |
| 2006/0163355 A1 | 7/2006 | Olmstead et al. |
| 2006/0180670 A1 | 8/2006 | Acosta et al. |
| 2006/0202036 A1 | 9/2006 | Wang et al. |
| 2006/0202038 A1 | 9/2006 | Wang et al. |
| 2006/0249581 A1 | 11/2006 | Smith |
| 2006/0255144 A1 | 11/2006 | Meier et al. |
| 2006/0274171 A1 | 12/2006 | Wang |
| 2006/0283952 A1 | 12/2006 | Wang |
| 2007/0002153 A1 | 1/2007 | Dierickx |
| 2007/0045424 A1 | 3/2007 | Wang |
| 2007/0108284 A1 | 5/2007 | Pankow et al. |
| 2007/0135866 A1 | 6/2007 | Baker et al. |
| 2007/0158428 A1 | 7/2007 | Havens et al. |
| 2007/0158535 A1 | 7/2007 | Watkins |
| 2007/0164111 A1 | 7/2007 | Wang et al. |
| 2007/0181692 A1 | 8/2007 | Barkan et al. |
| 2007/0205272 A1 | 9/2007 | Daddabbo et al. |
| 2007/0219417 A1 | 9/2007 | Roberts et al. |
| 2007/0242297 A1 | 10/2007 | Eki |
| 2007/0267501 A1 | 11/2007 | Jovanovski et al. |
| 2007/0284448 A1 | 12/2007 | Wang |
| 2007/0285698 A1 | 12/2007 | Wang et al. |
| 2008/0219581 A1 | 9/2008 | Albu et al. |
| 2008/0223933 A1 | 9/2008 | Smith |
| 2008/0239352 A1 | 10/2008 | Jun |
| 2008/0267495 A1 | 10/2008 | Shimura |
| 2008/0291499 A1 | 11/2008 | Chang |
| 2008/0296393 A1 | 12/2008 | Jovanovski et al. |
| 2008/0309769 A1 | 12/2008 | Albu et al. |
| 2008/0309770 A1 | 12/2008 | Florea et al. |
| 2009/0026267 A1 | 1/2009 | Wang et al. |
| 2009/0032597 A1 | 2/2009 | Barber et al. |
| 2009/0046185 A1 | 2/2009 | Ota |
| 2009/0072038 A1 | 3/2009 | Li et al. |
| 2009/0073516 A1 | 3/2009 | Tanaka |
| 2009/0086294 A1 | 4/2009 | Sakakibara |
| 2009/0121021 A1 | 5/2009 | Wang et al. |
| 2009/0179999 A1 | 7/2009 | Albu et al. |
| 2009/0212911 A1 | 8/2009 | Min et al. |
| 2009/0213811 A1 | 8/2009 | Wang et al. |
| 2010/0044440 A1 | 2/2010 | Wang et al. |
| 2010/0090007 A1 | 4/2010 | Wang et al. |
| 2010/0140356 A1 | 6/2010 | Hawley et al. |
| 2010/0141812 A1 | 6/2010 | Hirota |
| 2010/0219250 A1 | 9/2010 | Wang |
| 2010/0226345 A1 | 9/2010 | Qu et al. |
| 2010/0258633 A1 | 10/2010 | Wang |
| 2010/0259638 A1 | 10/2010 | Wang |
| 2010/0289915 A1 | 11/2010 | Wang |
| 2010/0309340 A1 | 12/2010 | Border et al. |
| 2010/0315536 A1 | 12/2010 | Wang |
| 2010/0316291 A1 | 12/2010 | Deng et al. |
| 2011/0049245 A1 | 3/2011 | Wang |
| 2011/0057039 A1 | 3/2011 | Wang |
| 2011/0073654 A1 | 3/2011 | Wang et al. |
| 2011/0080500 A1 | 4/2011 | Wang et al. |
| 2011/0102638 A1 | 5/2011 | Susanu et al. |
| 2011/0163166 A1 | 7/2011 | Wang et al. |
| 2011/0168779 A1 | 7/2011 | Wang et al. |
| 2011/0303750 A1 | 12/2011 | Wang |
| 2012/0002066 A1 | 1/2012 | Wang |
| 2012/0187190 A1 | 7/2012 | Wang et al. |
| 2012/0248196 A1 | 10/2012 | Wang |
| 2012/0293699 A1 | 11/2012 | Blanquart et al. |
| 2013/0010138 A1 | 1/2013 | Bigioi et al. |
| 2013/0021507 A1 | 1/2013 | Wang et al. |
| 2013/0112753 A1 | 5/2013 | Wang |
| 2013/0113967 A1 | 5/2013 | Wang |

FOREIGN PATENT DOCUMENTS

| | | |
|---|---|---|
| CN | 1564996 | 1/2005 |
| CN | 1564996 A | 1/2005 |
| CN | 100334499 C | 8/2007 |
| CN | 101031930 A | 9/2007 |
| CN | 101069190 A | 11/2007 |
| CN | 101147157 A | 3/2008 |
| CN | 201117008 Y | 9/2008 |
| CN | 101171587 B | 4/2011 |
| CN | 101171597 B | 9/2011 |
| DE | 19581524 T1 | 6/1997 |
| EP | 0 119 862 A2 | 9/1984 |
| EP | 0 472 299 A1 | 2/1992 |
| EP | 498366 A2 | 8/1992 |
| EP | 690403 A2 | 1/1996 |
| EP | 0858212 A1 | 8/1998 |
| EP | 917087 A1 | 5/1999 |
| EP | 1436768 A1 | 7/2004 |
| EP | 1784761 A1 | 5/2007 |
| EP | 1828957 A2 | 9/2007 |
| EP | 1856651 A2 | 11/2007 |
| EP | 2 364 026 A2 | 9/2011 |
| GB | 2105143 A | 3/1983 |
| GB | 2301691 A | 12/1996 |
| JP | 63-185285 A | 7/1988 |
| JP | H-06-231466 A | 8/1994 |
| JP | 9512372 | 12/1997 |
| JP | 10106919 A | 4/1998 |
| JP | 2000050028 A | 2/2000 |
| JP | 2000-165755 A | 6/2000 |
| JP | 2000293622 A | 10/2000 |
| JP | 2002368201 A | 12/2002 |
| JP | 200317677 A | 1/2003 |
| JP | 2003132301 A | 5/2003 |
| JP | 2004533031 A | 10/2004 |
| JP | 2005505061 | 2/2005 |
| JP | 2005-050506 A | 9/2006 |
| JP | 2008511917 A | 4/2008 |
| JP | 2008-533590 A | 8/2008 |
| SE | 103286 C1 | 4/2003 |
| WO | WO-86/01678 A2 | 3/1986 |
| WO | WO-86/01965 A2 | 3/1986 |
| WO | WO9620454 A1 | 7/1996 |
| WO | WO0016241 A1 | 3/2000 |
| WO | WO0146899 A2 | 6/2001 |
| WO | WO02063543 A2 | 8/2002 |
| WO | WO03001435 A1 | 1/2003 |
| WO | WO03030082 | 4/2003 |
| WO | WO-03/087713 AI | 10/2003 |
| WO | WO03081520 A1 | 10/2003 |
| WO | WO03081521 A1 | 10/2003 |
| WO | WO2004064382 A1 | 7/2004 |
| WO | WO2006026141 A1 | 3/2006 |
| WO | WO-2006/057863 A2 | 6/2006 |
| WO | WO2006065450 A2 | 6/2006 |
| WO | WO2006081466 A2 | 8/2006 |
| WO | WO-2006/098954 A2 | 9/2006 |
| WO | WO-2006/098955 A2 | 9/2006 |
| WO | WO-2008/131438 A2 | 10/2008 |

OTHER PUBLICATIONS

Dec. 10, 2008 Office Action in U.S. Appl. No. 11/077,975.
Apr. 10, 2009 Notice of Allowance in U.S. Appl. No. 11/077,975.
Jun. 15, 2011 Office Action in U.S. Appl. No. 13/052,768.
Feb. 6, 2012 Notice of Allowance in U.S. Appl. No. 13/052,768.
Aug. 6, 2012 Notice of Allowance in U.S. Appl. No. 12/534,664.
Apr. 2, 2008 Restriction Requirement in U.S. Appl. No. 11/077,976.
Aug. 6, 2008 Office Action in U.S. Appl. No. 11/077,976.
Dec. 10, 2008 Office Action in U.S. Appl. No. 11/077,976.
May 29, 2009 Notice of Allowance in U.S. Appl. No. 11/077,976.
Jun. 15, 2011 Notice of Allowance in U.S. Appl. No. 12/610,892.
Nov. 10, 2011 Notice of Allowance in U.S. Appl. No. 12/610,892.
Aug. 12, 2008 Office Action in U.S. Appl. No. 12/190,145.
Oct. 22, 2009 Office Action in U.S. Appl. No. 12/190,145.
Feb. 2, 2012 Advisory Action in U.S. Appl. No. 12/190,145.
Dec. 19, 2007 Office Action in U.S. Appl. No. 11/495,417.

(56) References Cited

OTHER PUBLICATIONS

Apr. 15, 2008 Office Action in U.S. Appl. No. 11/495,417.
U.S. Appl. No. 11/077,976, filed Mar. 11, 2005.
U.S. Appl. No. 60/632,696, filed Dec. 1, 2004.
U.S. Appl. No. 10/958,779, filed Oct. 4, 2004.
U.S. Appl. No. 12/610,892, filed Nov. 2, 2009.
Claim set of U.S. Appl. No. 12/132,462, filed Jun. 3, 2008.
Claim set of U.S. Appl. No. 12/132,480, filed Jun. 3, 2008.
Jul. 7, 2006 International Search Report in International Application No. PCT/US2006/008114.
Jul. 7, 2006 Written Opinion in International Application No. PCT/US2006/008114.
Oct. 26, 2006 International Search Report in International Application No. PCT/US2006/008113.
Oct. 26, 2006 Written Opinion in International Application No. PCT/US2006/008113.
Jan. 23, 2009 Office Action in Chinese Application No. 2006800160235.
Jan. 24, 2012 Office Action in Japanese Application No. 2008-500844.
Jan. 19, 2011 Communication Pursuant to Article 94(3) EPC in European Application No. 06737300.1.
Micron Technology, Inc., MT9M111 SOC Megapixel Digital Image Sensor, Products and Specification Preliminary Manual, pp. 1-61, 2004.
Micron Technology, Inc., MTOM413 1.3 Megapixel CMOS Active Pixel Digital Image Sensor, Specification Manual, Version 3.0, pp. 1-30, Jan. 2004.
Stmicroelectronics, STMicroelectronics Introduces Low-Cost High-Quality Mega Pixel CMOS Sensor for Digital Still Cameras and Camcorders, Introduction article on website http://www.st.com/stonline/press/news/year2002/p1239p.htm, p. 1, Oct. 9, 2002.
www.fillfactory.com, Dual Slope Dynamic Range Expansion, website, Feb. 28, 2005, pp. 1-3.
www.micron.com, Introducing A CMOS Image Sensor Specifically Designed for AutomotiveScene-Understanding Systems, Website, Oct. 2, 2004, pp. 1-2.
www.photofocus.com, Linog. TM. Technology the Key to Programmable Linear, Logarithmic or Combined Linear and Logarithmic Response Without Image Lag or Distortion, website, Feb. 28, 2005, pp. 1-6.
Agilent Technologies, Pulsed Operating Ranges for AllnGap LEDs vs. Projected Long Term Light Output Performance, Nov. 1999, pp. 1-6.
Eastman Kodak Company, Fully Integrated Timing, Analog Signal Processing & 10 Bit ADC, Technical Data, Aug. 5, 2002, pp. 1-56.
Eastman Kodak Company, Ultra Sensitive Global Shutter 580 fps Monochrome CIS, Device Performance Specification, Sep. 2004, pp. 1-22.
Kodak Image Sensor Solutions, Device Performance Specification for Kodak KAI-0340S and Kodak KAI-0340D Image Sensor, pp. 1-54, Revision 1.0, Aug. 6, 2004.
Kodak Image Sensor Solutions, Color Better Through CMY Filters, www.kodak.com/go/ccd. pp. 1-2. Month and year unavailable but known to be published prior to earliest priority date of Jun. 3, 2005.
Kodak Image Sensor Solutions, Device Performance Specification for Kodak KAC-9630 CMOS Image Sensor, pp. 1-22, Revision 1.1, Sep. 2004.
Ex parte Request for Reexamination of U.S. Patent No. 7,568,628 dated Apr. 23, 2012 (including Transmittal and PTO/SB08).
Exhibit A./Pat-B or ex parte Request for Reexamination of U.S. Patent No. 7,568,628 dated Apr. 23, 2012 (including Feb. 25, 2008 Non-Final Office Action, Aug. 21, 2008 Response to Non-Final Office Action, Dec. 10, 2008 Final Office Action, and Apr. 10, 2009 Notice of Allowance for corresponding U.S. Appl. No. 11/077,975, now U.S. Patent No. 7,568,628).
Sep. 14, 2012 Decision of Rejection in Japanese Application No. 2008-500844 (with machine generated translation).
Apr. 18, 2012 Request for Invalidation of Chinese Application No. 200680016023.5 (Including Power of Attorney for Invalidation Procedure (p. 551), Request for Invalidation Transmittal (pp. 552-554), Arguments in Support of Request (pp. 552-557) (wit partial translation of Request for Invalidation Transmittal).
Jul. 3, 2012 Notification of Acceptance of Request for Invalidation of Chinese Application No. 200680016023.5 (with English translation).
Aug. 20, 2012 Text of the Observation by Patentee to Request Invalidation of Chinese Application No. 200680016023.5 (in Chinese only).
Vladimir Berezin, Ilia Ovasiannikov, Dmitry Jerdev, Richard Tsai, Dynamic Range Enlargement in CMOS Imagers with Buried Photodiode, Micro Imaging, Micro Technology, Inc., 2003 IEEE Workshop on CCDs and Advanced Image Sensor Program, May 15-17, 2003.
2003 IEEE Workshop on CCDs and Advanced Image Sensors Program, Oberbayern, Germany, May 15-17.
Micron Image Sensor with TrueSNAP Technology, EE Times Asia, Oct. 21, 2004, http://www.eeasia.com/ART_8800349851_765245_NP-d8379d7c.htm.
Oct. 3, 2012 Response by Patent Owner with Exhibits as filed in U.S. Appl. No. 90/009,996.
Aug. 31, 2012 Office Action is U.S. Appl. No. 13/437,439.
Aug. 3, 2012 Ex Parte Reexamination Office Action in U.S. Appl. No. 90/009,996.
Jun. 1, 2012 Order Granting/Denying Request for Ex Parte Reexamination in U.S. Appl. No. 90/009,996.
Hassan Aboushady, Single Stage Amplifiers, University of Paris VI, Sliders pp. 1-24, 2001 (date as indicated by the USPTO in U.S. Appl. No. 90/009,996).
Adams, James E. "Design of practical color filter array interpolation algorithms for digital cameras." SPIE Vo. 3028, 1997, pp. 117-125.
Lam, S.H. and Chi-Wah Kok "Demosaic: Color Filter Array Interpolation for Digital Cameras" PCM 2001, LNCS 2195, 2001, pp. 1084-1089.
Validity Search Report from the Chinese Patent Office in Chinese Patent No. ZL200680016023.5, Mar. 15, 2012 (In Chinese only).
"LM9630 100×128, 580 fps Ultra Sensitive Monochrome CMOS Image Sensor." National Semiconductor. May 2002.
"½-inch 3-Megapixel CMOS Digital Image Sensor." Micron. pp. 1-41. 2004.
U.S. Office Action issued in U.S. Appl. No. 12/190,145 dated Mar. 31, 2009.
Nov. 29, 2012 Ex Parte Reexamination Interview Summary in U.S. Reexamination Application No. 90/009,996 (Patent No. 7,568,628).
Dec. 14, 2012 Applicants' Summary of Interview in U.S. Reexamination Application No. 90/009,996 (Patent No. 7,568,628).
Observations by Petitioner, Proceedings on the Request for Invalidation of Chinese Application No. 200680016023.5, Nov. 27, 2012 (Submitted with English translation of the transmittal form).
Observations by Petitioner, Proceeding on the Request for Invalidation of Chinese Application No. 200680016023.5, Oct. 16, 2012 (submitted with corresponding Notification of Transfer of Document and English translation of corresponding Notification of Transfer document).
Notification of Oral Proceedings on the Request for Invalidation, Proceedings on the Request for Invalidation of Chinese Application No. 200680016023.5, Oct. 24, 2012 (Submitted with English Translation).
Observations by Patentee, Proceedings on the Request for Invalidation of Chinese Application No. 200680016023.5, Nov. 2, 2012 (Submitted with English Translation).
Supplemental Observations by Patentee, Proceedings on the Request for Invalidation of Chinese Application No. 200680016023.5, Nov. 9, 2012 (Submitted with English Translation).
Observation by Patentee in Response to the Notification of Acceptance of Request for Invalidation, Proceedings on the Request for Invalidation of Chinese Application No. 200680016023.5, Dec. 4, 2012 (Submitted with English Translation).
Mar. 21, 2013 Notice of Allowance in U.S. Appl. No. 13/052,768.
Mar. 4, 2013 Second Request for Invalidation of Chinese Application No. 200680016023.5.
Comments on Statement of Reasons for Patentability and/or Confirmation in U.S. Appl. No. 90/009,996 filed Mar. 26, 2013.

(56) References Cited

OTHER PUBLICATIONS

Mar. 26, 2013 Ex Parte Reexamination Certificate in U.S. Appl. No.90/009,996 (Reissue No. 7,568,628C1).
Apr. 19, 2013 Written Response to Request for Invalidation of Chinese Application No. 200680016023.5.
Office Action in Chinese Application No. 201110220834.X, dated Aug. 14, 2013, 11 pages.
Office Action in Chinese Application No. 201110220832.0, dated Aug. 26, 2013, 16 pages.
Aug. 7, 2013 Notice of Allowance in U.S. Appl. No. 13/289,795.
Mar. 31, 2009 Office Action in U.S. Appl. No. 12/190,145.
Jul. 18, 2012 Office Action in U.S. Appl. No. 12/190,145.
May 9, 2013 Office Action in U.S. Appl. No. 12/190,145.
Sep. 18, 2013 Notice of Allowance in U.S. Appl. No. 13/052,768.
Adams, J. E., et al.; "Color Processing in Digital Cameras;" IEEE Magazine, Eastman Kodak Company; dated 1998.
Fossum, E. R.; "*CMOS Image Sensors: Electronic Camera-On-A-Chip;*" IEEE Transactions on Electron Devices, vol. 44, No. 10; pp. 1689-1698; dated Oct. 1997.
Fowler, B., et al.; "*A CMOS Area Image Sensor with Pixel Level A/D Conversion;*" Information Systems Laboratory, Electrical Engineering Department, Stanford University; dated Nov. 20, 1995.
Gunturk, B. K., et al.; "Demosaicking: Color Filter Array Interpolation;" IEEE Signal Processing Magazine; dated Jan. 2005; abstract retrieved on Nov. 6, 2013 from <http://ieeexplore.ieee.org/xpl/freeabs_all.jsp?arnumber=1407714&abstractAccess=no&userType=inst>.
Hamami, S., et al.; "*CMOS APS Imager Employing 3.3V 12 Bit 6.3 MS/S Pipelined ADC;*" The VLSI Systems Center, Ben-Gurion University; ISCAS '04. Proceedings of the 2004 International Symposium on Circuits and Systems; dated May 2004.
Heimann, T. K.,et al.; "*Color Filter Array and Color Correction for High Dynamic Range CMOS Image Sensors;*" European Conference on Circuit Theory and Design; dated Aug. 2001; retrieved on Nov. 6, 2013 from <https://www.researchgate.net/publication/228974666_Color_filter_array_and_color_correction_for_high_dynamic_range_CMOS_image sensors?citationList=incoming >.
Henderson, R. K., et al.; "*Pixel-Pixel Fixed Pattern Noise in CMOS Image Sensors due to Readout Parasitic Capacitance;*" School of Engineering and Electronics, University of Edinburgh; dated 2005; retrieved on Oct. 9, 2013 from <http://www.imagesensors.org/Past%20Workshops/2005%20Workshop/2005%20Papers/07%20Henderson%20et%20al.pdf>.
"*1/2-Inch VGA (With Freeze Frame) CMOS Active-Pixel Digital Image Sensor;*" pp. 33; dated 2004; retrieved on Oct. 8, 2013 from <http://www.datasheet4u.com/datasheet/M/T/9/MT9V403_Micron.pdf.html>.
"*1/3-Inch Wide-VGA CMOS Digital Image Sensor—MT9V022;*" Aptina Imaging; 56 pages,; dated 2005.
"*1.3-Megapixel CMOS Active-Pixel Digital Image Sensor;*" pp. 30; dated 2004; retrieved on Oct. 8, 2013 from <http://www.digchip.com/datasheets/parts/datasheet/301/MT9M413-pdf.php>.
"*417 Bar Code;*" dated Dec. 25, 1997.
"*4000 OEM 2D Image Engine;* " IMAGETEAM™ from Hand Held Products, Inc.; dated 2005; retrieved on Nov. 26, 2013 from <http://data.manualslib.com/pdf2/28/2788/278784-hand_held_products/it4000.pdf?57edd87f01d2468a84c2e0f75ef84d2c&take=binary>.
"4410 Image Reader;" IMAGETEAM™ from Hand Held Products, Inc. retrieved on Oct. 8, 2013 from <http://www.barcoding.com/prodpages/HHP/4410hd.pdf>.
"4600 Image Reader;" IMAGETEAM™ from Hand Held Products, Inc.; retrieved on Oct. 8, 2013 from <http://www.barcoding.com/prodpages/HHP/4600.pdf >.
"4800 Image Reader;" IMAGETEAM™ from Hand Held Products, Inc.; retrieved on Oct. 8, 2013 from <http://www.barcoding.com/prodpages/HHP/4800.pdf>.
Chinese Office Action (Notification of Acceptance of Request for Invalidation) and Translation for Chinese Patent Application No. 200680016023.5; dated Jul. 3, 2012, 2 pages.

Communication Extended Search Report for European Application No. 10012906.3; dated Oct. 10, 2011.
Communication Partial Search Report, European Patent Application No. 10012906.3; dated May 13, 2011 (5 pages).
Communication Pursuant to Article 94(3) EPC for European Application No. 06 737 299.5; dated Jan. 11, 2008.
Communication Pursuant to Article 94(3) EPC for European Application No. 06 737 299.5; dated Sep. 3, 2010.
Communication Pursuant to Article 94(3) EPC for European Application No. 06 737 300.1; dated Oct. 10, 2013.
"CompactFlash Specification;" Version 2.0; dated 2003; originally retrieved from <http://www.compactflash.org>; presently retrieved on Nov. 6, 2013 from <https://www.google.com/search?q=CompactFlash+Specification%3B%E2%80%9D&rls=com.microsoft:en-us&ie=UTF-8&oe=UTF-8&startIndex=&startPage=1#q=CompactFlash+Specification&rls=com.microsoft:en-us>.
"Design and Implementation of Driving Timing for High Frame Rate Video Camera;" Northwest Institute of Nuclear Technology; dated 2004; pp. 2; abstract retrieved on Oct. 8, 2013 from <http://en.cnki.com.cn/Article_en/CJFDTOTAL-DSSS200402031.htm>.
Dolphin 7200 Series Mobile Computer available from Hand Held Products, Inc.; retrieved on Oct. 8, 2013 from <http://www.barcoding.com/prodpages/HHP/7200rf.pdf>.
Dolphin 7300 Series Mobile Computer available from Hand Held Products, Inc.; retrieved on Oct. 8, 2013 from <http://www.legacyglobal.com/Uploads/ProductPDF/Honeywell%20-%20Dolphin%207300%20Series.pdf>.
Dolphin 7400 Series Mobile Computer available from Hand Held Products, Inc.; retrieved on Oct. 8, 2013 from <http://www.bareoding.com/prodpages/HHP/7400.pdf>.
Dolphin 7900 Series Mobile Computer available from Hand Held Products, Inc.; retrieved on Oct. 8, 2013 from < http://www.barcodesinc.corn/pdf/Hand-Held/7900.pdf>.
Dolphin 9500 Series Mobile Computer available from Hand Held Products, Inc.; retrieved on Oct. 8, 2013 from <http://www.barcoding.com/prodpages/HHP/9500-9550.pdf>.
Imageteam 3800E linear image engine available from Hand Held Products, Inc.; retrieved on Oct. 8, 2013 from <http://www.barcoding.com/prodpages/HHP/3800vhd.pdf>.
Intel® PXA255 Processor with Intel® XScale™ Technology; INTEL; dated 2003; retrieved on Oct. 8, 2013 from <http://int.xscale-freak.com/XSDoc/PXA255/Technical_Documents/Product_Briefs/PXA255_Processor_with_Intel_XScaleR_Technology_.pdf>.
Intel® Strong ARM RISC Processor; INTEL; dated 2000; retrieved on Oct. 8, 2013 from <http://pdf.datasheetcatalog.com/datasheets/90/361041_DS.pdf>.
IMAGETEAM 4710 two-dimensional reader available from Hand Held Products, Inc.; retrieved on Oct. 8, 2013 from <http://www.barcoding.com/prodpages/HHP/4710hd.pdf>.
International Search Report for Application No. PCT/US2006/008113; dated Aug. 7, 2006.
"IT4000 Imaging Module & IT4300 Laser Aiming Imaging Module;" Hand Held Products Inc.; Hand Held Products IMAGETEAM 4X00 Optical Subassembly; retrieved on Oct. 8, 2013 from <http://www.racoindustries.com/hhpit4x00opt.htm>.
"IT4200 Image Engine & IT4250 Image Engine with decoder board;"; IMAGETEAM 4200/4250 OEM 2D Image Engine; Hand Held Products, Inc.; dated 2001; retrieved on Oct. 8, 2013 from <ftp://www.scansourcela.us/HandHeld%20Products/Data%20Sheets/Scanners%20&%20Input%20Devices/English/4200-Ss%20Rev%20B.pdf>.
Kodak KLI-4104 Image Sensor Device Performance Specification dated Oct. 27, 2003.
"Lumenera USB Camera User's Manual—Release 3.5;" Lumenera Corporation; dated 2004.
"MT9V022 Image Sensor IC Chip;" Micron, Inc.; dated Oct. 2, 2004; originally retrieved from <http://download.micron.com/pdf/flyers/mt9v022_(mi-0350)_flyer.pdf>; currently retrieved from < http://web.archive.org/web/20070404011812/http://download.micron.com/pdf/flyers/mt9v022_(mi-0350)_flyer.pdf> on Oct. 8, 2013.

(56) References Cited

OTHER PUBLICATIONS

"Observation," Application No. 200680016023.5; Title of invention "Bar Code Reading Device with Global Electronic Shutter Control," State observation directed to the Notification of Acceptance of Request for Invalidation, which was issued by the Patent Reexamination Board on Nov. 27, 2012; 15 pages; dated Dec. 4, 2012; partial translation.

"Observation," Application No. 200680016023.5; Title of invention "Bar Code Reading Device with Global Electronic Shutter Control," State observation directed to the Notification of Transferring the document (issue number: 2012111300206340) which was issued by the Patent Reexamination Board on Nov. 16, 2012; 134 pages; dated Dec. 14, 2012; full translation.

Observations by the Petitioner; Proceedings on the Invalidation of Chinese Application No. 200680016023.5; dated May 29, 2013.

Office Action for Chinese Application No. 200680000050.3; dated Mar. 22, 2009 (including English translation thereof, and translated version of pending claims of Chinese Patent Application No. 2006800000503 (26 pages)).

Office Action for Chinese Application No. 200680000050.3; dated Feb. 13, 2012.

Office Action for Chinese Application No. 200680016023.5; dated Oct. 24, 2013.

Office Action for Chinese Application No. 200680016023.5; dated Oct. 30, 2013.

Office Action for European Application No. 06737299.5; dated Jul. 10, 2013.

Office Action for European Application No. 10012906.3; dated Oct. 9, 2012.

Office Action for Japanese Application No. 2008-500843; dated Jun. 22, 2012; translation.

Office Action for Japanese Application No. 2008-500843; dated May 14, 2013; translation.

Office Action for Japanese Application No. 2013-003616; dated Oct. 8, 2013.

Office Action for U.S. Appl. No. 11/077,975; Notice of Allowance; dated Jul. 10, 2009.

Office Action for U.S. Appl. No. 11/174,447; dated Jan. 16, 2009.

Office Action for U.S. Appl. No. 12/403,459; dated Feb. 5, 2013.

Office Action for U.S. Appl. No. 12/534,664; Notice of Allowance; dated Nov. 8, 2010.

Office Action for U.S. Appl. No. 12/853,590; dated Mar. 3, 2011.

Office Action for U.S. Appl. No. 13/188,696; dated Jan. 4, 2013.

Office Action for U.S. Appl. No. 13/213,543; dated Mar. 30, 2012.

Office Action for U.S. Appl. No. 13/213,543; dated Sep. 20, 2012.

Office Action for U.S. Appl. No. 13/447,393; Notice of Allowance; dated Dec. 28, 2012.

Office Action for U.S. Appl. No. 13/493,348; dated Apr. 26, 2013.

Office Action for U.S. Appl. No. 13/493,348; dated Aug. 17, 2013.

Office Action for U.S. Appl. No. 13/586,420; dated Apr. 17, 2013.

Panasonic's Specification No. MIS-DG60C194 entitled, "Manual Insertion Type Integrated Smart Reader" dated Mar. 2004, revision 1.00.

Patentee Response to Observations by Petitioner, Proceedings on the Invalidation of Chinese Application No. 200680016023.5; dated Nov. 9, 2012.

"PB-MV13 20mm CMOS Active-Pixel Digital Image Sensor;" Photobit; pp. 33; dated Aug. 2000; retrieved on Oct. 8, 2013 from <http://fast-vision.com/clientuploads/PDFs/PB-MV13_Product_Specification.pdf.>.

"PC Card Standard 8.0 Release—Apr. 2001;" Personal Computer Memory Card International Association (PCMCIA) Version 2.0 <http://www.pcmcia.org>; retrieved on Oct. 8, 2013 from <affon.narod.ru/09gu80.pdf>.

Pending claims for Chinese Application No. 2006800000503; dated May 13, 2009.

Report by Applicants (Reporting divisional application filings in SIPO); dated Sep. 15, 2011.

Response and European Communication Pursuant to Article 94(3) EPC in European Application No. 06737300.0; dated Jul. 29, 2011.

Supplemental Observations by the Patentee; Proceedings on the Invalidation of Chinese Application No. 200680016023.5; dated Nov. 2, 2012.

"The Text of the Observation," Beijing ZBSD Patent & Trademark Agent LTD; dated Nov. 8, 2012; 29 pages; full translation.

"The Text of the Observation," Beijing ZBSD Patent & Trademark Agent LTD; dated Oct. 11, 2012; 233 pages; full translation.

Transaction Terminal Image Kiosk 8870 available from Hand Held Products, Inc.; retrieved on Oct. 8, 2013 from <http://www.legacyglobal.com/Uploads/ProductPDF/Honeywell%20-%20Transaction%20Team%20TT8870%20Series.pdf>.

U.S. Appl. No. 12/326,443 filed Dec. 2, 2008.

U.S. Appl. No. 12/827,619 filed Jun. 30, 2010.

U.S. Appl. No. 12/421,457 filed Apr. 9, 2009.

U.S. Appl. No. 12/421,476 filed Apr. 9, 2009.

U.S. Appl. No. 12/573,663 filed Oct. 5, 2009.

U.S. Appl. No. 12/637,528 filed Dec. 14, 2009.

U.S. Appl. No. 13/493,348; filed Jun. 11, 2012.

"XSCALE PXA25X Processor IC Chip including Central Processing Unit (CPU)" Intel; retrieved on Oct. 8, 2013 from <http://www.datasheetarchive.com/dlmain/Datasheets-14/DSA-276710.pdf>.

"XSCALE PXA27X Processor IC Chip with 'Quick Capture Camera Interface';" Intel; retrieved on Oct. 8, 2013 from <int.xscale-freak.com/XSDoc/PXA27X/28000304.pdf>.

Decision on Appeal for U.S. Patent No. 7,568,628; dated Feb. 28, 2014.

\* cited by examiner

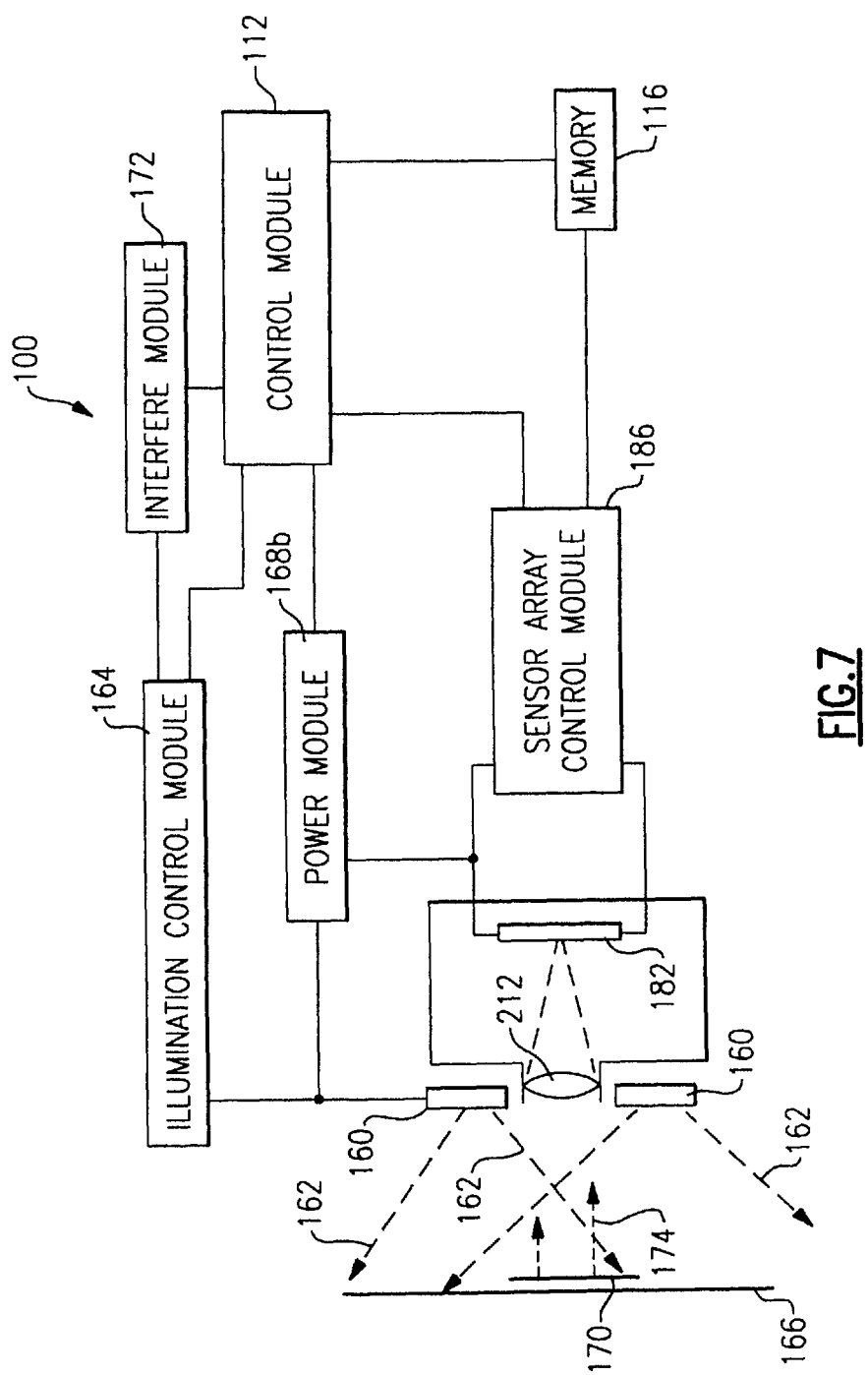

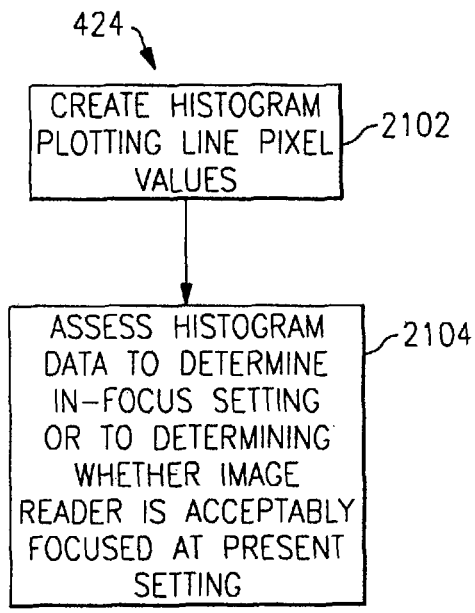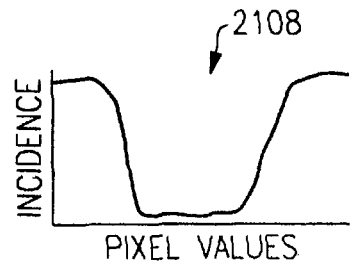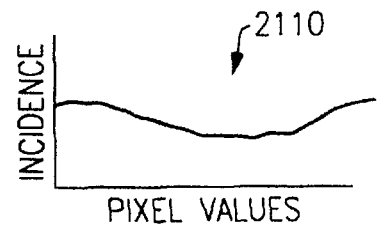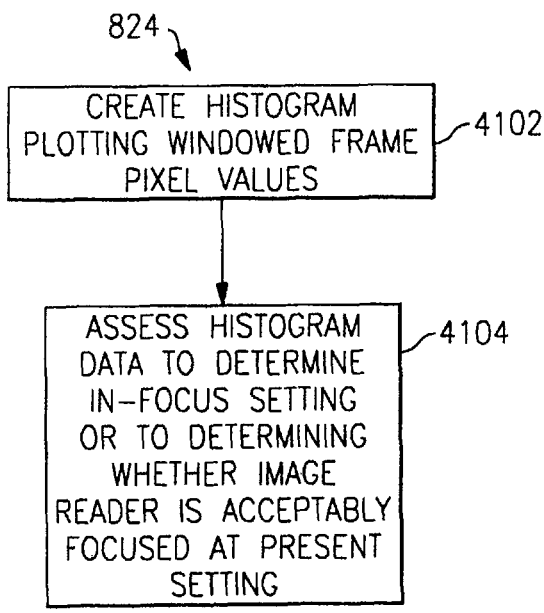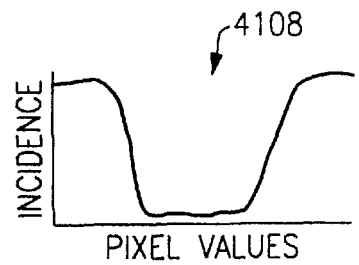

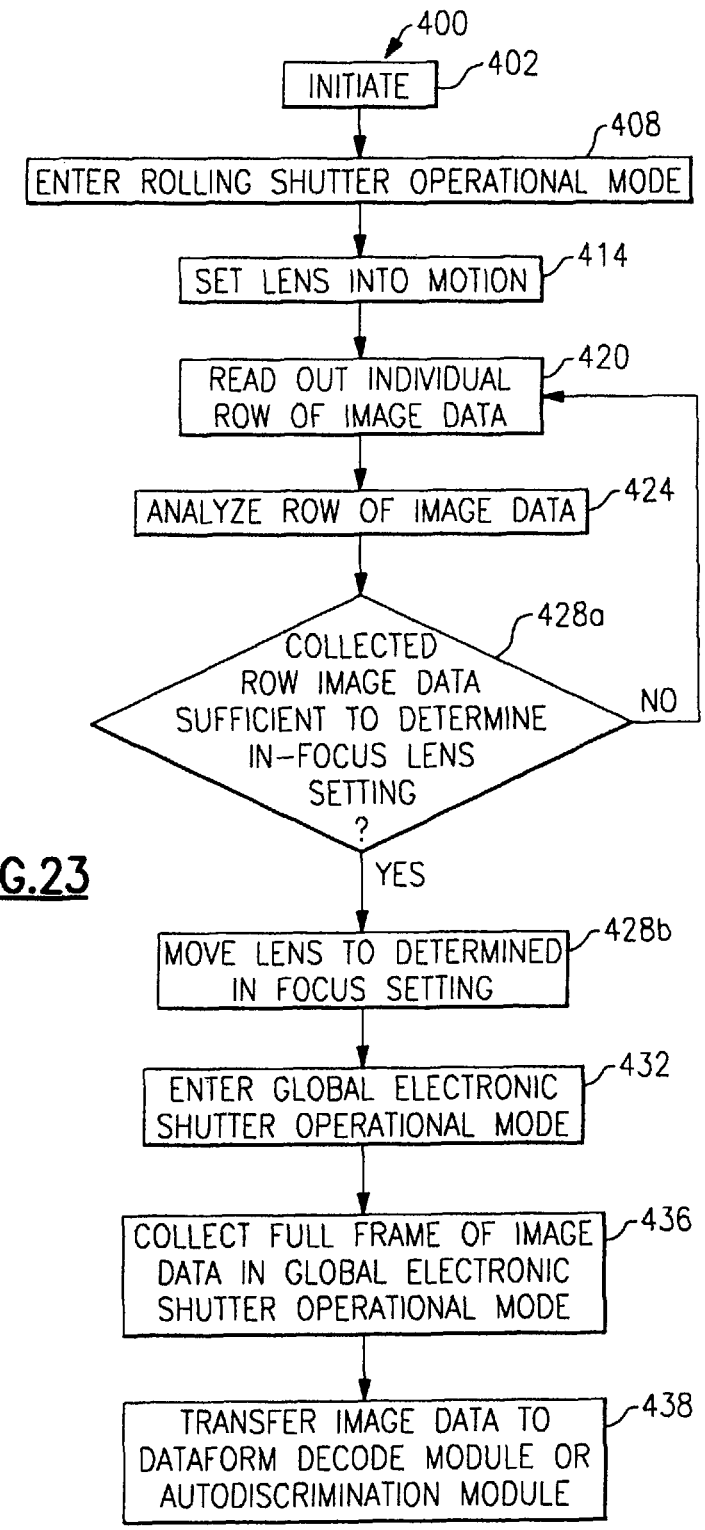

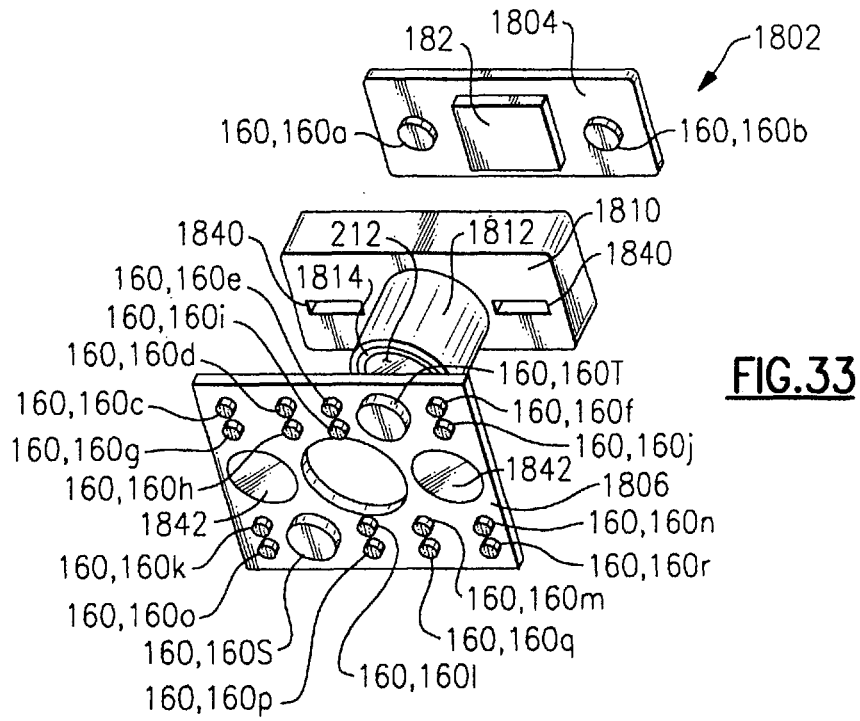
FIG.33
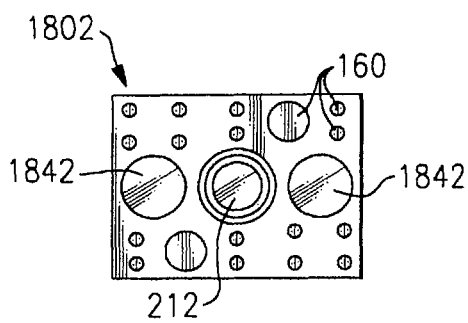
FIG.34
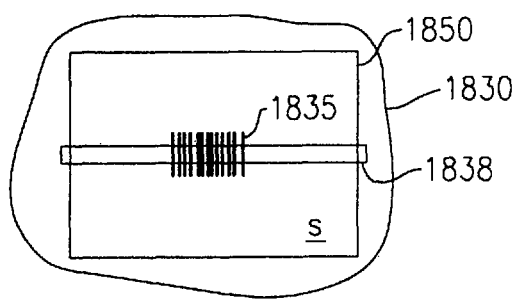
FIG.35
FIG.36

| EMBODIMENT | AIMING BANK 1 LEDS 160A, 160B GREEN EMITTING (GREEN) | BANK 2 LEDS 160C, 160E, 160H, 160J, 160L, 160N, 160O, 160Q RED EMITTING (RED) | BANK 3 LEDS 160D, 160F, 160G, 160I, 160K, 160M, 160P, 160R BLUE EMITTING (BLUE) | BANK 4 LEDS 160AS, 160T WHITE EMITTING (WHITE) |
|---|---|---|---|---|
| 1 | GREEN | RED | BLUE | WHITE |
| 2 | GREEN | RED | RED | RED |
| 3 | RED | RED | RED | RED |
| 4 | GREEN | RED | GREEN | BLUE |
| 5 | BLUE | WHITE | WHITE | RED |
| 6 | GREEN | WHITE | RED | RED |
| 7 | WHITE | RED | RED | RED |
| 8 | GREEN | RED | RED | RED |

IMAGE READER HAVING IMAGE SENSOR ARRAY

CROSS-REFERENCE TO RELATED APPLICATIONS

This application is a continuation of U.S. patent application Ser. No. 12/610,892 filed Nov. 2, 2009, entitled "Image Reader Having Image Sensor Array," which is incorporated herein by reference in its entirety, which is a divisional of U.S. patent application Ser. No. 11/077,976, filed Mar. 11, 2005, "System And Method To Automatically Focus An Image Reader," which is incorporated herein by reference in its entirety. This application is related to U.S. patent application Ser. No. 11/077,975, filed Mar. 11, 2005, now U.S. Pat. No. 7,568,628 entitled "Bar Code Reading Device With Global Electronic Shutter Control," which is incorporated herein by reference in its entirety.

FIELD OF THE INVENTION

The invention relates to image data collection in general and particularly to an image data collector having an image sensor array.

BACKGROUND OF THE INVENTION

Many traditional imager readers, such as hand held and fixed mounted bar code and machine code readers, employ charge-coupled device (CCDs) based image sensors. A CCD based image sensor contains an array of electrically coupled light sensitive photodiodes that convert incident light energy into packets of electric charge. In operation, the charge packets are shifted out of the CCD imager sensor for subsequent processing.

Some image readers employ CMOS based image sensors as an alternative imaging technology. As with CCDs, CMOS based image sensors contain arrays of light sensitive photodiodes that convert incident light energy into electric charge. Unlike CCDs, however, CMOS based image sensors allow each pixel in a two-dimensional array to be directly addressed. One advantage of this is that sub-regions of a full frame of image data can be independently accessed. Another advantage of CMOS based image sensors is that in general they have lower costs per pixel. This is primarily due to the fact that CMOS image sensors are made with standard CMOS processes in high volume wafer fabrication facilities that produce common integrated circuits such as microprocessors and the like. In addition to lower cost, the common fabrication process means that a CMOS pixel array can be integrated on a single circuit with other standard electronic devices such as clock drivers, digital logic, analog/digital converters and the like. This in turn has the further advantage of reducing space requirements and lowering power usage.

CMOS based image readers have traditionally employed rolling shutters to expose pixels in the sensor array. In a rolling shutter architecture, rows of pixels are activated and read out in sequence. The exposure or integration time for a pixel is the time between a pixel being reset and its value being read out. This concept is presented in FIG. 2A. In FIG. 2A, the exposure for each of the rows "a" though "n" is diagrammatically represented by the bars 4a ... 4n (generally 4). The horizontal extent 8 of each bar is intended to correspond to the exposure period for a particular row. The horizontal displacement of each bar 4 is suggestive of the shifting time period during which each row of pixels is exposed. As can be seen in FIG. 2A, the exposure period for sequential rows overlap. This is shown in more detail with respect to the timing diagrams for a rolling shutter architecture shown in FIG. 2B. The second 12 and third 16 lines of the timing diagram represent the reset timing signal and the read out timing signal, respectively, for row "a." The fourth 20 and fifth 24 lines represent the reset and the read out timing signals, respectively for row "b." As shown in both FIGS. 2A and 2B, the exposure for row "b" is initiated before the values for row "a" are read out. The exposure periods for adjacent rows of pixels typically overlap substantially as several hundred rows of pixels must be exposed and read during the capture of a frame of data. As shown by the illumination timing signal on the first line 28, the rolling shutter architecture with its overlapping exposure periods requires that the illumination source remain on during substantially all of the time required to capture a frame of data so that illumination is provided for all of the rows.

In operation, the rolling shutter architecture suffers from at least two disadvantages: image distortion and image blur. Image distortion is an artifact of the different times at which each row of pixels is exposed. The effect of image distortion is most pronounced when fast moving objects are visually recorded. The effect is demonstrated in the image shown in FIG. 3 that shows a representation of an image taken with a rolling shutter of a bus image pixels 50 passing through the field of view from right to left. As the top row of bus image pixels 54 of the bus was taken earlier than the bottom row of pixels 58, and as the bus was traveling to the left, the bottom row of bus image pixels 58 is displaced to the left relative to the top row of bus image pixels 54.

Image blur is an artifact of the long exposure periods typically required in a rolling shutter architecture in an image reader. As indicated above, in a rolling shutter architecture the illumination source must remain on during substantially all of the time required to capture a frame of data. Due to battery and/or illumination source limitations, the light provided during the capture of an entire frame of data is usually not adequate for short exposure times. Without a short exposure time, blur inducing effects become pronounced. Common examples of blur inducing effects include the displacement of an image sensor due to, for example, hand shake with a hand held image reader.

What is needed is an image reader that overcomes the drawbacks of current CMOS image readers including image distortion and image blur.

SUMMARY OF THE INVENTION

In one aspect, the invention features a complementary metal oxide semiconductor (CMOS) based image reader for collecting image data from a target. The CMOS based imager reader comprises a CMOS based image sensor array; a timing module in electrical communication with the CMOS based image sensor array. The timing module is capable of simultaneously exposing an entire frame of pixels of the CMOS based image sensor array during an exposure period. The CMOS based image reader also comprises an illumination module capable of illuminating the target during an illumination period. The illumination module is in electrical communication with the timing module. The CMOS based image reader further comprises a control module in electrical communication with the timing module and the illumination module. The control module is capable of causing at least a portion of the exposure period to occur during the illumination period. In one embodiment of the CMOS based image reader, illuminating the target comprises overdriving light sources in the illumination module. In another embodiment of the CMOS based image reader, the light sources comprise light emitting diodes. In a further embodiment of the CMOS based image reader, the exposure period starts after the start of the illumination period and the exposure period ends before the end of the illumination period. In yet another embodiment of the CMOS based image reader, the illumination period starts after the start of the exposure period and the illumination period ends before the end of the exposure period. In yet an additional embodiment of the CMOS based image reader, the illumination period starts before the start of the exposure period and the illumination period ends before the end of the exposure period. In yet a further embodiment of the CMOS based image reader, the exposure period has a duration of less than 3.7 milliseconds. In various embodiments of the CMOS based image reader, the target includes a symbology such as a one-dimensional bar code such as a Code 39 or a UPC code or a two-dimensional bar code such as a PDF417 bar code, an Aztec symbol or Datamatrix symbol.

In another aspect the invention features a complementary metal oxide semiconductor (CMOS) based image reader for collecting image data from a target. The CMOS based imager reader comprises an integrated circuit including at least a CMOS based image sensor array and global electronic shutter control circuitry. The global electronic shutter control circuitry is capable of generating an exposure control timing pulse that is capable of causing the simultaneous exposure of substantially all of an entire frame of pixels of the CMOS based image sensor array. The CMOS based image reader also comprises light sources in electrical communication with the integrated circuit. The light sources are capable of illuminating the target including the symbology in response to an illumination control timing pulse. At least a portion of the illumination control timing pulse occurs during the exposure control timing pulse. In one embodiment of the CMOS based image reader, illuminating the target comprises overdriving light sources. In another embodiment of the CMOS based image reader, the light sources comprise light emitting diodes. In a further embodiment of the CMOS based image reader, the exposure period starts after the start of the illumination period and the exposure period ends before the end of the illumination period. In yet another embodiment of the CMOS based image reader, the illumination period starts after the start of the exposure period and the illumination period ends before the end of the exposure period. In yet an additional embodiment of the CMOS based image reader, the illumination period starts before the start of the exposure period and the illumination period ends before the end of the exposure period. In yet a further embodiment of the CMOS based image reader, the exposure period has a duration of less than 3.7 milliseconds. In various embodiments of the CMOS based image reader, the target includes a symbology such as a one-dimensional bar code such as a Code 39 or a UPC code or a two-dimensional bar code such as a PDF417 bar code, an Aztec symbol or Datamatrix symbol.

In a further aspect, the invention features an image reader for collecting image data from a target. The imager reader comprises an integrated circuit including at least an image sensor array and exposure timing control circuitry. The exposure timing control circuitry is capable of generating an exposure control timing pulse that is capable of simultaneously exposing substantially all of the pixels in the image sensor array. The image reader also comprises an illumination module in electrical communication with the integrated circuit. The illumination module comprises light sources that are capable of illuminating the target in response to an illumination control timing pulse. At least a portion of the illumination control timing pulse occurs during the exposure control timing pulse. In one embodiment of the image reader, the illumination control timing pulse is generated by an illumination module. In another embodiment of the image reader, the overlap between the illumination control timing pulse and the exposure control timing pulse is coordinated by a control module that is in electrical communication with the integrated circuit and the illumination module. In a further embodiment of the image reader, the control module comprises a microprocessor. In one embodiment of the image reader, illuminating the target comprises overdriving light sources. In another embodiment of the image reader, the light sources comprise light emitting diodes. In a further embodiment of the image reader, the exposure period starts after the start of the illumination period and the exposure period ends before the end of the illumination period. In yet another embodiment of the image reader, the illumination period starts after the start of the exposure period and the illumination period ends before the end of the exposure period. In yet an additional embodiment of the image reader, the illumination period starts before the start of the exposure period and the illumination period ends before the end of the exposure period. In yet a further embodiment of the image reader, the exposure period has a duration of less than 3.7 milliseconds. In various embodiments of the CMOS based image reader, the target includes a symbology such as a one-dimensional bar code such as a Code 39 or a UPC code or a two-dimensional bar code such as a PDF417 bar code, an Aztec symbol or Datamatrix symbol.

In another aspect, the invention features a method for collecting image data from a target. The method comprises activating light sources to illuminate the target in response to an illumination control timing pulse. The activation of the light sources occurs for the duration of the illumination control timing pulse. The method also comprises simultaneously activating a plurality of pixels to photoconvert incident radiation. The activation of the plurality of pixels occurs in response to an exposure control timing pulse. The method additionally comprises storing image data collected by each of the plurality of pixels in a shielded portion of each of the plurality of pixels. The storing of the image data occurs in response to the exposure control timing pulse. The method further comprises reading out image data from the plurality of pixels wherein at least a portion of the exposure control timing pulse occurs during the illumination control timing pulse. In one embodiment, the method further comprises coordinating the overlap between the illumination control timing pulse and the exposure control timing pulse. The coordination is directed by a control module. In one such embodiment of the method, the control module comprises a microprocessor. In another embodiment of the method, illuminating the target comprises overdriving light sources in an illumination module. In an additional embodiment of the method, the light sources comprise light emitting diodes. In a further embodiment of the method, the storing of image data occurs in response to a stop portion of the exposure control timing pulse. In an additional embodiment of the method, the exposure period starts after the start of the illumination period and the exposure period ends before the end of the illumination period. In yet another embodiment of the method, the illumination period starts after the start of the exposure period and the illumination period ends before the end of the exposure period. In yet an additional embodiment of the method, the illumination period starts before the start of the exposure period and the illumination period ends before the end of the exposure period. In yet a further embodiment of the method, the exposure period has a duration of less than 3.7 milliseconds. In various embodiments of the CMOS based image reader, the target includes a symbology such as a one-dimensional bar code such as a Code 39 or a UPC code or a two-dimensional bar code such as a PDF417 bar code, an Aztec symbol or Datamatrix symbol.

In another aspect, the invention features a bar code image reader for collecting and processing bar code data from a bar code symbol. The image reader comprises a two-dimensional array of pixels for receiving light radiation reflected from the bar code symbol, the two-dimensional array of pixels comprising a first plurality of pixels and a second plurality of pixels, the two-dimensional array capable of reading out the first plurality of pixels independently of reading out the second plurality, each of the pixels comprising a photosensitive region and an opaque shielded data storage region. The image reader also comprising an optics assembly for directing light radiation reflected from the bar code symbol onto the two-dimensional array of pixels. The image reader further comprising a global electronic shutter associated with the two-dimensional array of pixels, the global electronic shutter capable of simultaneously exposing substantially all of the pixels in the two-dimensional array. The image reader additionally comprising a processor module, the processor module in electronic communication with the two-dimensional array of pixels, the processor module capable of processing image data from the two-dimensional array of pixels to generate decoded bar code data. In one embodiment of the bar code image reader, the two-dimensional image sensor array is a complementary metal oxide (CMOS) image sensor. In another embodiment of the bar code image reader, processing the image data to generate output data comprises automatically discriminating between a plurality of bar code types.

In another aspect, the invention features a complementary metal oxide semiconductor (CMOS) based image reader for collecting image data from a target. The CMOS based imager reader comprises a CMOS based image sensor array, the CMOS based image sensor array comprising a first plurality of pixels and a second plurality of pixels, the CMOS based image sensor array capable of reading out the first plurality of pixels independently of reading out the second plurality, each of the pixels of the CMOS based image sensor array comprising a photosensitive region and an opaque shielded data storage region. The CMOS based image reader also comprising a timing module in electrical communication with the CMOS based image sensor array, the timing module configured to simultaneously expose an entire frame of pixels of the CMOS based image sensor array during an exposure period. The CMOS based image sensor array further comprising an illumination module configured to illuminate the target during an illumination period, the illumination module in electrical communication with the timing module. The CMOS based image sensor array additionally comprising a control module in electrical communication with the timing module and the illumination module, the control module configured to cause at least a portion of the exposure period to occur during the illumination period.

In a further aspect, the invention features a complementary metal oxide semiconductor (CMOS) based image reader for collecting image data from a target. The CMOS based imager reader comprising an integrated circuit including at least a CMOS based image sensor array, the CMOS based image sensor array comprising a first plurality of pixels and a second plurality of pixels, the CMOS based image sensor array capable of reading out the first plurality of pixels independently of reading out the second plurality, each of the pixels of the CMOS based image sensor array comprising a photosensitive region and an opaque shielded data storage region. The CMOS based image sensor array also comprising a global electronic shutter control circuitry, the global electronic shutter control circuitry configured to generate an exposure control timing pulse that is capable of causing the simultaneous exposure of substantially all of an entire frame of pixels of the CMOS based image sensor array. The CMOS based image sensor array further comprising light sources configured to illuminate the target in response to an illumination control timing pulse, the light sources in electrical communication with the integrated circuit. In operation of the CMOS based image reader at least a portion of the illumination control timing pulse overlaps with at least a portion of the exposure control timing pulse. In one embodiment of the CMOS based image reader, illuminating the target comprises overdriving light sources in the illumination module. In another embodiment of the CMOS based reader the light sources comprise light emitting diodes. In a further embodiment of the CMOS based image reader, the exposure control timing pulse has a shorter duration than the illumination control timing pulse. In an additional embodiment of the CMOS based image reader, the illumination control timing pulse has a shorter duration than the exposure control timing pulse. In still another embodiment of the CMOS based imager reader, the illumination control timing pulse starts before the start of the exposure control timing pulse and the illumination control timing pulse ends before the end of the exposure control timing pulse. In still a further embodiment of the CMOS based imager reader, the exposure control timing pulse has a duration of less than 3.7 milliseconds. In still an additional embodiment of the CMOS based imager reader, the target includes a symbology. In one such embodiment, the symbology is a one-dimensional bar code. In another such embodiment, the symbology is a two-dimensional bar code. In one such embodiment, the two-dimensional bar code is a PDF417 bar code.

In a further aspect, the invention features a bar code image reader for collecting image data from a bar code. The imager reader comprises an integrated circuit including at least a two-dimensional image sensor array, the two-dimensional image sensor array including a plurality of active pixels, each active pixel including at least a shielded data storage area, the two-dimensional image sensor array capable of employing a transfer function to convert an incident light intensity into an output voltage, the transfer function having a first region with a first slope and a second region with a second slope, the two-dimensional image sensor array capable of employing the second region of the transfer function when the incident light intensity is above a specified level and the two-dimensional image sensor array capable of employing the first region of the transfer function when the incident intensity is below a specified level. The bar code image reader also comprises an exposure timing control circuitry, the exposure timing control circuitry configured to generate an exposure control timing pulse that is capable of simultaneously exposing all or substantially all of the pixels in the image sensor array to photoconvert incident radiation. In one embodiment, the exposure control timing pulse has a duration of less than 3.7 milliseconds. In another embodiment, a dynamic range of the two-dimensional image array sensor is greater than 65 decibels.

In yet another aspect, the invention features a method for automatically focusing an image reader. The method comprises directing with an optical system light energy reflected from a target onto an image sensor. The method also comprises exposing sequentially a plurality of rows of pixels in the image sensor during a frame exposure period, the frame exposure period being defined as a time duration extending from the beginning of the exposure of the first of the plurality of rows to the end of the exposure of the last of the plurality of rows. The method further comprising varying in incremental steps an optical system from a first setting where a distinct image of objects located at a first distance from the image reader is formed on the image sensor to a second setting where a distinct image of objects located at a second distance from the image reader is formed on the image sensor. The method additionally comprising reading out a plurality of rows of image data from the plurality of rows of pixels in the image sensor, wherein the varying in incremental steps the optical system occurs during at least a portion of the frame exposure period. In one embodiment, the method further comprises analyzing the plurality of rows of image data to determine a proper setting for the optical system corresponding to a distinct image of the target being formed on the image sensor. In an additional embodiment, the method also comprises simultaneously exposing the plurality of rows in the image sensor to generate an image of the target. In one embodiment of the method, the exposure period for adjacent lines of pixels in image reader overlap. In another embodiment of the method, the target includes a symbology. In one such embodiment, the symbology is a one-dimensional bar code. In another such embodiment, the symbology is a two-dimensional bar code.

In another aspect, the invention features an image reader with an automatic focusing capability. The imager reader comprising an integrated circuit including at least an image sensor array. The image reader also comprising an optical system capable of directing light reflected from a target onto the image sensor array, the optical system having a plurality of focus settings, a first focus setting corresponding to distinct images of objects located at a first distance from the image reader being formed on the image sensor array and a second focus setting corresponding to distinct images of objects located at a second distance from the image reader being formed on the image sensor array. The image reader further comprising a rolling shutter control module configured to sequentially expose a plurality of rows of pixels in the image sensor array to collect focusing image data. The imager reader additionally comprising an automatic focusing module configured to analyze the focusing image data to determine a focus setting for the target corresponding to a distinct image of the target being formed on the image sensor, wherein the optical system is capable of being varied in incremental steps from the first focus setting to the second focus setting during at least a portion of a time period during which the rolling shutter control module is sequentially exposing the plurality of rows of pixels. In one embodiment, the imager reader further comprises a global electronic shutter control module configured to simultaneously expose the plurality of lines of pixels in the image sensor array to collect a frame of image data once the focus setting for the target has been determined. In another embodiment of the image reader, the rolling shutter control module and the global electronic shutter control module are integrated on the same integrated circuit containing the image sensor array. In a further embodiment of the image reader, the rolling shutter control module and the global electronic shutter control module are combined in a single image array control module. In an additional embodiment of the image reader, the rolling shutter control module is capable of causing exposure periods for adjacent rows of pixels to overlap.

In another aspect, the invention features an image reader for minimizing ambient light image degradation. The image reader comprises an integrated circuit including at least an image sensor array, the image sensor array providing a signal suitable for light intensity determination. The image reader also comprises a rolling shutter control module configured to sequentially expose a plurality line of pixels in the image sensor array. The image reader further comprises a global electronic shutter control module configured to simultaneously expose the plurality of lines of pixels in the image sensor array, wherein one of the rolling shutter control module and the global electronic shutter control module is capable of being selected to control the image sensor array in response to the signal suitable for light intensity determination. In one embodiment of the image reader, the signal suitable for light intensity determination includes information related to an intensity of a light source of the image reader. In another embodiment of the image reader, the signal suitable for light intensity determination is useful for determining whether a minimum integration time is satisfied. In a further embodiment of the image reader, the signal suitable for light intensity determination is useful for determining whether the exposure time (also known as the integration time) for the current environmental condition is less than a calculated minimum integration time. In yet another embodiment of the image reader, the rolling shutter control module and the global electronic shutter control module are integrated on the same integrated circuit containing the image sensor array.

In still another aspect, the invention features a method for minimizing image data degradation collected by an image reader. The method comprises determining at least one parameter related to an ambient light intensity and analyzing the at least one parameter. The method also comprises switching control of an image sensor array in the image reader from a global electronic shutter control module to a rolling shutter control module in response to the analysis of the at least one parameter. In one embodiment of the method, the at least one parameter includes an exposure time for current environmental conditions. In another embodiment of the method, the analyzing the at least one parameter includes calculating a ratio of the exposure time for current environmental conditions to a predetermined exposure time. In one such embodiment, the predetermined exposure time is based on illumination supplied by light sources of the image reader. In another embodiment of the method, analyzing the at least one parameter includes determining whether a ratio of the ambient light intensity to an intensity of a light source of the image reader exceeds a specified threshold.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 7 is a schematic block diagram of one embodiment of an image reader constructed in accordance with the principles of the invention;

FIGS. 21, 22A and 22B are diagram illustrations of a focus level detection process according to an embodiment of the invention;

FIGS. 23, 24, 25, 26 and 27 are flow diagrams illustrating various focusing processes which may be practiced according to the invention;

FIGS. 29, 30A and 30B are diagrams illustrating a focus level detection process which may be utilized in an embodiment of the invention;

FIG. 33 is an exploded assembly view of an imaging module according to the invention;

FIG. 34 is a front view of the imaging module shown in FIG. 33;

FIG. 35 is a side view of an assembled imaging module as shown in FIG. 33;

FIG. 36 is a view of a substrate bearing a bar code symbol and having projected thereon an illumination pattern and an aiming pattern and having delineated thereon a full frame field of view of an image reader according to the invention that projects the illumination pattern and the aiming pattern; and FIG. 37 is a chart describing various embodiments of the invention having LEDs which emit light in different wavelength bands.

DETAILED DESCRIPTION OF THE INVENTION

The invention features an image reader and a corresponding method for capturing a sharp non-distorted image of a target. In one embodiment, the image reader comprises a two-dimensional CMOS based image sensor array, a timing module, an illumination module, and a control module all in electrical communication with each other. The illumination module shines light on the target, such as a symbology such as one or two-dimensional bar code, so that reflected light that can be collected and processed by the image sensor array. The time during which the target is illuminated is referred to as the illumination period. The capture of the image by the image sensor array is driven by the timing module that, in one embodiment, is able to simultaneously expose all or substantially all of the pixels in the array. The simultaneous exposure of the pixels in the sensor array enables the image reader to capture a distortion free image. The time during which the pixels are collectively activated to photo-convert incident light into charge defines the exposure period for the sensor array. At the end of the exposure period, the collected charge is transferred to a shielded storage area until the data is read out. In one embodiment, the exposure period and the illumination period are under the control of the control module. In one such embodiment, the control module causes at least a portion of the exposure period to occur during the illumination period. By adequately shortening either the illumination period or the exposure period in an environment of low ambient lighting or the exposure period in an environment of high ambient lighting, the image reader of the present invention is able to capture an image substantially free of blurring.

Figure 1A:
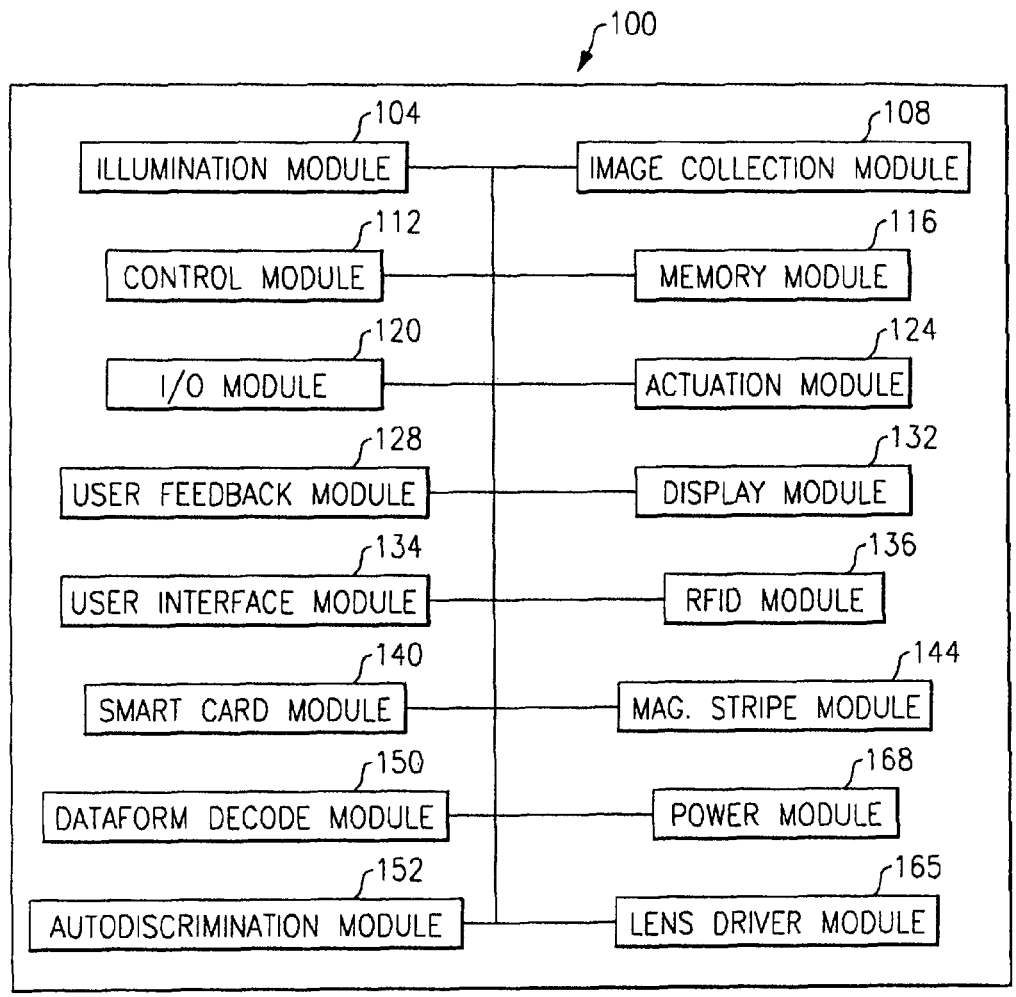
FIG. 1A is a block diagram of one embodiment of an image reader constructed in accordance with the principles of the invention.

Referring to FIG. 1A, a block diagram of a general image reader 100 constructed in accordance with the invention is shown. The general image reader includes one or more of: an illumination module 104, an image collection module 108, a control module 112, a memory module 116, an I/O module 120, an actuation module 124, a user feedback module 128, a display module 132, a user interface module 134, a radio frequency identification (RFID) module 136, a smart card module 140, magnetic stripe card module 144, a decoder module 150, an autodiscriminating module 152, and/or one or more power modules 168 and a lens driver module 165. In various embodiments each of the modules is in combination with one or more of the other modules. In one embodiment, the image reader 100 comprises a bar code image reader with a full frame electronic global shutter based image sensor that is capable of simultaneously exposing substantially all of the pixels in the image sensor. In one such embodiment, the image sensor is a CMOS based image sensor. In another such embodiment, the image sensor is a CCD based image sensor.

Dataform decode module 150 (which may be a bar code symbol dataform decode module) when receiving image data transferred by control module 112 may search the image data for markers, such as a quiet zone, indicative of the presence of a dataform, such as a one or two-dimensional bar code. If a potential dataform is located, the dataform decode module 150 applies one or more dataform decoding algorithms to the image data. If the decode attempt is successful, the image reader outputs decoded dataform data through I/O module 120 and signals a successful read with an alert, such as a beep tone through user interface module 134.

Figure 1B:
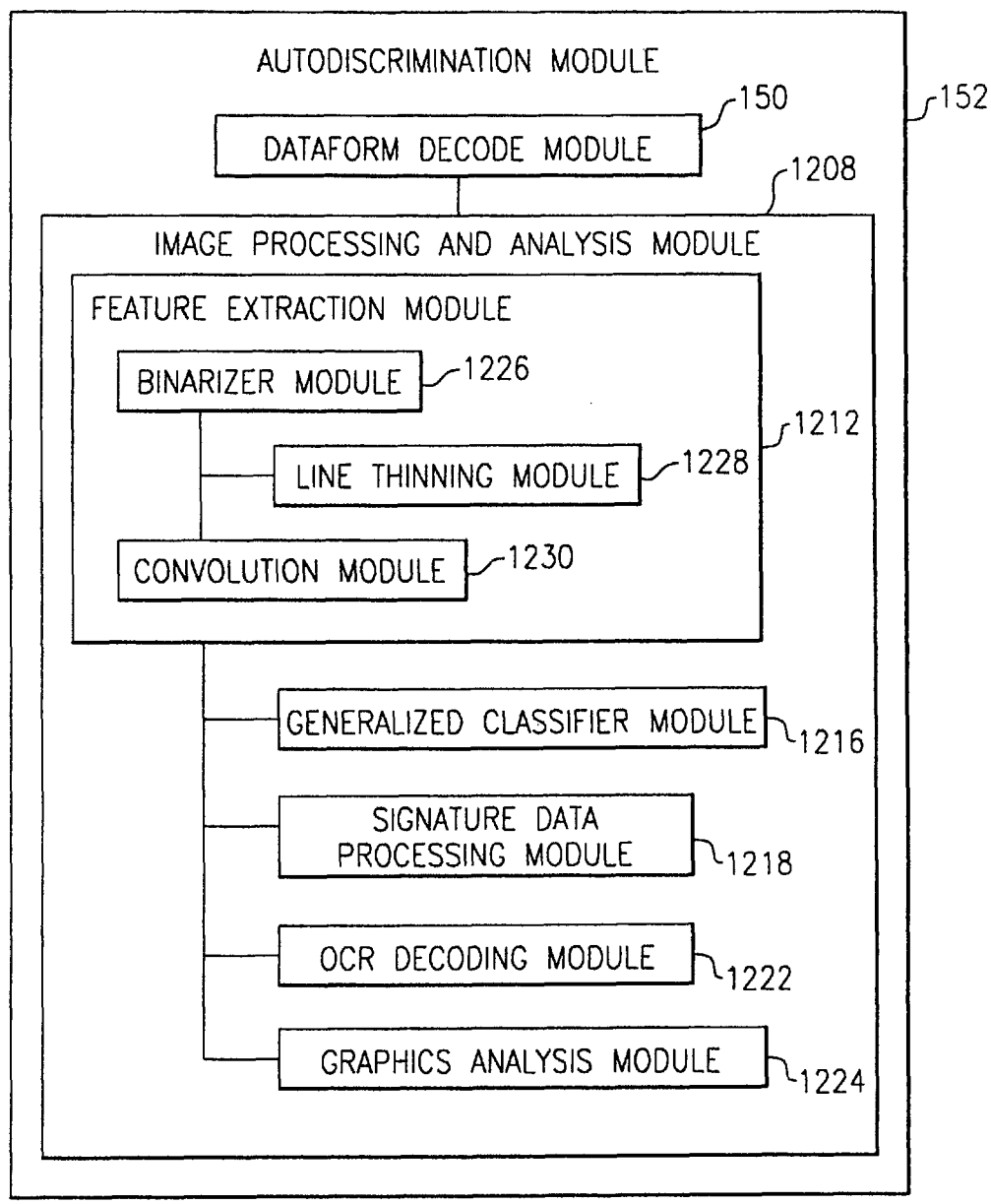
FIG. 1B is a schematic block diagram of an autodiscrimination module which may be utilized with the invention.

Image reader 100 may also include an autodiscriminating module 152. Referring to FIG. 1B, autodiscriminating module 152 may incorporate a dataform decode module 150 and an image processing and analysis module 1208, that are in communication with one another.

As shown in this embodiment, the image processing and analysis module 1208 comprises a feature extraction module 1212, a generalized classifier module 1216, a signature data processing module 1218, an OCR decode module 1222, and a graphics analysis module 1224 that are in communication with each other. In addition as shown in FIG. 1B, the feature extraction module 1212 comprises a binarizer module 1226, a line thinning module 1228, and a convolution module 1230 that are in communication with each other.

Figure 1C:
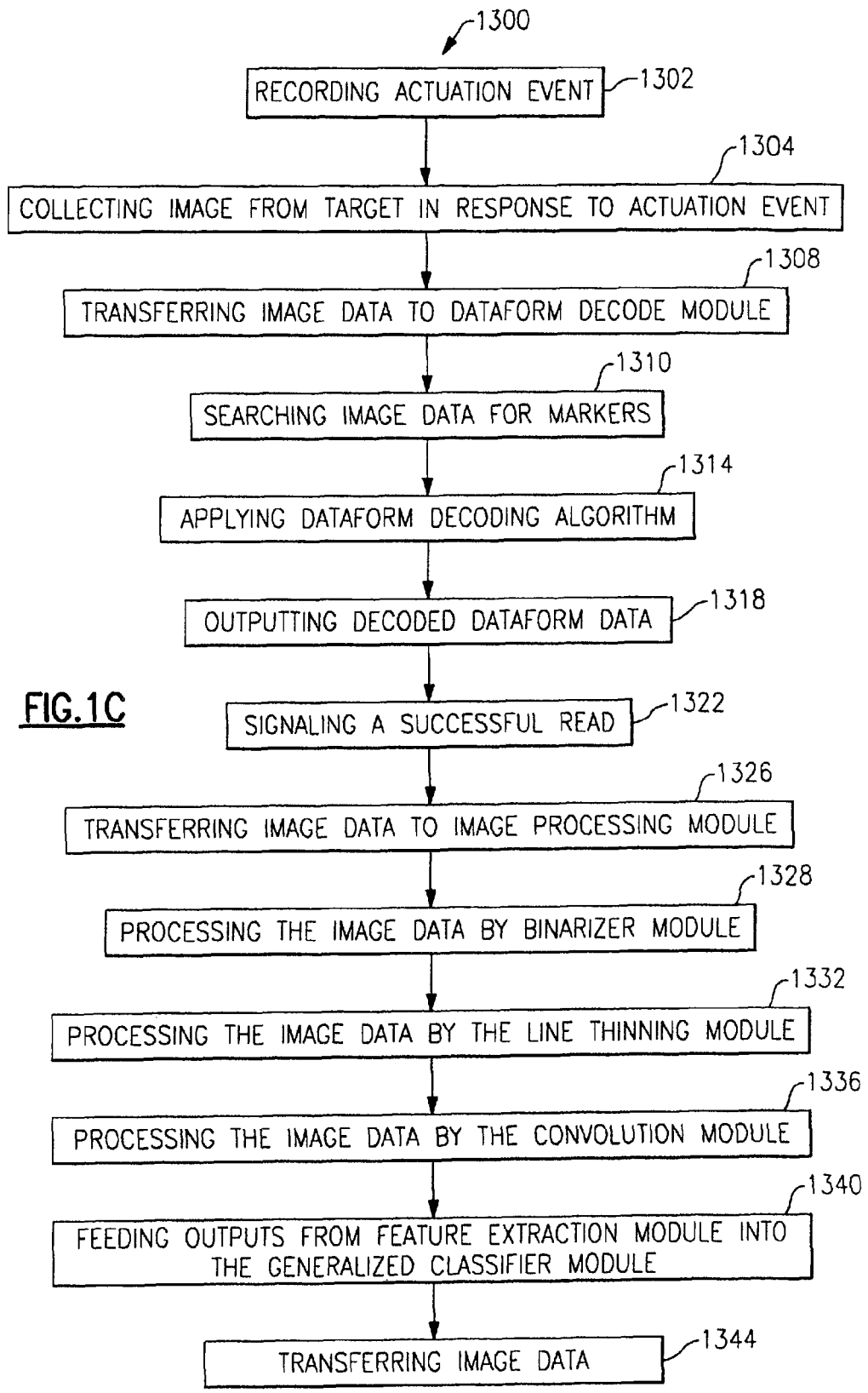
FIG. 1C is a process for practicing principles of the invention including automatically discriminating between different dataform types.

FIG. 1C shows a process 1300 for employing one embodiment of the invention utilizing the autodiscrimination module shown in FIG. 1B. The process 1300 comprises an image reader recording an actuation event (step 1302), such as a trigger pull as sensed by actuation module 124, and in response collecting (step 1304) image data from a target with the image reader 100. The collecting of image data step may be in accordance with e.g., process 300, process 400, (this process is used twice, see FIG. 13 and FIGS. 23 and 24), process 600 or process 800. After collection, the image data is transferred (step 1308) to the dataform decode module 150. The dataform decode module searches (step 1310) the image data for markers, such as a quiet zone, indicative of the presence of a dataform, such as a one or two-dimensional bar code. If a potential dataform is located, the dataform decode module 150 applies (step 1314) one or more dataform decoding algorithms to the ensuing image data. If the decode attempt is successful, the image reader 100 outputs (step 1318) decoded dataform data and signals (step 1322) a successful read with an alert, such as a beep tone.

In one embodiment if the decode attempt is not successful, the image data is transferred (step 1326) to the image processing and analysis module 1208. In another embodiment, the image data is processed in parallel with the attempt to decode the dataform data. In one such embodiment, the process that completes first (i.e., dataform decode attempt or the image processing) outputs its data (e.g., a decoded bar code or a captured signature) and the other parallel process is terminated. In a further embodiment, the image data is processed in response to the decoding of the dataform. In one such embodiment, a bar code encodes item information such as shipping label number and information indicating that a signature should be captured.

Within the image processing and analysis module 1208, the image data is processed by the feature extraction module 1212. In general, the feature extraction module generates numeric outputs that are indicative of the texture of the image data. As indicated above, the texture of the image data refers to the characteristics of the type of data contained in the image data. Common types of texture include one or two-dimensional bar code texture, signature texture, graphics texture, typed text texture, hand-written text texture, drawing or image texture, photograph texture, and the like. Within any category of textures, sub-categories of texture are sometime capable of being identified.

As part of the processing of the image data by the feature extraction module 1212, the image data is processed (step 1328) by the binarizer module 1226. The binarizer module 1226 binarizes the grey level image into a binary image according to the local thresholding and target image size normalization. With the image data binarized, the image data is processed (step 1332) by the line thinning module 1228 to reduce multi-pixel thick line segments into single pixel thick lines. With binarized line thinned image data, the image data is processed (step 1336) by the convolution module 1230.

Figure 17A:
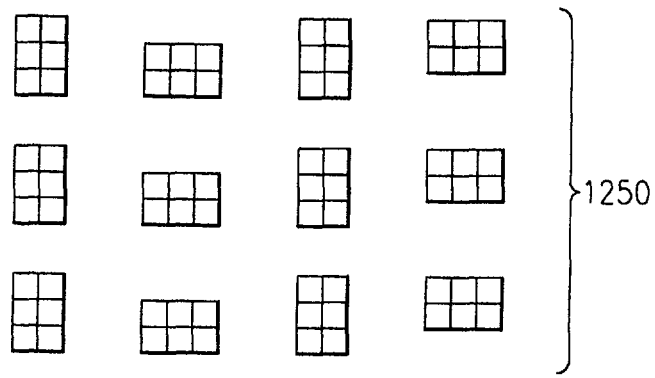
FIG. 17A shows one embodiment of a plurality of curvelent detector maps which may be utilized with the invention.

In general, the convolution module 1230 convolves the processed image data with one or more detector maps designed according to the invention to identify various textural features in the image data. In one embodiment, the convolution module 1230 generates a pair of numbers, the mean and variance (or standard deviation), for each convolved detector map. FIG. 17A shows a set of 12 2×3 binary curvelet detector maps 1250 used to detect curved elements present in image data. As each of the curvelet detector maps 1250 is convolved with the image data, the mean value and the variance generated provide an indication of the presence or density of elements in the binarized line thinned image data having similar shapes to the curvelet detector maps 1250. As each pixel map generates a pair of numbers, the 12 curvelet detector maps 1250 generate a total of 24 numbers. According to one embodiment, these 24 numbers are representative of the curved or signature texture of the processed image data.

Further processing of the image data includes the outputs from the feature extraction module 1212 being fed (step 1340) into the generalized classified module 1216. The generalized classifier module 1216 uses the numbers generated by the feature extraction module as inputs to a neural network, a mean square error classifier or the like. These tools are used to classify the image data into general categories. In embodiments employing neural networks, different neural network configurations are contemplated in accordance with the invention to achieve different operational optimizations and characteristics. In one embodiment employing a neural network, the generalized classifier module 1212 includes a 24+12+6+1=43 nodes Feedforward, Back Propagation Multilayer neural network. The input layer has 24 nodes for the 12 pairs of mean and variance outputs generated by a convolution module 1230 employing the 12 curvelet detector maps 1250. In the neural network of this embodiment, there are two hidden layers of 12 nodes and 6 nodes respectively. There is also one output node to report the positive or negative existence of a signature.

Figure 17B:
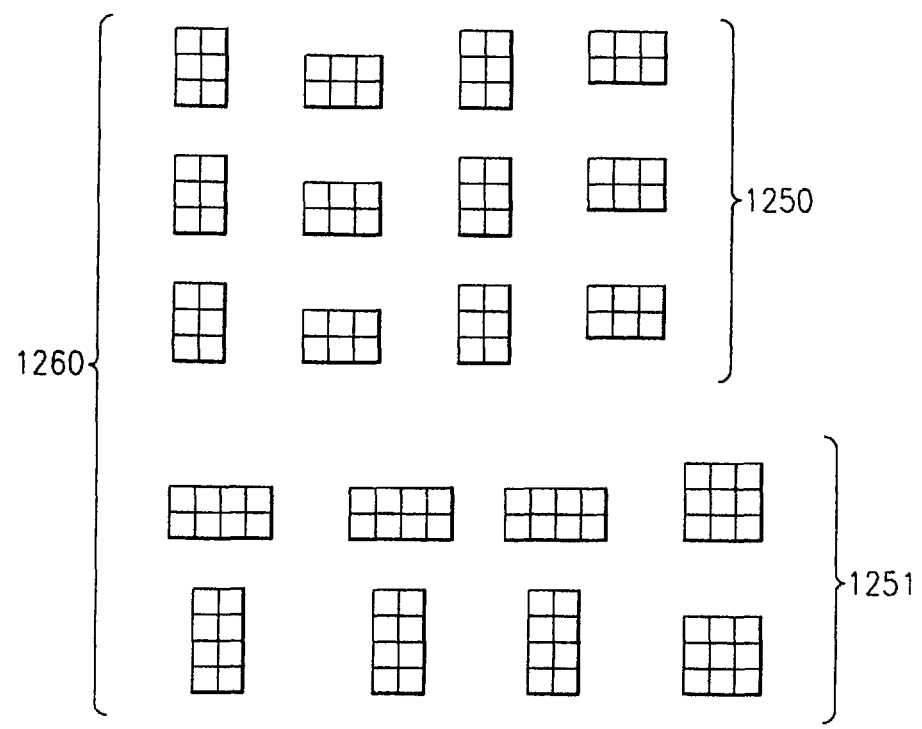
FIG. 17B shows another embodiment of a plurality of curvelent detector maps which may be utilized with the invention.

In another embodiment employing a neural network, the 20 curvelet detector maps 1260 shown in FIG. 17B are used by the convolution module 1230. As shown, the 20 curvelet detector maps 1260 include the original 12 curvelet detector maps 1250 of FIG. 17A. The additional 8 pixel maps 1260 are used to provide orientation information regarding the signature. In one embodiment employing the 20 curvelet detector maps 1260, the generalized classifier module 216 is a 40+40+20+9=109 nodes Feedforward, Back Propagation Multiplayer neural network. The input layer has 40 nodes for the 20 pairs of mean and variance outputs generated by a convolution module 1230 employing the 20 curvelet detector maps 1260. In the neural network of this embodiment, there are two hidden layers of 40 nodes and 20 nodes respectively, one output node to report the positive or negative existence of a signature, and 8 output nodes to report the degree of orientation of the signature. The eight output nodes provide $2^8=256$ possible orientation states. Therefore, the orientation angle is given in degrees between 0 and 360 in increments of 1.4 degrees.

In some embodiments, the generalized classifier module 1216 is capable of classifying data into an expanded collection of categories. For example in some embodiments, the generalized classifier module 1216 specifies whether the image data contains various data types such as a signature; a dataform; handwritten text; typed text; machine readable text; OCR data; graphics; pictures; images; forms such as shipping manifest, bill of lading, ID cards, and the like; fingerprints, biometrics such as fingerprints, facial images, retinal scans and the like, and/or other types of identifiers. In further additional embodiments, the generalized classifier module 1216 specifies whether the image data includes various combinations of these data types. In some embodiments, the general classifier module 1216 specifies whether the image data contains a specified type of data or not. In one such embodiment, the image processing and analysis module 1208 is contained within an identification module that outputs an affirmative or negative response depending on the presence or absence of the specified data type, such as a signature or a biometric, in the image data.

Figure 18:
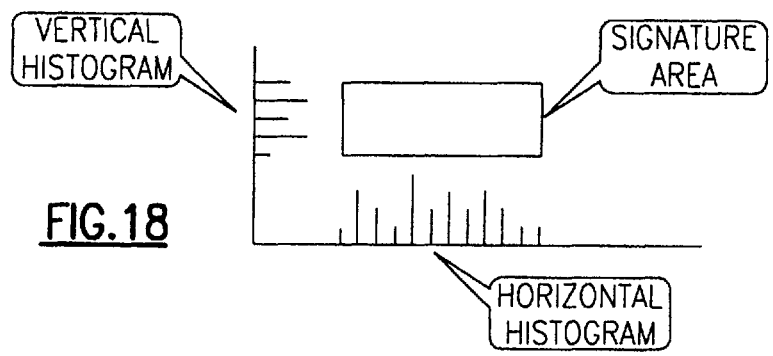
FIG. 18 is a diagrammatic representation of a histogram analysis which may be performed in one embodiment of the invention.

In one embodiment once the presence of a signature has been confirmed and its general orientation determined, image data is transferred (step 1344) to the signature data processing module 1218. In one embodiment, the signature data processing module 1218 is used to detect the boundaries of the signature in the image data. In one embodiment, the signature boundary is detected using a histogram analysis. As shown in FIG. 18, a histogram analysis consists of a series of one-dimensional slices along horizontal and vertical directions defined relative to the orientation of the signature. In one embodiment, the value for each one-dimensional slice corresponds to the number of black (i.e., zero valued) pixels along that pixel slice. In some embodiments if no bar codes have been decoded, then some specified region of the full frame of image data, such as a central region is captured for signature analysis. Once completed, the histogram analysis provides a two-dimensional plot of the density of data element pixels in the image data. The boundary of the signature is determined with respect to a minimum density that must be achieved for a certain number of sequential slices. In one embodiment, the histogram analysis searches inwardly along both horizontal and vertical directions until the pixel density rises above a predefined cutoff threshold. So that the signature data is not inadvertently cropped, it is common to use low cutoff threshold values.

In one embodiment, once the boundaries of the signature have been determined, the signature data processing module 1218 crops the image data and extracts the signature image data. In one such embodiment, the cropping is performed by an image modification module that generates modified image data in which a portion of the image data not including the signature has been deleted. In other embodiments, various compression techniques are employed to reduce the memory requirements for the signature image data. One such technique includes the encoding of the signature image data by run length encoding. According to this technique, the length of each run of similar binarized values (i.e., the length of each run of 1 or 0) for each scan line is recorded as a means of reconstructing a bit map. Another encoding technique treats the signature image data as a data structure where the elements of the data structure consist of vectors. According this encoding technique, the signature is broken down into a collection of vectors. The position of each vector in combination with the length and orientation of each vector is used to reconstruct the original signature. In one such embodiment, the encoding process generates a new vector whenever the curvature for a continuous pixel run exceeds a specified value. A further compression technique employs B-Spline curve fitting. This technique has the capacity to robustly accommodate curvature and scaling issues.

In various embodiments, the signature image data or a compressed or encoded version of the signature image data is stored locally on a dedicated memory device. In one such embodiment, the local memory device can be a detachable memory device such as a CompactFlash memory card or the like described in more detail below. In another embodiment, the signature image data is stored in a volatile or non-volatile portion of general purpose memory and downloaded at a future time. In a further embodiment, the signature image data can be transmitted via wired or wireless means either at the time of capture or at a later point, such as when a data collection session has been completed.

In another embodiment, the signature data processing module 218 does not perform a histogram analysis but simply stores in memory the entire image or a compressed version once the presence of a signature has been determined. In a further embodiment to save processing time, the initial image analysis is performed on a lower resolution image. Once the presence of a signature is determined in this embodiment, a higher resolution image is taken. In one embodiment, a signature extraction histogram analysis is performed on this image. Next, the image is stored in memory in either compressed or original format. In some embodiments, the image data is combined with other data to form a record for a particular item such as a package or shipping envelope. As mentioned above, some of the additional data that can be collected by the image reader 100 and stored with or separate from the signature data includes but is not limited to dataform data, handwritten text data, typed text data, graphics data, image or picture data, and the like.

As part of its operations, the image processing and analysis module 1208 can be designed to perform specialized tasks for different data types. For example, if the generalized classifier module 1216 determines that the image data contains typed or machine readable text, the image data can be collected, possibly histogram analyzed, and stored or alternatively the image data can be transferred to the OCR decoding module 1222. Similarly, if the generalized classifier module 1216 determines that the image data includes a graphic element, the image data can be transferred to the graphics analysis module 1224 for processing. In one embodiment, the graphics analysis module 1224 is configured to recognize and decode predefined graphics. In one such embodiment, the graphics analysis can include determining which, if any, boxes have been selected in the billing and shipping instructions on a shipping label. In a further embodiment, the graphics analysis can include locating and decoding the typed or handwritten text contained in the zip code box on a shipping label. In an alternative embodiment, the image reader 100 can be configured to automatically attempt decode operations in addition to the dataform decode, such as OCR decoding or graphics decoding, prior to the activation of the feature extraction module 1212.

Figure 8A:
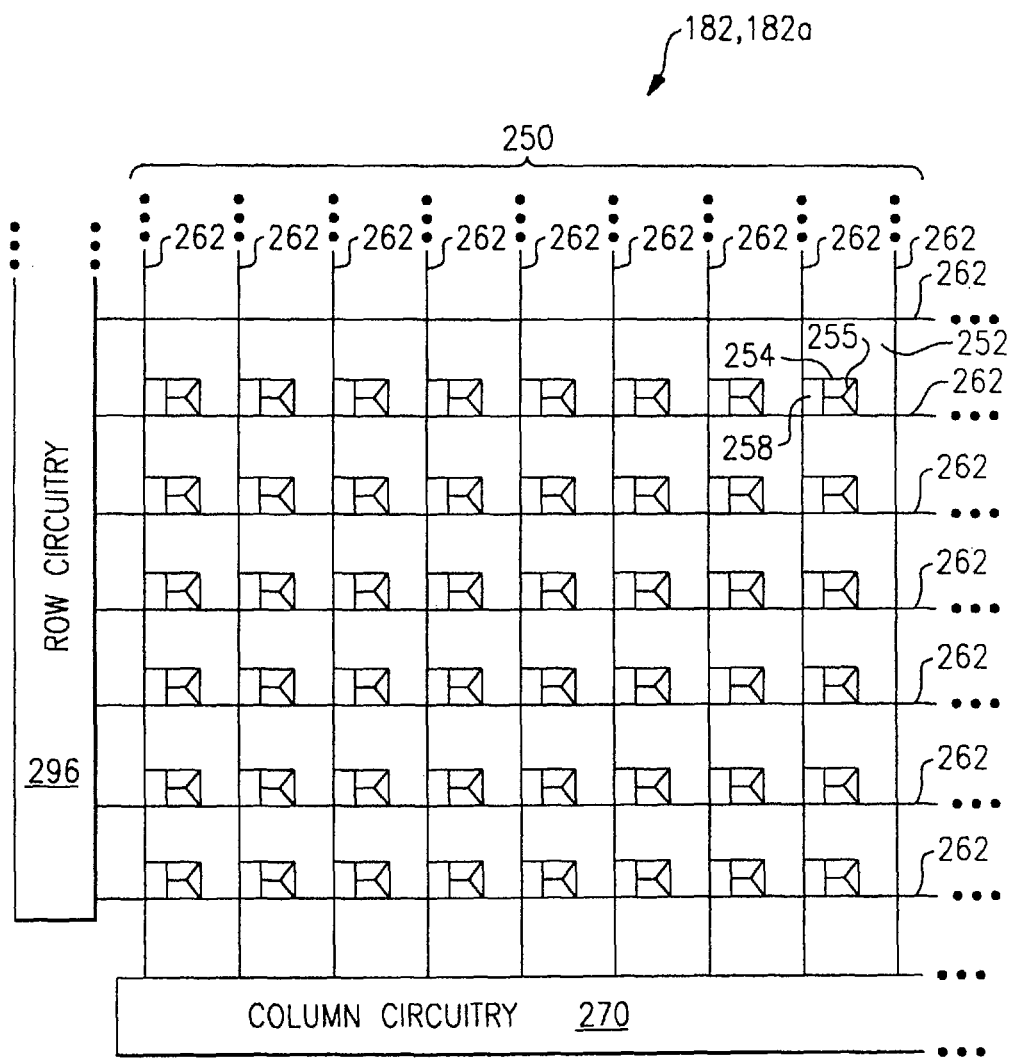
FIG. 8A is a schematic diagram of a portion of one embodiment of an image sensor array from the prior art that can be employed in one embodiment of the image reader of FIG. 7.
Figure 8B:
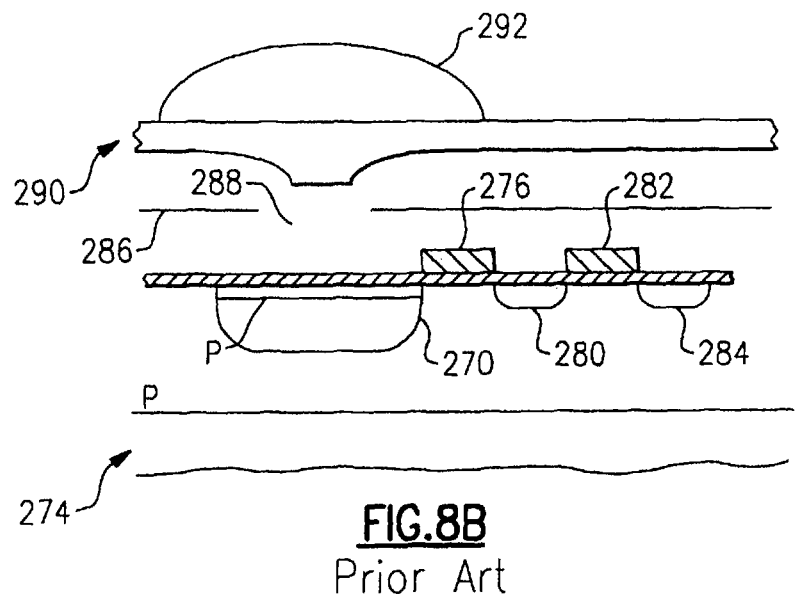
FIGS. 8B and 8C are cross-sectional details of pixel architectures from the prior art that can be employed in one embodiment of the image reader of FIG. 7.
Figure 19A:
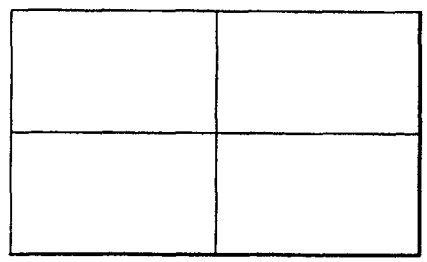
FIGS. 19A-19D are diagrammatic representations of an image data segmentation process according to embodiments of the invention.
Figure 19B:
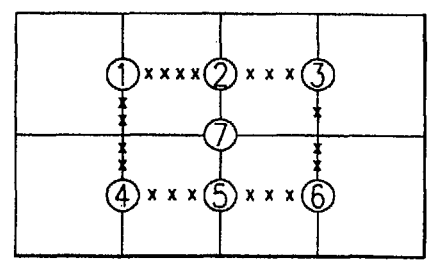
Figure 19C:
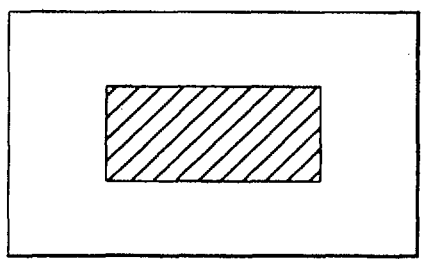
Figure 19D:
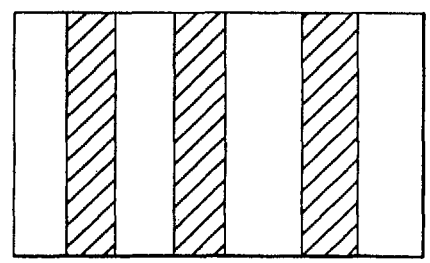

In another embodiment, the image processing and analysis module 1208 segments the image data into regions and performs a feature extraction and general classification analysis on each region. In one embodiment as shown in FIG. 19A, the standard rectangular image data window is divided into four equal sized sub-rectangles. In another embodiment shown in FIG. 19B, the segmentation consists of overlapping regions so that the total area of the segmented regions is larger than that of the complete field of the image data. In FIG. 8B there are seven shown overlapping regions where each identifying numeral is shown in the center of its region. In a further embodiment shown in FIGS. 19C and 19D, the segmentation consists of sample regions (shown as cross-hatched) within the complete field of the image data. In another embodiment, the sampled regions can be based on a preloaded user template that, for example, identifies regions of interest such as a signature region and/or a bar code region, in for example, a shipping label.

In one embodiment, the segmentation process is used to identify the location of a signature in image data the might include additional elements such as dataforms including bar code dataforms, text, graphics, images and the like. In one such embodiment the generalized classifier module 1216 classifies the contents of each region of the segmented image data. The region containing the signature is then extracted by the signature data processing module 1218. In one embodiment if multiple regions are indicated as containing signature data, the signature data processing module 1218 analyzes the arrangement of these regions to identify the region most likely to contain the image data. In a further embodiment when multiple regions are indicated as containing signature data, the image processing and analysis module establishes a feedback loop where additional segmented regions are generated and analyzed until a single segmented region containing signature data is located.

Additional image processing operations which may be carried out by image reader 100 are described in U.S. patent application Ser. No. 10/958,779, filed Oct. 5, 2004 entitled, "System And Method To Automatically Discriminate Between A Signature And A Bar code" and incorporated herein by reference in its entirety.

Figure 5A:
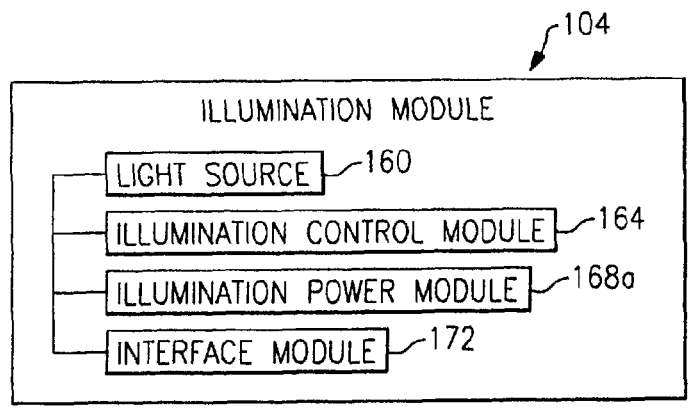
FIG. 5A is a block diagram of one embodiment of an illumination module in an image reader constructed in accordance with the principles of the invention.

Referring to additional components of image reader 100 indicated in FIG. 1A and FIG. 5A, illumination module 104 can include light sources 160, an illumination control module 164, an illumination power module 168a, and an interface module 172. In various embodiments, the light sources 160 can include white or colored LEDs, such as 660 nm illumination LEDs, infrared LED, ultra-violet LED, lasers, halogen lights, arc lamps, or incandescent lights, capable of producing adequate intensity light given image reader power constraints and image sensor exposure/sensitivity requirements. In many embodiments, LEDs are chosen for the light source as their efficient operation enables relatively low power consumption. The illumination control module 164 controls the operation of illumination module 104 and can include timing and light source activation and deactivation circuitry. The illumination power module 168a supplies the energy necessary to drive the light sources 160 and can include batteries, capacitors, inductors, transformers, semiconductors, integrated circuits and the like. In an alternative embodiment, some or all of the elements of the illumination power module 168a are located external to the illumination module. An image reader 100 with a single common power source is one such embodiment. The interface module 172 is used for communication with the other modules of the image reader 100 such as those required to synchronize operations. This can include, for example, the coordination of the illumination and exposure periods discussed above.

Figure 15A:
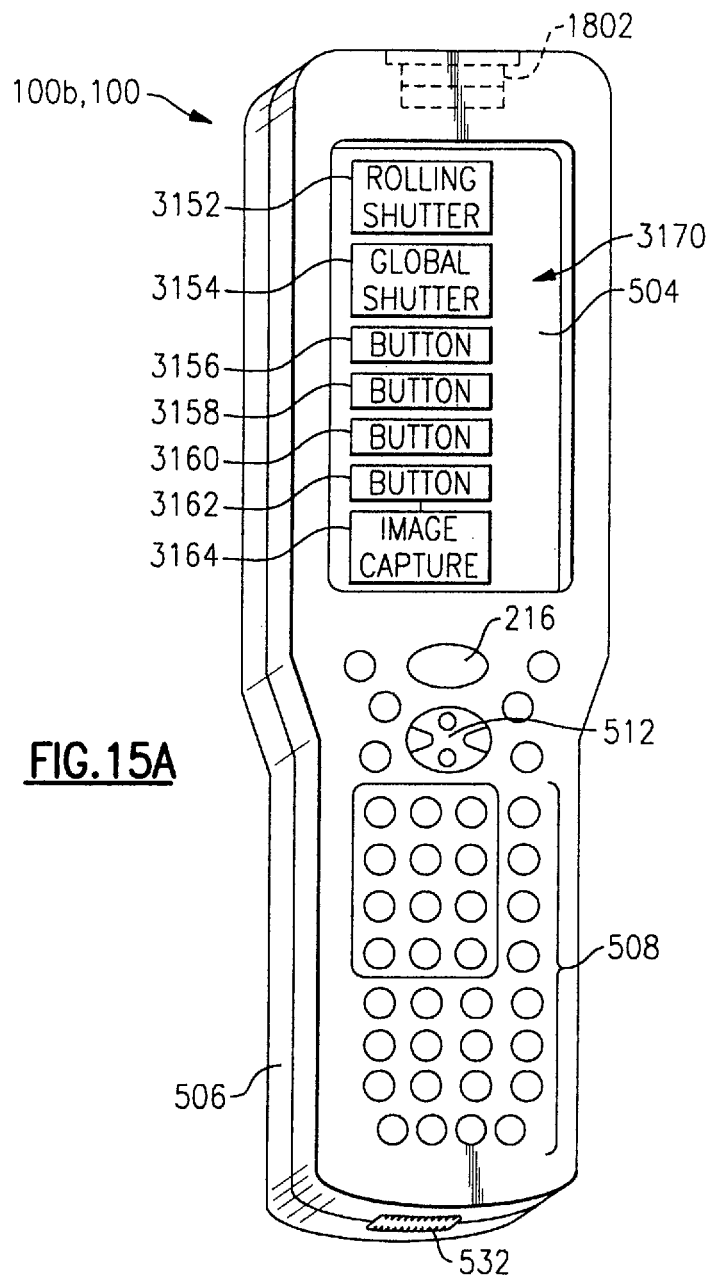
FIGS. 15A, 15B, and 15C are various views of one embodiment of portable data terminal image reader constructed in accordance with the principles of the invention.
Figure 15B:
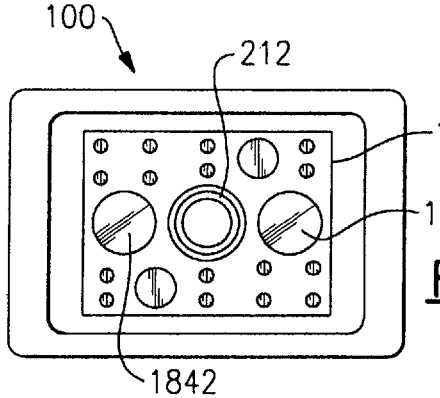
Figure 15C:
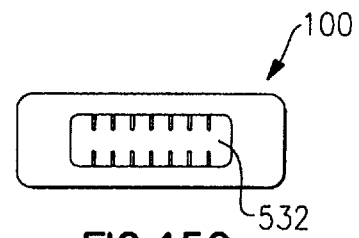

Referring to the physical form views of FIGS. 33-36, various components of illumination module 104 and image collection module 108 according to one embodiment of the invention are shown and described. An image reader 100 of the invention, as shown in the embodiment of FIGS. 15A-15C, may include an imaging module such as imaging module 1802. Imaging module 1802 as shown in FIGS. 33-35 incorporates certain features of an IT4000 imaging module as referenced herein and additional features. Imaging module 1802 includes first circuit board 1804 carrying light sources 160a, 160b, while second circuit board 1806 carries light sources 160c, 160d, 160e, 160f, 160g, 160h, 160i, 160j, 160k, 160l, 160m, 160n, 160o, 160p, 160q, 160r, 160s, and 160t (hereinafter 160c through 160t). First circuit board 1804 also carries image sensor array 182. Imaging module 1802 also includes support assembly 1810 including lens holder 1812, which holds lens barrel 1814 that carries imaging lens 212. Light sources 160a, 160b are aiming illumination light sources whereas light sources 160c through 160t are illumination light sources. Referring to FIG. 36, illumination light sources 160c through 160t project a two-dimensional illumination pattern 1830 over a substrate, s, that carries a decodable indicia such as a bar code symbol 1835 whereas aiming illumination light sources 160a, 160b project an aiming pattern 1838. In the embodiments shown and described in connection with FIGS. 33-36, light from aiming illumination light sources 160a, 160b is shaped by slit apertures 1840 in combination with lenses 1842 which image slits 1840 onto substrate, s, to form aiming pattern 1838 which in the embodiment of FIGS. 33-36 is a line pattern 1838. Illumination pattern 1830 substantially corresponds to a full frame field of view of image reader 100 designated by box 1850. Aiming pattern 1838 is in the form of a line that extends horizontally across a center of field of view of image reader 100. Illumination pattern 1830 may be projected when all of illumination light sources 160c through 160t are operated simultaneously. Illumination pattern 1830 may also be projected when a subset of light sources 160c through 160t are simultaneously energized. Illumination pattern 1830 may also be projected when only one of light sources 160c through 160t is energized such as LED 160s or LED 160t. LEDs 160s and 160t of imaging module 1802 have a wider projection angle than LEDs 160c through 160t.

Figure 5B:
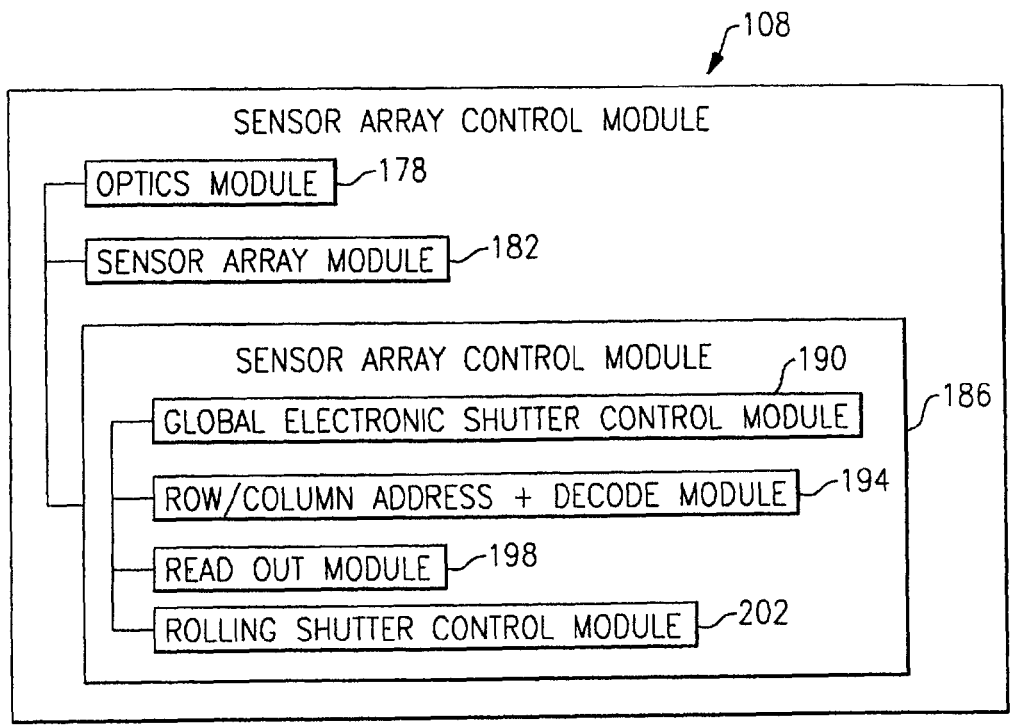
FIG. 5B is a block diagram of one embodiment of an image collection module in an image reader constructed in accordance with the principles of the invention.

As shown in FIG. 5B, the image collection module 108 in one embodiment includes an optics module 178, a sensor array module 182, and a sensor array control module 186 all in electrical communication with each other. The optics module 178 includes an imaging lens or other optical elements used to direct and focus reflected radiation. In some embodiments, the optics module 178 includes associated circuitry and processing capacity that can be used, for example, as part of automatically determining the proper focus for an object, being imaged.

Figure 4A:
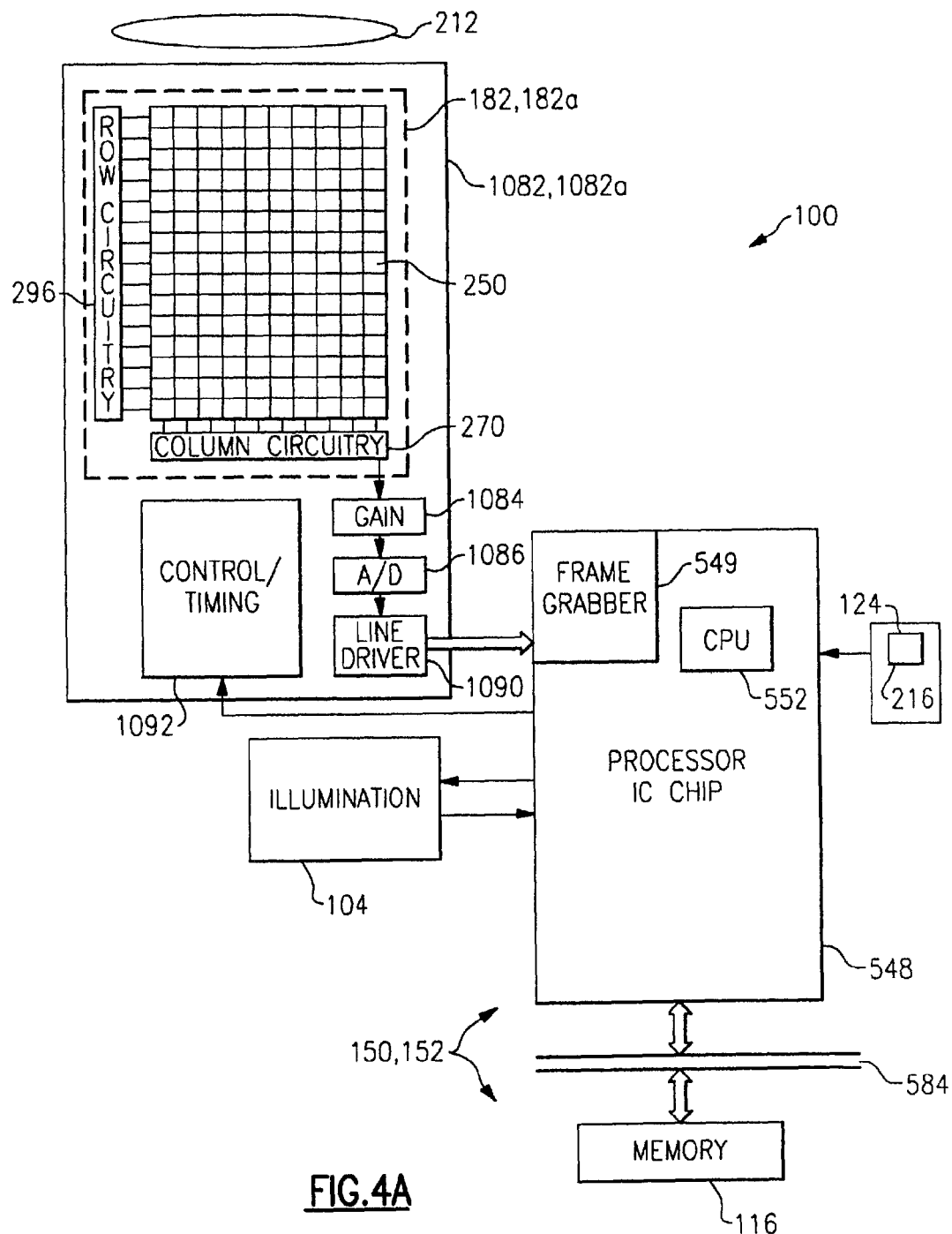
FIG. 4A is a block electrical diagram corresponding to a specific embodiment of the invention.

The sensor array control module 186 includes a global electronic shutter control module 190, a row and column address and decode module 194, and a read out module 198, each of which modules is in electrical communication with one or more of the other modules in the sensor array control module 186. In one embodiment, the sensor array module 182 includes components of an integrated circuit chip 1082 as shown in FIG. 4A with a two-dimensional CMOS based image sensor array 182. In various embodiments, associated circuitry such as analog-to-digital converters and the like can be discrete from the image sensor array or integrated on the same chip as the image sensor array. In an alternative embodiment, the sensor array module 182 can include a CCD sensor array capable of simultaneous exposure and storage of a full frame of image data. As indicated above in one embodiment, the global electronic shutter control module 190 is capable of globally and simultaneously exposing all or substantially all of the pixels in the image sensor array. In one embodiment, the global electronic shutter control module 190 includes a timing module. The row and column address and decode module 194 is used to select particular pixels for various operations such as collection activation, electronic shutter data storage and data read out. The read out module 198 organizes and processes the reading out of data from the sensor array. In some embodiments, the sensor array control module 186 further includes a rolling shutter control module 202 that is capable of sequentially exposing and reading out the lines of pixels in the image sensor array.

A specific embodiment of image reader 100 is described with reference to FIG. 4A. In the embodiment of FIG. 4A and image sensor array 182, 182a having a two-dimensional array of pixels 250 is incorporated onto CMOS integrated circuit (IC) chip 1082, 1082a. As is described later with reference to FIG. 8A, image sensor array 182a is a CMOS image sensor array adapted to operate in a global shutter operating mode. Each pixel 250 of CMOS image sensor array 182a has an on-chip pixel amplifier 254 (shown in FIG. 8A) and an on-chip optically shielded storage area 286 (shown in FIG. 8B and FIG. 8C). Image sensor array 182a may also have a two-dimensional grid of electrical interconnects 262 as shown in FIG. 8A that are in electrical communication with pixels 250. Image sensor array 182a may also have an on-chip row circuitry 296 and column circuitry 270. Row circuitry 296 and the column circuitry 270 may enable one or more various processing and operational tasks such as addressing pixels, decoding signals, amplification of signals, analog-to-digital signal conversion, applying timing, read out and reset signals and the like. Referring to further aspects of CMOS image sensor IC chip 182a, CMOS image sensor IC chip 182a includes, on the same chip as pixels 250 row circuitry 296, column circuitry 270, processing and control circuitry 254 including pixel amplifiers 255, optically shields storage area 258, interconnects 262, a gain circuit 1084, an analog-to-digital conversion circuit 1086 and line driver circuit 1090, which generates a multi-bit (e.g., 8 bit 10 bit) signal indicative of light incident on each pixel 250 of array, the output being presented on a set of output pins of chip 1082a. Referring to additional on-chip elements of image sensor IC chip 1082a, CMOS image sensor IC chip 1082a includes timing/control circuit 1092 which may include such components as a bias circuit, a clock/timing generation circuit, and an oscillator. Timing/control circuit 1092 may form part of sensor array control module 108 as described in connection with FIG. 5B.

Referring to further aspects of image reader 100 of FIG. 4A, image reader 100 includes a main processor IC chip 548, memory module 116, illumination module 104, and actuation module 124. Main processor IC chip 548 may be a multifunctional IC chip having an integrated frame grabber circuit 549 and central processing unit (CPU) 552. Processor IC chip 548 with an integrated frame grabber may be an e.g., an XSCALE PXA27X processor IC chip with "Quick Capture Camera Interface" available from INTEL. Image reader 100 further includes actuation module 124 which generates a trigger signal that initiates a bar code decode process. Actuation module 124 may include a manually actuated trigger 216. Image reader 100 further includes imaging lens 212 and memory module 116 including such memory devices as a RAM, EPROM, flash memory. Memory module 116 is in communication with processor IC chip 548 via a system bus 584. Processor IC chip 548 may be programmed or otherwise configured to carry out various functions required of modules 104, 108, 112, 120, 124, 128, 132, 134, 136, 140, 144, 150, 152, 168, 165 described with reference to FIG. 1A. In the embodiment of FIG. 4A, the functions of dataform decode module 150 and autodiscrimination module 152 are carried by processor IC chip 548 operating in accordance with specific software stored in memory module 116. The combination of processor IC chip 548 and memory module 116 is, therefore, labeled 150, 152 in the embodiment of FIG. 4A.

Figure 4B:
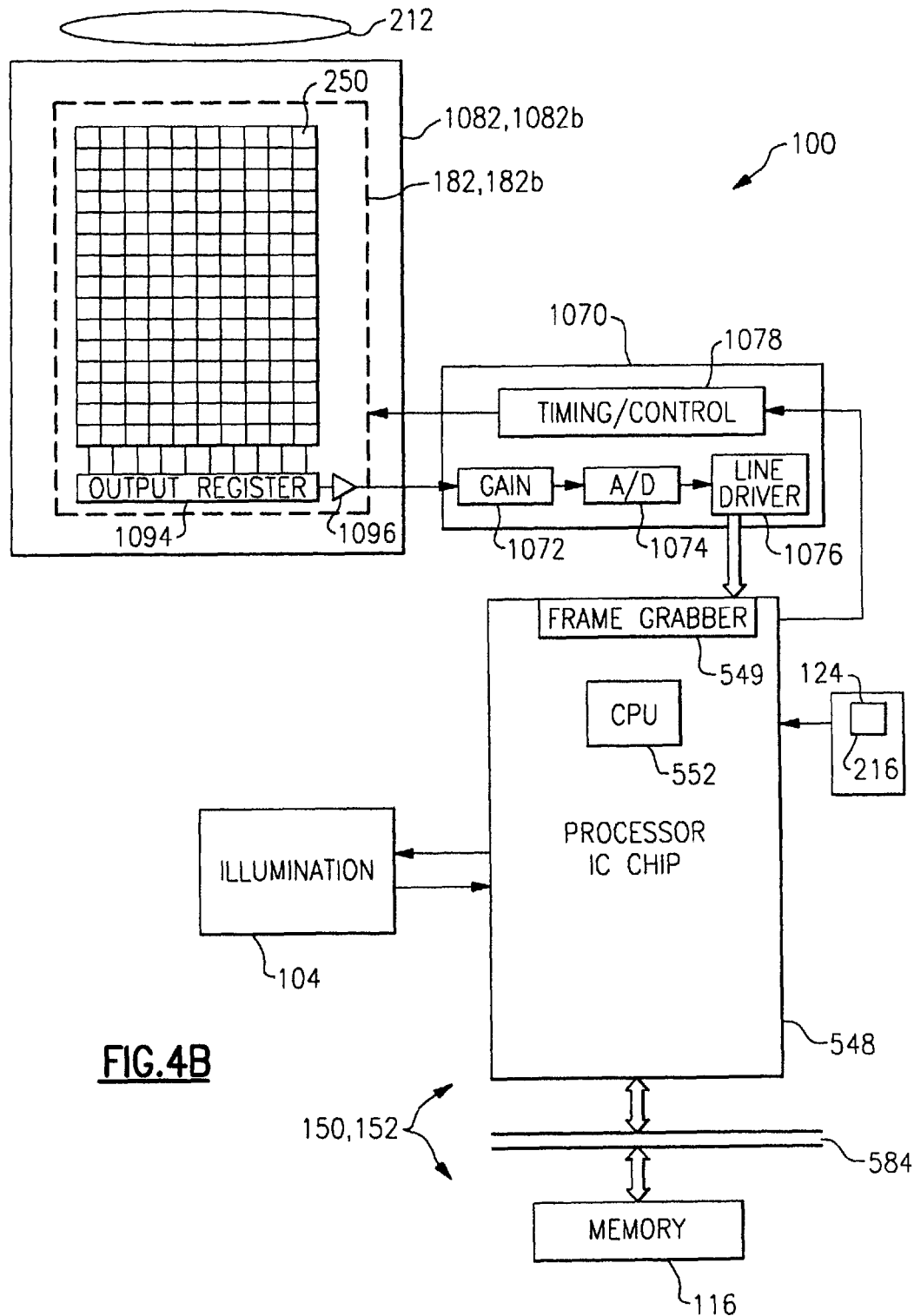
FIG. 4B is a block electrical diagram corresponding to another specific embodiment of the invention.

Referring to FIG. 4B, an embodiment of image reader 100 is shown which has a CCD image sensor chip 1082, 1082b. CCD image sensor IC chip 1082b. CCD image sensor IC chip 1082b includes an area array of pixels 250, a register 1094 and an output amplifier 1096 incorporated onto chip 1082b. Output register 1094 and associated circuitry sequentially converts the charge associated with each pixel into a voltage and sends pixel image signals to a component external to chip 1082b. When actuated to read out image data, charges on a first row of pixels 250 are sequentially transferred to output register 1094. Output register 1094 sequentially feeds charges to amplifier 1096 which converts pixel charges into voltages and supplies signals to image processing circuitry 1070. When charges are transferred from a first row of pixels to output register 1094, charges from a next row move down one row so that when a first row of charges has been converted into voltages, output register 1094 receives charges from a second row of pixels. The process continues until image data corresponding to pixels from all of the rows of image sensor array 182b are read out. Image reader 100 further includes image signal processing circuit 1070 external to chip 1082b. Image signal processing circuit 1070 includes such elements as a gain circuit 1072 an analog-to-digital converter 1074 and a line driver 1076. Timing and control circuit 1078 of circuit 1070 may include such elements as a bias generator, an oscillator, a clock and timing generator. The gain circuit 1072 may also implement additional functionality such as correlated double sampling to reduce to effects of pixel offsets and noise. Additional components of image reader 100 are as shown in FIG. 4A. Image signal processing circuit 1070 may be included in an integrated circuit chip (IC chip) external to image sensor IC chip 1082b.

In one embodiment, components of image collection module 108 and illumination module 104 are provided by any one of the IMAGETEAM™ area (2D) imaging engines, such as the 4000 OEM 2D Image Engine available from Hand Held Products, Inc. of 700 Visions Drive, Skaneateles Falls, N.Y., constructed in accordance with the principles of the invention.

Figure 6:
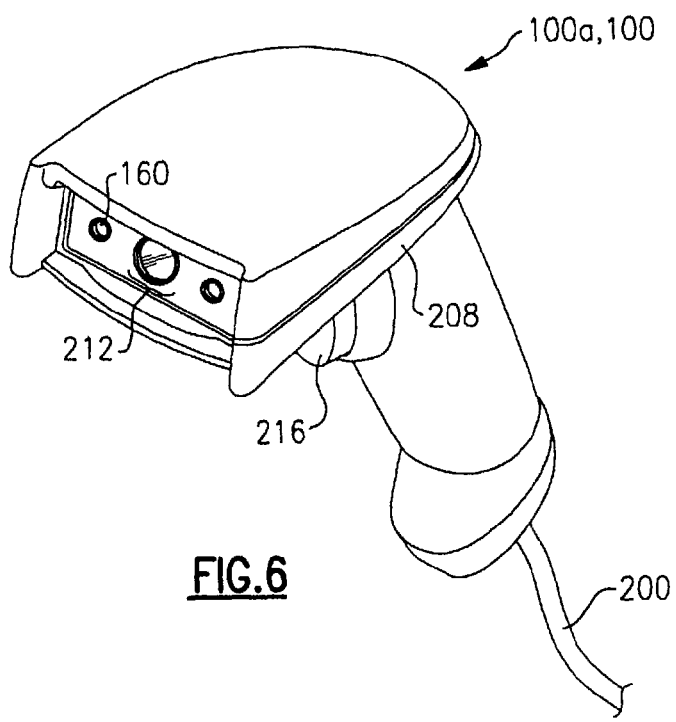
FIG. 6 is a perspective drawing of one embodiment of a hand held image reader constructed in accordance with the principles of the invention.

Referring to FIG. 6, a perspective drawing of a hand held image reader 100a constructed in accordance with one embodiment of the invention is shown. The hand held image reader 100a includes a housing 208, a plurality of light sources 160, a lens 212, a trigger 216, and an interface cable 200. In various embodiments, the functionality of the image reader 100a can be provided by any one of the area (2D) IMAGETEAM™ image readers such as the models 4410, 4600, or 4800 available from Hand Held Products, Inc. and constructed in accordance with the invention. All of the modules 104, 108, 112, 116, 120, 124, 128, 132, 134, 136, 140, 144, 150, 152, 165, and 168 described in connection with FIG. 1A may be incorporated into, and may be supported by hand held housing 208 or alternative housing 506 shown in FIG. 15A such that housing 208 or housing 506 encapsulate and support the various modules. Likewise, all of the components shown in FIGS. 4A and 4B and FIG. 16 may be incorporated into and may be supported by housing 208 or housing 506 such that housing 208 or housing 506 encapsulate and support the various components. Lens 212 may comprise glass and/or polycarbonate. Lens 212 may be a lens singlet or else comprise a plurality of lens components; that is, lens 212 may be a lens doublet or lens triplet, etc.

Referring to FIG. 7, a diagrammatic cross sectional view in combination with a schematic block diagram for the image reader 100 is shown. The image reader 100 includes the light sources 160, an illumination control module 164, a power module 168b, and an interface module 172 all in electrical communication with each other. The light sources 160 direct light energy 162 towards a target 166 including a symbology 170. Reflected radiation 174 from the target 166 is focused by a lens 212 onto an image sensor array 182 in electrical communication with a sensor array control module 186 and the power module 168b. In one embodiment, the image sensor array 182 is a CMOS based image sensor array. In another embodiment, the image sensor array 182 is a CCD based image sensor array. The sensor array control module 186 is further in electrical communication with a memory module 116 and a control module 112 also in electrical communication with the power module 168b and the interface module 172. Often an optical window (not shown) is placed on the front of the scanner to reduce the likelihood of damage to the unit.

Referring to FIG. 8A, a diagram of a portion of a CMOS based image sensor array 182a is shown in more detail. The image sensor array 182a includes a two-dimensional array of pixels 250. Each pixel includes a photosensitive sensitive region 252, processing and control circuitry 254 including amplifier 255 and a shielded storage area 258 (for clarity of presentation, the reference numerals 252, 254, 255, and 258 are provided only with respect to a single pixel). The presence of amplifier 255 means that the CMOS image array 182a is considered an active pixel array; that is, each pixel of the CMOS image array 182a is able to amplify the signal generated from the photo-conversion of incident light energy. The charge-to-voltage conversion circuitry allows the CMOS image array 182a to convert the collected charge into an output signal. The shielded storage area 258 stores collected pixel values until read out so that additional incident radiation impinging on the CMOS image array 182a does not corrupt the value read during the defined exposure period. In addition to pixel amplifier 255, the processing and control circuitry 254 for each pixel 250 may include, among other elements, a reset and select transistor.

In one embodiment, the dynamic range of the CMOS based image sensor array 182a is extended by providing additional intelligence in the processing and control circuitry 254. In particular, the processing circuitry is augmented to include the capacity to dynamically change the conversion factor between the incident radiation input intensity and the output voltage. That is, the processing circuitry employs a transfer curve with multiple slopes. The particular form of the transfer curve with its multiple slopes can take various forms including a series of linear relations joined at knee points, a linear section at low intensity connected to a logarithmic transfer curve at higher intensity, or a completely continuous curve of arbitrary shape with steeper slopes for low intensity and higher slopes at greater intensities.

In the multiple slope embodiment, the dynamic range of the CMOS based image sensor 182a is significantly extended as each individual pixel is capable of independently employing a different section of the transfer curve depending on the intensity of radiation incident upon it. In operation, regions of the CMOS based image sensor 182a that are receiving less incident radiation employ a steeper conversion slope corresponding to greater sensitivity and regions that are receiving more incident radiation employ a shallower conversion slope corresponding to less sensitivity. With a multiple slope transfer function, the CMOS based image sensor 182a can achieve a dynamic range of 65 to 120 dB. The operation of image sensors with transfer curves with multiple slopes are described in more detail in the technical document entitled "Dual Slope Dynamic Range Expansion" from FillFactory NV, Schaliënhoevedreef 20B, B-2800 Mechelen, Belgium. This document is available from the Fill Factory (www.fillfactory.com), for example at http://www.fillfactory.com/htm/technology/htm/dual-slope.htm and is hereby herein incorporated in its entirety. The operation of image sensors with transfer curves with logarithmic slopes are described in more detail in the technical document entitled "LinLog Technology" from Photonfocus AG, Bahnhofplatz 10, CH-8853 Lachen, Switzerland. This document is available from the Photonfocus (www.photonfocus.com), for example at http://www.photonfocus.com/html/eng/cmos/linlog.php and is hereby herein incorporated in its entirety.

Overlaying the pixels 250 in FIG. 8A is a two-dimensional grid of electrical interconnects 262 that are in electrical communication with the pixels 250, the row circuitry 296 (see also FIG. 4A) and the column circuitry 270. The row circuitry 296 and the column circuitry 270 enable one or more processing and operational tasks such as addressing pixels, decoding signals, amplification of signals, analog-to-digital signal conversion, applying timing, read out and reset signals and the like. With on-chip row circuitry 296 and column circuitry 270, CMOS based image sensor array 182a may be operated to selectively address and read out data from individual pixels in an X-Y coordinate system. CMOS based image sensor array 182a may also be operated by way of appropriate programming of image reader 100, to selectively address and read out a portion of the full frame of pixels. For example, in these embodiments the portion of pixels read out can exclude undesired pixels external to a desired pixel region. The portion of pixels read can also represent a sampling of pixels in a region so that individual pixels, rows of pixels, or columns of pixels in the region of interest are not read out. Further details of image reader 100 operating in a windowed frame operating mode in which image reader 100 selectively addresses and reads out image data from less than all pixels of image sensor array 182 is described in connection with FIGS. 28A, 28B, and 28C. In general, image reader 100 can be programmed or otherwise configured to selectively address and read out from CMOS based image sensor array 182a image data from a first plurality of pixels in the array independently of selectively addressing and reading out a second plurality of pixels in the array.

Figure 2A:
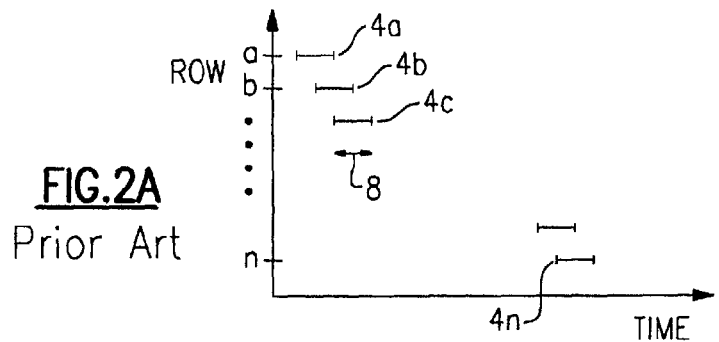
FIG. 2A illustrates the operation of an image sensor employing a rolling shutter architecture according to the prior art.
Figure 2B:
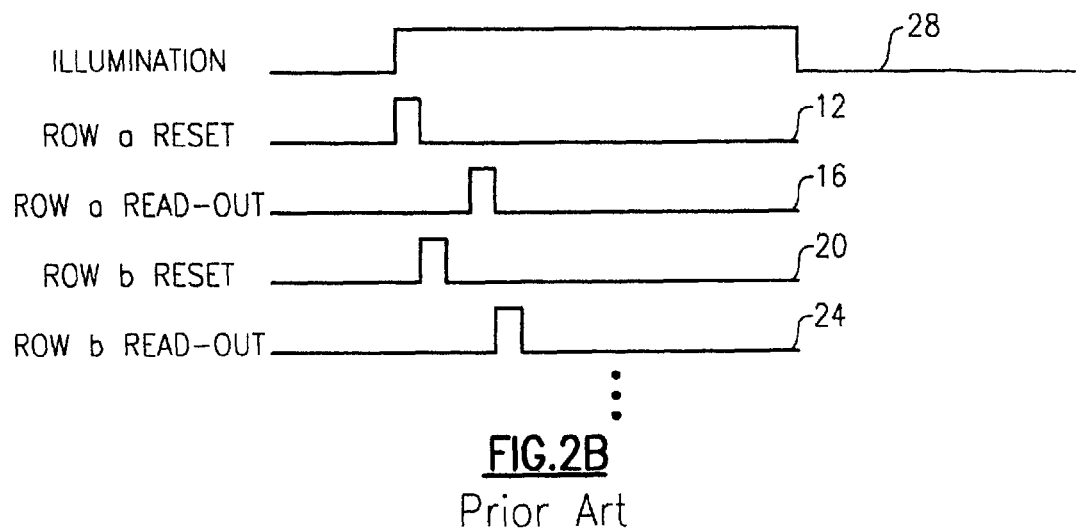
FIG. 2B is a timing diagram used in the prior art rolling shutter architecture presented with respect to FIG. 2A.
Figure 3:
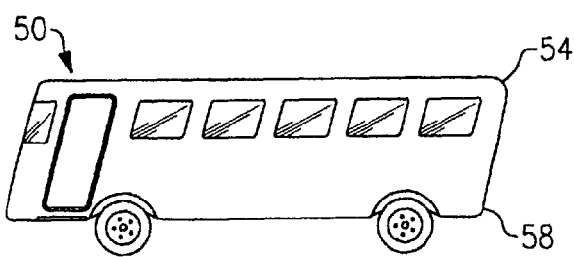
FIG. 3 is a representation of an image taken by a prior art image sensor.
Figure 8C:
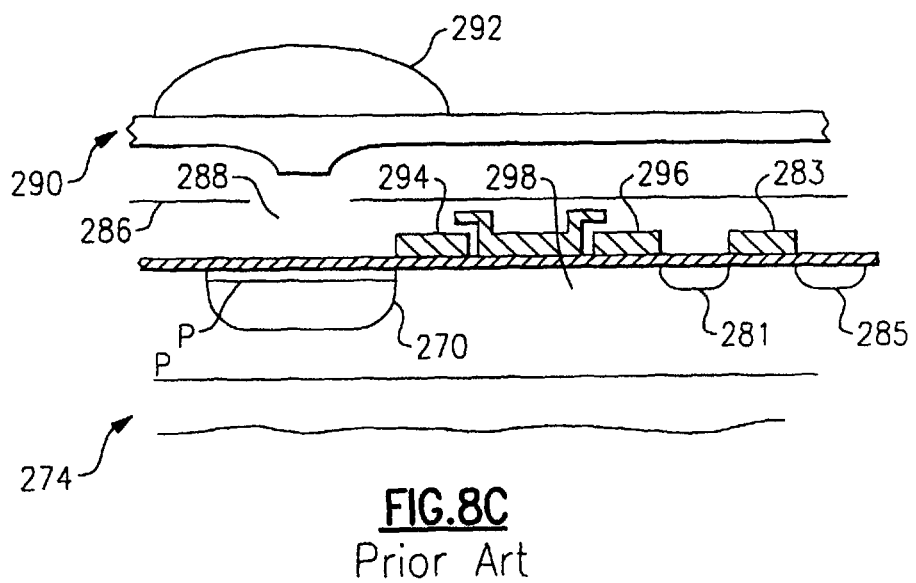
Figure 9:
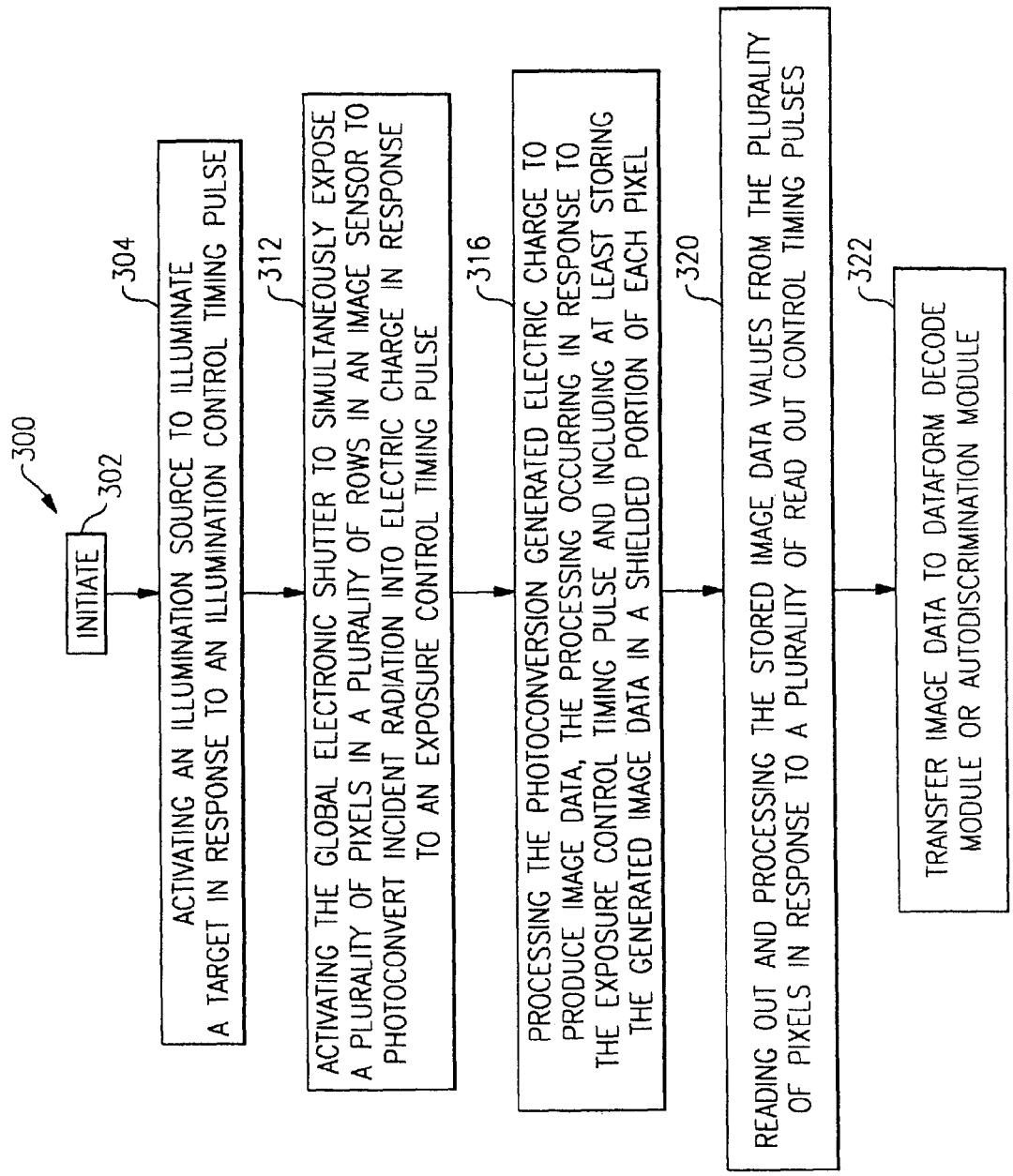
FIG. 9 is a flow chart illustrating one embodiment of a process for collecting image data according to the principles of the invention.

In one embodiment, the pixel architecture can be as described in U.S. Pat. No. 5,986,297 assigned to Eastman Kodak Company and entitled "Color Active Pixel Sensor with Electronic Shuttering, Anti-blooming and Low Cross-talk." In particular at column 3 lines 35 to 55 and at column 5 lines 25 to 55, the patent describes the cross sections of the relevant regions of the pixel architectures shown in the patent's FIGS. 1A and 2A (herein reproduced as FIGS. 8B and 8C). The disclosure states that the pixel in FIG. 8B comprises a photodiode 270 with a vertical overflow drain 274, transfer gate 276, floating diffusion 280, reset gate 282, reset drain 284, and a light shield 286. A light shield aperture 288, color filter 290, and micro lens 292 are placed over the photodetector such that light is focused through micro lens 292 into light shield aperture 288 after passing through color filter 290. Therefore, the light entering photodiode 270 has a wavelength that is within a predetermined bandwidth as determined by the color filter 290. The patent describes FIG. 8C as showing a second pixel architecture that is similar in many respects to the embodiment shown in FIG. 8B except that there are two transfer gates 294, 296, and a storage region 298. In both cases the light shield is constructed by effectively covering all regions except the photodetectors (photodiode 270 in this case), with an opaque layer or overlapping layers, so that incident light falls only on the photodiode area. Creation of an aperture in a light shield that limits the creation of photoelectrons to the photodetector region suppresses crosstalk between pixels. In FIG. 8C, the floating diffusion is labeled 281, the reset gate is labeled 283, and the reset drain is labeled 285. In some embodiments employing the pixel architecture described in U.S. Pat. No. 5,986,297, the color filter 290 may be omitted, and in other embodiments the microlens 292 may be omitted.

A process 300 for collecting image data from a target with the image reader 100 is presented with respect to FIGS. 9, 10A, 10B, 10C and 10D. In various embodiments the target can contain a symbology such as a one or two-dimensional bar code. At step 302, actuation module 124 initiates process 300 in response e.g., to trigger 216 being depressed or to a sensing of a presence of an object in a field of view of image reader 100. In one embodiment, control module 112 may receive a trigger signal in response to a depressing of trigger 216 or the sensing of an object and responsively present a series of control signals to various modules, e.g., illumination module 104 and image collection module 108 in accordance with process 300. The process 300 includes activating (step 304) an illumination source to illuminate the target with illumination light 162. In one embodiment, the activation of the illumination source occurs in response to an illumination control timing pulse 350. The illumination of the target by the activated illumination source occurs for the duration of the illumination control timing pulse 350. In one embodiment, the illumination source is the light source 160 and the illumination control timing pulse 350 is generated by the illumination control module 164 in the illumination module 104. The process 300 also includes activating the global electronic shutter to simultaneously expose (step 312) a plurality of pixels in a plurality of rows in an image sensor array to photoconvert incident radiation into electric charge. The simultaneous activation of the plurality of pixels occurs in response to an exposure control timing pulse 354. In one embodiment, the simultaneous activation of the plurality of pixels occurs in response to a start portion 360 of the exposure control timing pulse 354. In a further embodiment, the exposure control timing pulse 354 is generated by the global electronic shutter control module 190 (FIG. 5B) of the sensor array control module 186.

In one embodiment for collecting an image of a target that minimizes translational image distortion, the target is illuminated by overdriving the illumination sources, such as LEDs, to generate illumination several times brighter than standard operation. Referring to an example of the invention wherein image reader 100 includes imaging module 1802 as shown in FIGS. 33-35, LEDs 160c through 160t (that is, 160c, 160d, 160e, 160f, 160g, 160h, 160i, 160j, 160k, 160l, 160m, 160n, 160o, 160p, 160q, 160r, 160s, and 160t) each may have a standard recommend maximum DC operation current draw rating of 40 mA (100% LED current) but may be overdriven to draw more than e.g., 60 mA (150% current), or 80 mA (200% current) throughout the duration of illumination timing pulse 350, or any one of pulses 350', 350", 350''' described herein. LEDs 160c through 160t, where LEDs 160c through 160t have a standard recommended maximum DC operating current draw rating of 40 mA, may also be overdriven to draw more than e.g., 120 mA (300% current), 160 mA (400% current), 200 mA (500% current), or 500 mA (1,250% current) throughout the duration of timing pulse 350 or any one of pulses 350', 350", 350''' described herein. Illumination timing pulse 350, 350', 350", 350''' are shown as DC drive current pulses. However, according to the invention as indicated by FIG. 10E, pulses 350, 350', 350", 350''' can also be pulse modulated or "strobed" pulses such that each pulse 350, 350', 350", 350''' comprise a series of short duration individual pulses for driving LEDs 160. Substituting a pulsed driving signal for a DC driving signal reduces the duty cycle of LEDs, and thus the power dissipated in the LEDs. Since in many cases the LED operating life is determined by the maximum junction temperature of the LED die, reduced power dissipation reduces the junction temperature. The net effect is that a higher peak current can be tolerated while not exceeding the maximum operating junction temperature limit for the LED die. In general, reducing the duty cycle of LEDs 160 increases the amount of current that can be safely driven through LEDs. The strobing rate of a "strobed" or "pulsed" illumination control pulses as described herein may be, e.g., 1,000 Hz to 10,000 Hz. According to this embodiment, the overdriven illumination sources in combination with the electronic global shutter allows for short exposure periods. That is, the bright illumination allows for a short integration time for each pixel and the global electronic shutter allows for all of the pixels in the image sensor to be simultaneously sensitive. With a short exposure period for a brightly illuminated target, an image reader of the present invention is able to collect a sharp non-distorted image even when the target is moving relative to the image reader. In one embodiment, the exposure period is less than 3.7 milliseconds. In one embodiment in which the light sources are overdriven, light sources with different colors are employed. For example, in one such embodiment the image reader includes white and red LEDs, red and green LEDs, white, red, and green LEDs, or some other combination chosen in response to, for example, the color of the symbols most commonly imaged by the image reader. In this embodiment, the different colored LEDs are each alternatively pulsed at a level in accordance with the overall power budget. In another such embodiment, both colored LEDs are pulsed each time but each at a relatively lower power level so that the overall power budget is again maintained. In a further embodiment, red, green, and blue LED's can be interleaved to simulate white light.

Various embodiments of imaging module 1802 of image reader 100 are described with reference to FIG. 37. LEDs 160 of imaging module 1802 may be divided into banks as indicated in the chart of FIG. 37. Image reader 100 can be configured so that LEDs of each bank emits light in a certain emission wavelength band. In embodiment 8 depicted in the chart of FIG. 37, image reader 100 is configured so that aiming LEDs 160a, 160b emit green light and all illumination LEDs 160c through 160t emit red light. Additional embodiments are described in the chart of FIG. 37. Image reader 100 can be configured so that the light sources for the various banks may be energized simultaneously (e.g., bank 1, bank 2, bank 3, bank4 simultaneously energized) or sequentially (e.g., bank 1, then bank 2, then bank 3, then bank 4) by the illumination timing control pulse 350, 350', 350", 350'''.

Referring again to FIGS. 9, 10A, 10B, 10C, and 10D the process 300 also includes processing (step 316) the photoconversion generated electric charge to produce image data.

As discussed above, the processing can include, for example, amplifying the data generated from the incident radiation. The processing further includes storing the generated image data values in a shielded portion of each of the plurality of pixels. The process 300 additionally includes reading out and processing (step 320) the stored image data values from the plurality of pixels. As discussed above, the processing can include amplifying the data generated from the incident radiation and converting the generated data into a digital signal. The processing (step 320) can also include storing a set of digital signal values corresponding to incident light on the plurality of pixels of image sensor array module 182 as a frame of image data. Image reader 100 at step 320 may store into memory module 116 a frame of image data including a plurality of N-bit (grey scale) pixel values, each pixel value representing light incident at one of the plurality of pixels. In one embodiment, the reading out of the plurality of pixels is controlled by a read out timing control pulse 368 generated by the read out module 198 of the sensor array control module 186. In one embodiment, the read out timing control pulse 368 includes a plurality of pulses transmitted to each of the plurality of pixels. In one embodiment, at least a portion of the illumination control timing pulse 350 occurs during the exposure control timing pulse 354. In one such embodiment, the operation of the image collection module 104 including the sensor array control module 186 with the global electronic shutter control module 190 is coordinated with the operation of the illumination module 104 including the illumination control module 164 by the control module 112 to achieve the overlap in the illumination 350 and exposure 354 control timing signals.

Figure 10A:
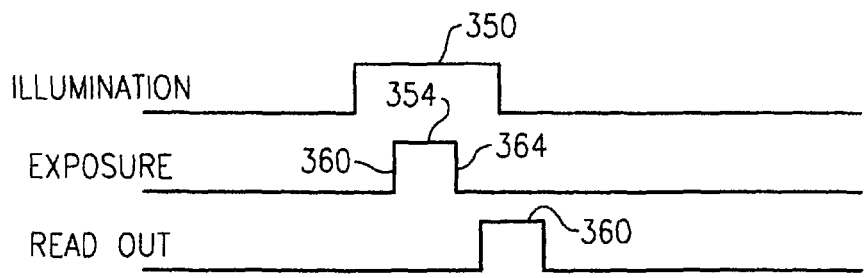
FIGS. 10A, 10B, 10C, and 10D are timing diagrams for various embodiments of the process of FIG. 9.
Figure 10B:
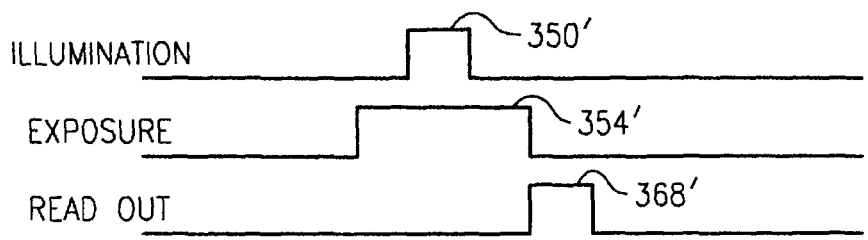
Figure 10C:
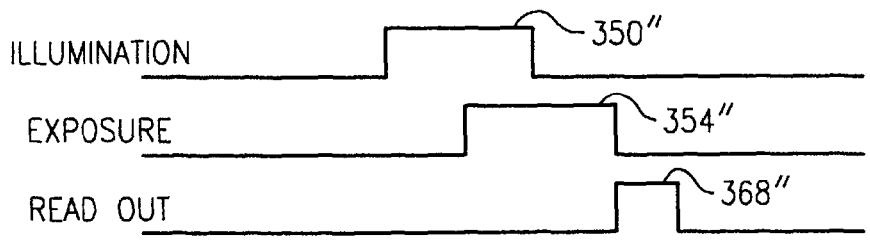
Figure 10D:
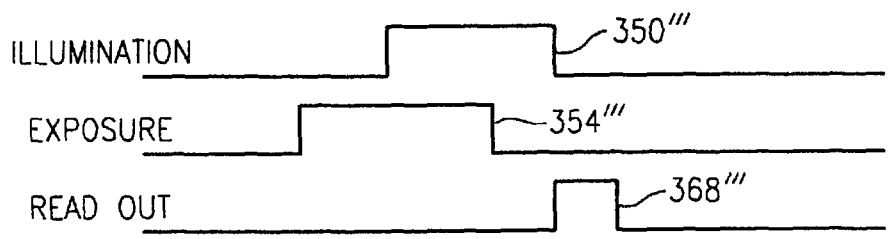
Figure 10E:
FIG. 10E illustrates an illumination control timing pulse including a plurality of individual pulses.

In one embodiment as shown in FIG. 10A, the exposure control timing pulse 354 begins after and finishes before the illumination control timing pulse 350. The read out control timing pulse 368 begins at the conclusion of the illumination control timing pulse 350. In another embodiment as shown in FIG. 10B, the illumination control timing pulse 350' begins after and finishes before the exposure control timing pulse 354'. In this embodiment, the read out control timing pulse 368' begins at the conclusion of the exposure control timing pulse 354'. In further embodiments the exposure control timing pulse and the illumination control timing pulse overlap each other while occurring sequentially. In one such embodiment as shown in FIG. 10C, this sequential operation can include the illumination control timing pulse 350" starting, the exposure control timing pulse 354" starting, the illumination control timing signal pulse 350" ending, and then the exposure control timing pulse 354" ending. In this embodiment, the read out control timing pulse 368" begins at the conclusion of the exposure control timing pulse 354". In a further such embodiment as shown in FIG. 10D, the sequential operation can include the exposure control timing pulse 354''' starting, the illumination control timing pulse 350''' starting, the exposure control timing pulse 354''' ending, and then the illumination control timing signal pulse 350''' ending. In this embodiment, the read out control timing pulse 368''' begins at the conclusion of the illumination control timing signal pulse 350'''. As discussed in connection with FIG. 10E, each illumination control timing pulse 350, 350', 350", 350''' described herein may comprise a plurality of short duration individual pulses.

Referring again to imaging module 1802, an image reader 100 having imaging module 1802 may have an operating mode in which aiming LEDs 160a, 160b are controlled to be off or de-energized during exposure control timing pulse 354, 354', 354", or 354''' so that light from LEDs 160a, 160b does not influence an image that is collected and transferred to decode module 150 or autodiscrimination module 152. In another embodiment, aiming illumination LEDs 160a, 160b, in addition to illumination LEDs 160c through 160t, are controlled to be energized during exposure control timing pulse 354, 354', 354", or 354'''. Controlling aiming illumination LEDs 160c through 160t to be energized during exposure control timing pulse 354, 354', 354", or 354''' increases a signal strength of image data corresponding regions of substrate, s, onto which aiming pattern 1838 is projected.

With reference to process 300 (FIG. 9), image reader 100 may be configured so that illumination control pulse 350, 350', 350", or 350''' at step 304 simultaneously energizes at least one of aiming LED 160a or 160b and at least one of illumination LEDs 160c through 160t so as to increase the intensity of illumination on substrate, s, and specifically the regions of substrate, s, onto which illumination pattern 1830 and aiming pattern 1838 are simultaneously projected. A decoding process carried out by decode module 150 or autodiscrimination module 152 where an image is collected pursuant to an exposure period wherein aiming LEDs 160a, 160b and illumination LEDs 160c through 160t are simultaneously energized may include a process wherein image data corresponding pattern 1838 (that is, image data corresponding to pixels of array onto which pattern 1838 is imaged) is selectively subjected to a decoding process such as a finder pattern locating process, a linear bar code symbol decode attempt or a quiet zone locating process. For example, with aiming pattern 1838 horizontally extending across a field of view, decode module 150 processing a collected full frame image may selectively analyze image data corresponding to center rows of image sensor 182 (i.e., image data corresponding to rows 2802 shown in FIG. 28a) for purposes of locating a finder pattern, decoding a linear bar code symbol, or locating a quiet zone where an image is collected pursuant to a frame exposure period wherein at least one aiming LED 160a, 160b and at least one illumination LED 160c through 160t are simultaneously energized. At step 320 of process 300 carried out with illumination control pulse 350, 350', 350", or 350''' simultaneously energizing at least one aiming illumination LED e.g., 160a and at least one illumination LED, e.g., 160t, image reader 100 may collect either a full frame or a "windowed frame" of image data as is described in greater detail in connection with FIGS. 28A-28C. Image reader 100 may be configured so that where image reader 100 at step 320 collects a windowed frame of image data and at step 304 simultaneously illuminates at least one aiming illumination LED and at least one illumination LED, the windowed frame corresponds to the size and shape of illumination pattern 1838. For example, where image reader 100 projects horizontal line aiming pattern 1838, the windowed frame of image data readout at step 320 may be a windowed frame of image data corresponding to rows 2802 shown in FIG. 28A onto which pattern 1838 is imaged which is then processed as described herein (e.g., by attempting to decode linear bar code symbol by locating a quiet zone or by locating a finder pattern). In embodiments of the invention wherein aiming illumination LEDs and illumination LEDs are simultaneously driven by illumination control pulse 350, 350', 350", or 350''', the aiming LEDs 160a, 160b and illumination LEDs 160c through 160t may be overdriven throughout the duration of pulse 350, 350', 350", or 350''' as has been described herein.

In one embodiment the CMOS image array 182a can be implemented with a KAC-0331 640×480 VGA CMOS image sensor available from the Eastman Kodak Company. The KAC-0311 is more fully described in a technical description entitled, "KAC-0311 640×480 VGA CMOS IMAGE SENSOR Fully Integrated Timing, Analog Signal Processing & 10 bit ADC." Revision 1 dated Aug. 5, 2002 and available at http://www.kodak.com/global/plugins/acrobat/en/digital/ccd/products/cmos/KAC-0311LongSpec.pdf, hereby incorporated by reference in its entirety. The following is an edited summary of the operation of the KAC-0311 taken from the aforementioned "Full Specification." As summarized in this technical description, the KAC-0311 is a solid state active CMOS imager that integrates analog image acquisition, digitization, and digital signal processing on a single chip. The image sensor comprises a VGA format pixel array with 640×480 active elements. The image size is programmable by a user to define a window of interest. In particular, by programming the row and column start and stop operations, a user can define a window of interest down to a resolution of 1×1 pixel. In one embodiment of the KAC-0311 image sensor, the window can be used to enable a digital zoom operation of a viewport that can be panned. In another embodiment of the KAC-0311 image sensor, a constant field of view is maintained while subsampling is used to reduce the resolution the collected image.

The pixels of the KAC-0311 image sensor are on a 7.8 µm pitch. The pixel architecture is Kodak's pinned photodiode architecture. The KAC-0311 image sensor is available in a Monochrome version without microlenses, or with Bayer (CMY) patterned Color Filter Arrays without microlenses. In one embodiment of the KAC-0311 image sensor, integrated timing and programming controls are used to enable progressive scan modes in either video or still image capture operation. In a further embodiment of KAC-0311 image sensor, a user can program the frame rates while maintaining a constant master clock rate.

In the KAC-0311 image sensor, the analog video output of the pixel array is processed by an on-chip analog signal pipeline. In one embodiment of the KAC-0311 image sensor, correlated double sampling is used to eliminate pixel reset temporal and fixed pattern noise. In a further embodiment of the KAC-0311 image sensor, a frame rate clamp is used to enable contemporaneous optical black level calibration and offset correction. In yet another embodiment, the programmable analog gain of the KAC-0311 image sensor includes a global exposure gain to map the signal swing to the analog-to-digital converter input range. The programmable analog gain further includes white balance gain to perform color balance in the analog domain. In an additional embodiment, the analog signal processing chain of the KAC-0311 image sensor consists of column op-amp processing, column digital offset voltage adjustment, white balancing, programmable gain amplification, global programmable gain amplification, and global digital offset voltage adjustment. In one embodiment, the digitally programmable amplifiers are used to provide contemporaneous color gain correction for auto white balance as well as exposure gain adjustment. The offset calibration in various embodiments is done on a per column basis and globally. In addition, the per column offset correction can be applied by using stored values in the on-chip registers, and a ten-bit redundant signed digit analog-to-digital converter converts the analog data to a ten-bit digital word stream. In various embodiments of the KAC-0311 image sensor, the differential analog signal processing pipeline is used to improve noise immunity, the signal to noise ratio, and the system's dynamic range. In one embodiment, the serial interface of the KAC-0311 is an industry standard two line I²C compatible serial interface. In another embodiment, power for the KAC-0311 image sensor is provided by a single 3.3V power supply. In various embodiments, the KAC-0311 image sensor has a single master clock and operates at speeds up to 20 MHz.

Figure 11:
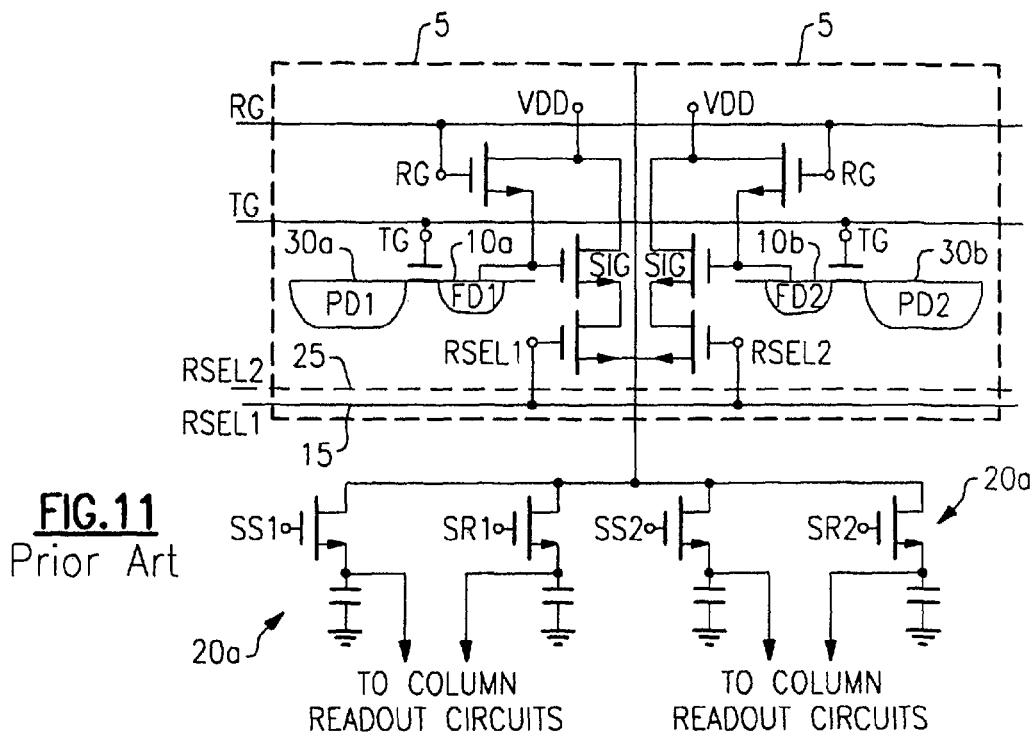
FIG. 11 is a schematic diagram of a portion of an image sensor according to the prior art.
Figure 12:
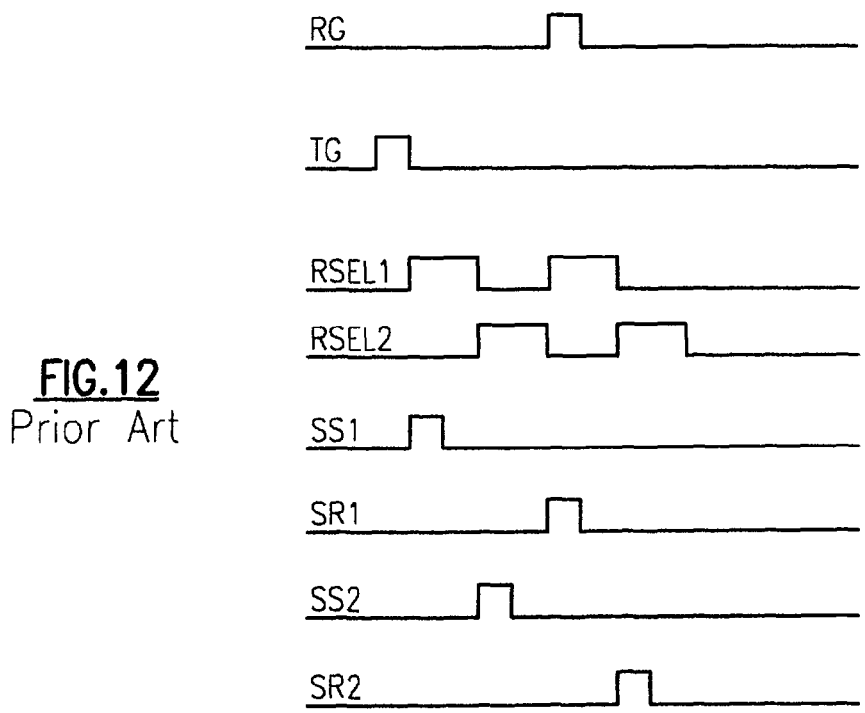
FIG. 12 is a timing diagram for the prior art image sensor of FIG. 11.

The operational and physical details of image sensors that can be used in the present invention and that are assigned to Eastman Kodak Company are also described in the U.S. Pat. No. 6,714,239 entitled "Active Pixel Sensor with Programmable Color Balance" and U.S. Pat. No. 6,552,323 entitled "Image Sensor with Shared Output Signal Line," each of which is hereby herein incorporated by reference in its entirety. The following provides a brief summary of material from U.S. Pat. No. 6,522,323. In particular U.S. Pat. No. 6,552,323 discloses an image sensor comprising a plurality of pixels arranged in a plurality of rows and columns. The image sensor is further disclosed to include a global electronic shutter. Pixels in the same row of the disclosed image sensor share a pixel output node and an output signal line. Further, the disclosure indicates that image signal separation within a row is achieved by having two separate row select signal lines per row, one for every other pixel within a row, and a 1:2 column output signal line de-multiplexing scheme for each pair of columns. A schematic diagram, here reproduced as FIG. 11, shows two adjacent pixels 5. Identifiers used in the schematic include the following: reset transistor with a reset gate (RG), transfer gate (TG), signal transistor (SIG), row select transistor with a row select gate (RSEL), photodetector (PD), and floating diffusion (FD). The operation of the global shutter is described at column 3 lines 25-45 of U.S. Pat. No. 6,552,323 with respect to the embodiment presented in FIG. 11 and timing diagrams, here reproduced as FIG. 12. The disclosure indicates that readout commences by transfer of the integrated signal charge from the photodetectors 30*a*, 30*b* to the floating diffusions 10*a*, 10*b* in each pixel of the sensor simultaneously. Next, row select 1 (15) is turned on and the signal level of floating diffusion 1 (10*a*) is sampled and held by the column circuit 20*a* by pulsing SS1. Row select 1 (15) is then turned off and row select 2 (25) is turned on and the signal level of floating diffusion 2 (10*b*) is sampled and held by the column circuit 20*b* by pulsing SS2. The floating diffusions 10*a*, 10*b* in the row being read out are then reset by pulsing RG. Next row select 2 (25) is turned off and row select 1 (15) is turned on and the reset level of floating diffusion 1 (10*a*) is sampled and held by the column circuit 20*a* by pulsing SR1. Row select 1 (15) is then turned off and row select 2 (25) turned on and the reset level of floating diffusion 2 (10*b*) is sampled and held by pulsing SR2. The readout of the sampled and held signals of the column circuits 20*a*, 20*b* is then done prior to the same pixel readout scheme commencing in the next row of the image sensor.

In another embodiment, the CMOS image array 182*a* can be implemented with a KAC-9630 128(H)×98(V) CMOS image sensor. The KAC-9630 is more fully described in a technical specification entitled, "Device Performance Specification—Kodak KAC-9630 CMOS Image Sensor," September 2004, revision 1.1. This document is hereby herein incorporated by reference in its entirety. This document is available from Eastman Kodak (www.kodak.com), for example at http://www.kodak.com/global/plugins/acrobat/en/digital/ccd/products/cmos/KAC-9630LongSpec.pdf. This technical specification describes the KAC-9630 image sensor as a low power CMOS active pixel image sensor capable of capturing monochrome images at 580 frames per second. In addition the KAC-9630 image sensor is described as including an on-chip eight-bit analog-to-digital converter, fixed pattern noise elimination circuits and a video gain amplifier. The KAC-9630 is further described as having integrated programmable timing and control circuitry that allows for the adjustment of integration time and frame rate. The read out circuit in the KAC-9630 image sensor is described as capable of supporting a full frame read out on a single eight-bit digital data bus in less than 2 milliseconds. As indicated above, the KAC-9630 image sensor is described as including an integrated electronic shutter.

In another embodiment, the CMOS image array 182a can be implemented with a Micron image sensor such as the Wide VGA MT9V022 image sensor from Micron Technology, Inc., 8000 South Federal Way, Post Office Box 6, Boise, Id. 83707-0006. The MT9V022 image sensor is describe in more detail in the product MT9V099 product flyer available from Micron Technology (www.micron.com), for example at http://download.micron.com/pdf/flyers/mt9v022_(mi-0350)_flyer.pdf. This document is hereby herein incorporated by reference in its entirety.

Figure 20:
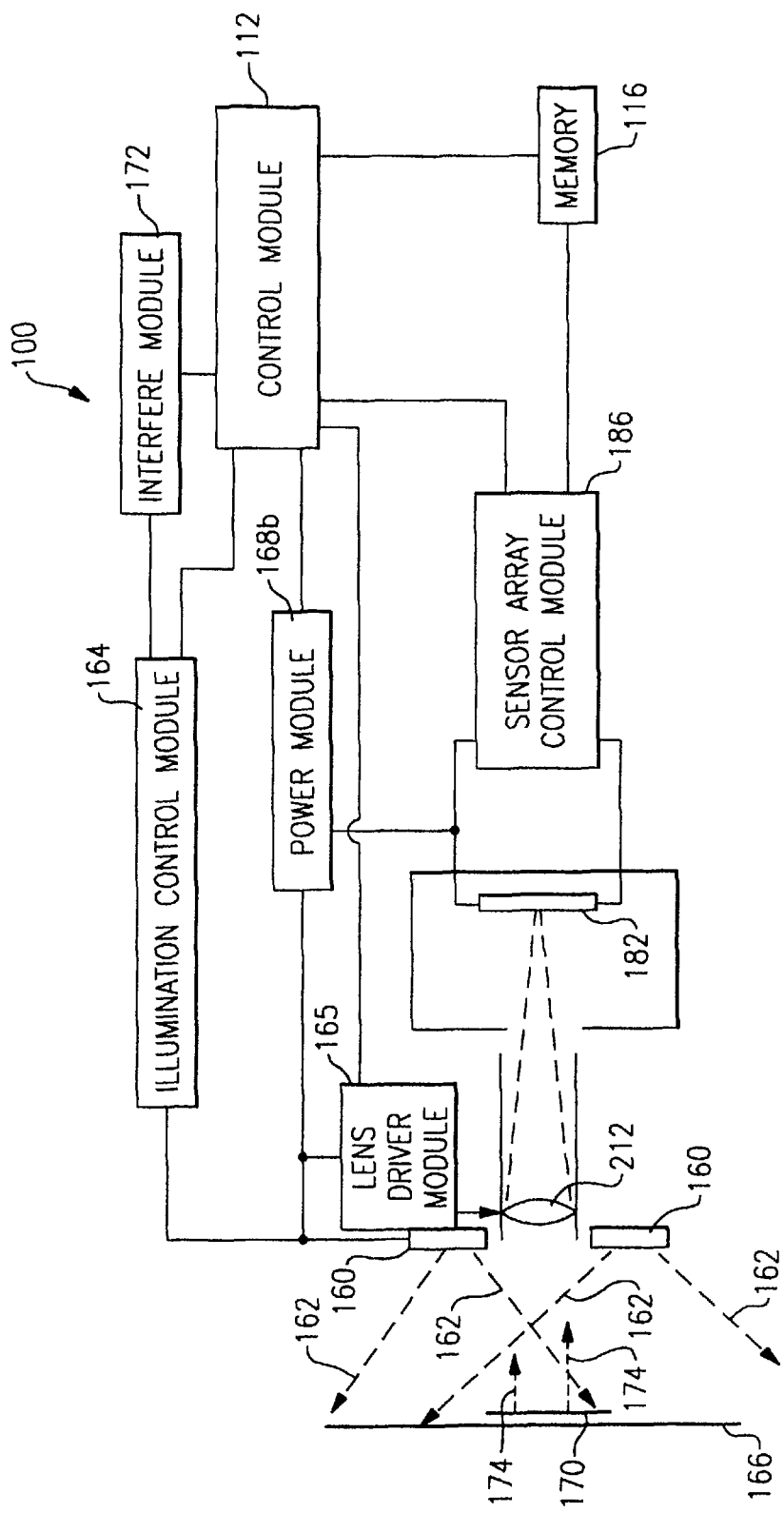
FIG. 20 is a schematic block diagram of one embodiment of a lens driver constructed in accordance with the principles of the invention.

In some embodiments, the image reader 100 is capable of operating in either a rolling shutter mode or a global electronic shutter mode. In one such embodiment, the rolling shutter mode is used as part of an automatic focusing operation and the global electronic shutter mode is used to collect image data once the proper focus has been determined. The process of determining the proper focus and collecting a subsequent image is described by the process 400 shown in FIG. 13. Actuation module 124 may generate a trigger signal to initiate process 400 in response to e.g., a depressing of a trigger 216 by an operator or in response to an object being moved into a field of view of image reader 100. In operation when a new image is collected by the image reader 100, the image reader 100 illuminates (step 404) a target containing an object, such as a bar code, and enters (step 408) a rolling shutter operational mode in which a plurality of rows in the image reader's image sensor are sequentially exposed. As part of this operation, a frame exposure period can be defined as the time from the beginning of the exposure of the first row of the plurality of rows to the end of the exposure of the last row of the plurality of rows. In one embodiment, an imaging lens 212 of the image reader 100 is controlled to be in one of continuous motion or in stepwise continuous motion (step 414) during at least a portion of the frame exposure period. As shown in the embodiment of FIG. 20, image reader 100 may have a lens driver module 165 controlled by control module 112 or another module for moving imaging lens 212 to change a focus setting of image reader 100. In one such embodiment, the optical system has a plurality of discrete settings. For each discrete setting, lens 212 forms a distinct image on the image sensor for objects located at a particular distance from the image reader 100. In one embodiment, one extreme of the optical system's focusing range corresponds to focusing incident radiation from objects located at infinity. An object is considered to be at "infinity" if its incident light rays are essentially parallel. In one embodiment, another extreme of the optical system's focusing range is the near point of the optical system. The near point of the optical system is the closest distance an object can be brought with respect to the optical system where the optical system is still able to create a distinct image of the object. In another embodiment, the variation of in the focus of the optical system does not cover the entire range of the optical system. For example in one such embodiment, a focus setting of image reader 100 is varied between focus settings that are millimeters apart. In another embodiment, a focus setting of image reader 100 is varied between focus settings that are centimeters apart. Configuring reader 100 to include lens driver module 165 allows a scanner to operate over an extended depth of field.

With further reference to lens driver module 165, various lens driving technologies and methods can be implemented. U.S. Pat. No. 4,350,418, incorporated by reference herein in its entirety, discloses a lens focus adjustment system including a distance adjusting ring, wherein position adjustment of a lens is achieved by rotation of the adjustment ring. U.S. Pat. No. 4,793,689, also incorporated herein by reference in its entirety, discloses a lens barrel having a hollow rotary ring rotatable about an optical axis that is disposed within a hollow of a hollow fixed cylinder with a bearing interposed there between, a moving cylinder moveable in response to rotation of the rotary ring, and a vibration wave motor disposed between the diametrical directions of the fixed cylinder and the rotary ring. U.S. Pat. No. 5,541,777, also incorporated herein by reference in its entirety, discloses an electromagnetic lens driver having a fixed member including an inside yoke and an outside yoke, an operationally disposed magnet, a moveable member for holding a body to be driven, a coil wound in an axial direction between the outside yoke and the inside yoke and position detector which detects the magnetic field of the operationally disposed magnet to generate a position indicating signal.

The process 400 also includes reading out (step 420) image data from the plurality of exposed rows. This image data is analyzed (step 424) by an automatic focusing algorithm, such as the contrast detection method or the phase detection method. Using the row focus image information, the image reader 100 establishes (step 428) a proper focus setting of lens 212 e.g., by determining a proper focus setting based on collected data and then moving the lens 212 to that setting or by assessing the present row image data to determine whether at the present focus setting, the image reader is acceptably focused. In various embodiments, the analysis of the image data can be performed by the image collection module 108, the optics module, the control module 112, or a dedicated auto-focusing module (e.g., an ASIC or FPGA dedicated for purposes of performing focus calculations). With the position of lens 212 properly established, the image reader 100 enters (step 432) a global electronic shutter operational mode. It will be seen that in certain instances according to process 400, image reader 100 may cease operation in a rolling shutter and commence operation in a global electronic shutter operational mode prior to reading out image data from each pixel of image sensor array module 182. In the global electronic shutter operational mode, the image reader 100 collects (step 436) a full frame of image data that is stored in memory module 116 and subsequently transferred to decode module 150 or autodiscriminating module 152 by control module 112. According to this embodiment in which row image information is read out and analyzed during a time that the reader imaging lens 112 is controlled to be in motion, automatically focusing the image reader to image the target may be achieved within one frame of data. In various embodiments, the automatic focusing operations can be handled by a dedicated automatic focusing module or the focusing module can be incorporated into other modules such as the image collection module 108 and/or the control module 112.

With further reference to the steps of process 400, the step 424 of analyzing row image data to determine focus characteristics is further described with reference to the flow diagram of FIG. 21, and the histogram plots of FIG. 22a and FIG. 22b. At step 2102 image reader 100 may construct a histogram plot of pixel values of the present row of image data read out at step 420. FIG. 22A is a histogram plot of pixel values of a row of data corresponding to a bi-tonal image (such as in a bar code symbol on a monochrome substrate) that is acceptably focused. Histogram plot 2108 represents a high contrast image and includes numerous pixel values at the high end of the grey scale, numerous pixel values at the low end of the grey scale, and few pixel values at the center grey scale range. FIG. 22B is a histogram plot of pixel values of a row of data corresponding to a poorly focused bi-tonal image. The image data summarized by histogram 2110 is "flatter" lower contrast image data, meaning that it has fewer pixel values at extremes of the grey scale and a larger number of pixel values at a center of the grey scale. Accordingly, it can be seen that a focus level of an image can readily be determined utilizing image contrast information.

At step 2104 image reader 100 assesses the collected histogram data. At step 2104 image reader 100 may either determine an appropriate in-focus setting for lens 212 or else determine whether the histogram data extracted from the present row of image data indicates that the image reader is acceptably focused at the present lens setting or position. Where image reader 100 at step 2104 determines a proper setting for lens 212 based on the collected histogram data, the histogram data may be from the present row or based on a combination of present row data and preceding row data. In a further aspect, position or setting values of lens 212 are recorded so that the histogram information of each row of image data that is read out has associated lens position data indicating a position of lens 212 at the time at which the row information was collected. At step 2104, a transfer function for determining an in-focus lens setting may utilize row contrast information as summarized in histogram plots, as well as lens position data indicating a position of lens 212 associated with each set of row data.

Referring to further steps of process 400, image reader 100 at step 414 may control lens 212 to be in either continuous motion or in stepwise continuous motion. When controlled to be in continuous motion, lens 212 moves continuously throughout a time that sequentive rows of pixels of image sensor array module 182 are exposed and read out. When controlled to be in stepwise continuous motion, lens 212 repeatedly moves and stops throughout the time that rows of pixels of sensor module 182 are exposed and read out. In one embodiment of an image reader controlling lens 212 to be in stepwise continuous motion, image reader 100 continuously moves lens between two extreme points, a first, further field position and second, a nearer field position. In another embodiment of an image reader 100, controlling lens 212 to be in stepwise continuous motion, image reader 100 continuously moves lens 212 between two extreme positions and intermittently stops lens 212 at one or more positions between the extreme positions. A lens 212 controlled to be in stepwise continuous motion can be considered to have motion periods, i.e., the times during which the lens moves, and stop periods, i.e., the times during which the lens is temporarily idle. In one embodiment of the invention, the motion of the lens 212 and a reading out of image data from rows of pixels are coordinated. For example, the lens movement and control of image sensor array module 182 can be coordinated such that an exposure period for one or more rows of image sensor array module 182 occurs during a stop period of lens 212 so that lens 212 is idle during an entire row exposure period. Further, while processing of image data corresponding to pixels exposed during motion phases of lens 212 is useful in certain embodiments, image reader 100 can be configured so that image data corresponding to pixels exposed during motion periods of lens 212 are discarded, e.g., during row analysis step 424.

Figure 13:
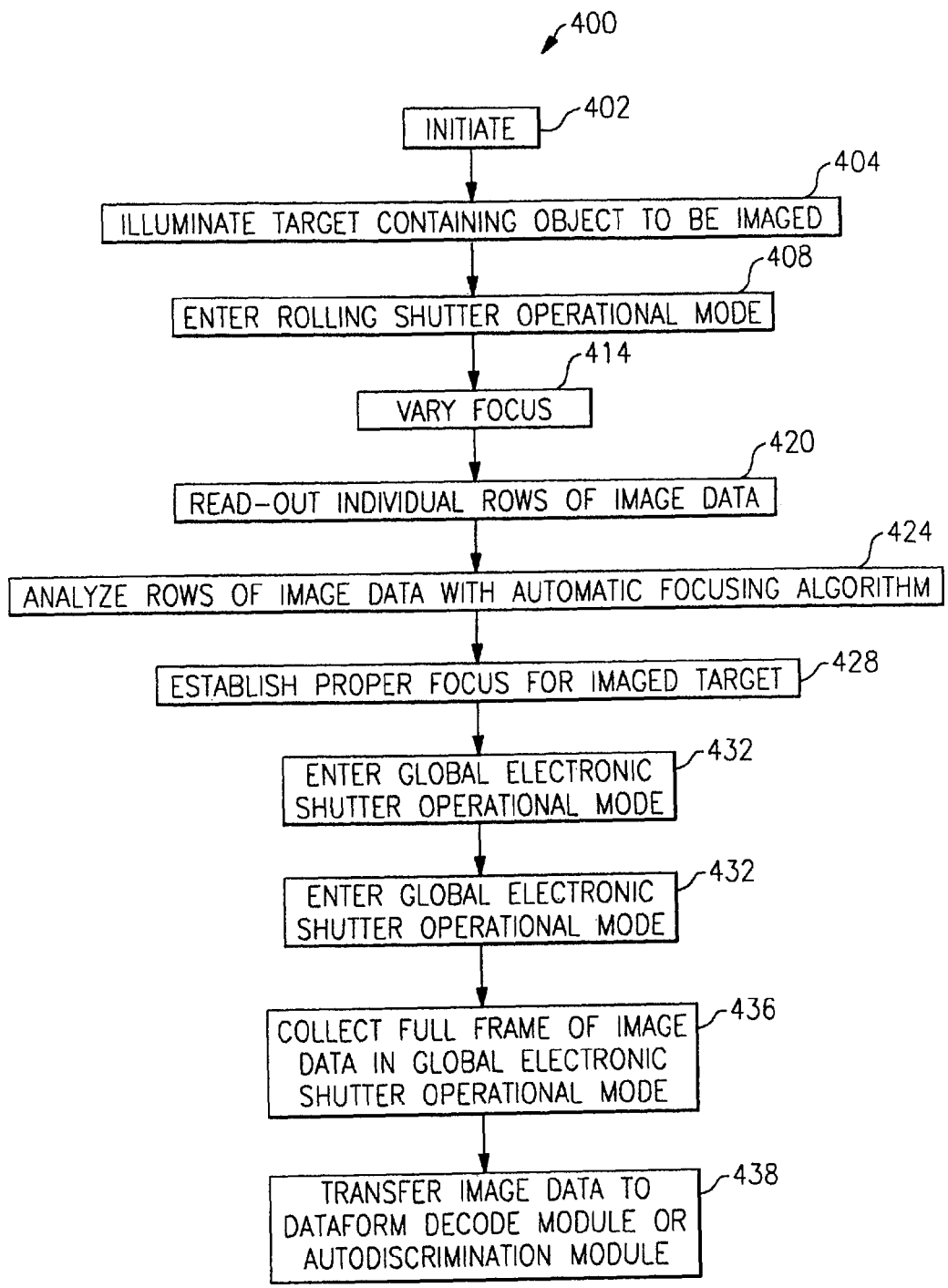
FIG. 13 is a flow chart illustrating one embodiment of a process for automatic focusing according to the principles of the invention.
Figure 24:
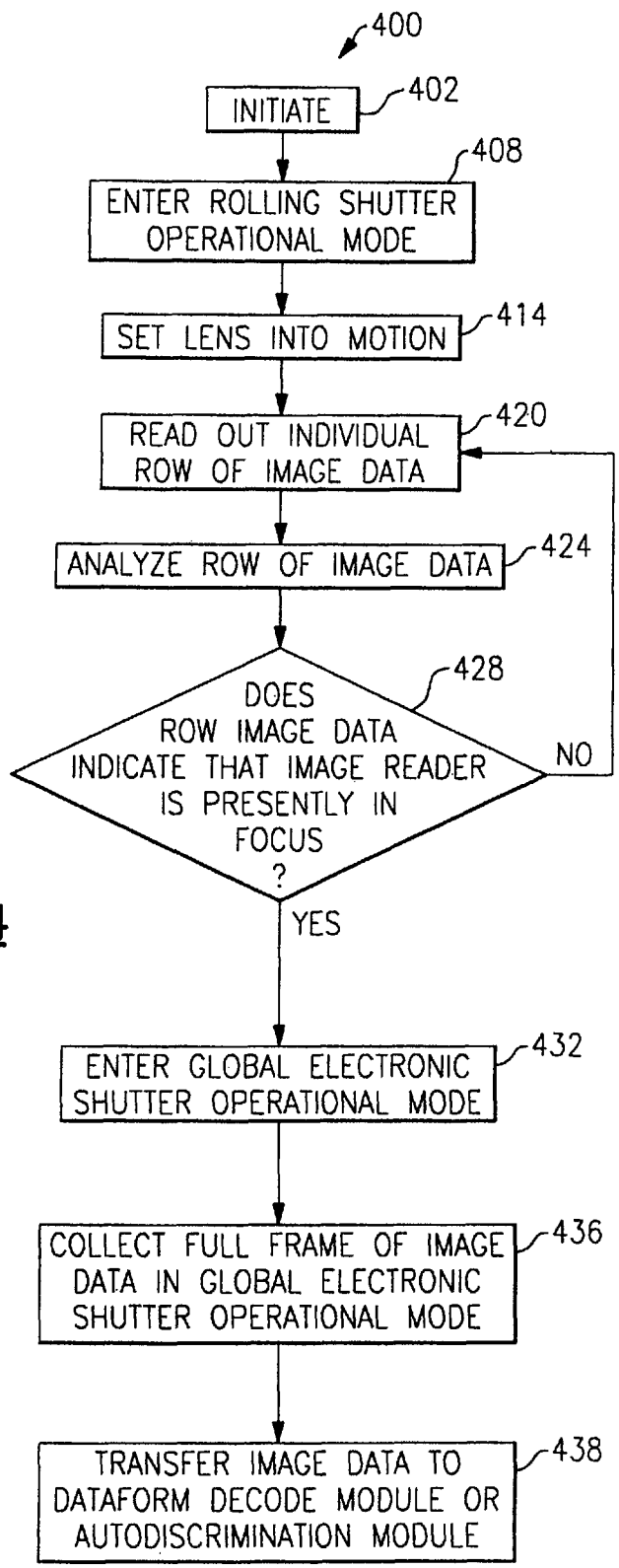

Specific embodiments of the process 400 generically described with reference to FIG. 13 are described with reference to the flow diagrams of FIGS. 23 and 24. In the embodiment of FIG. 23, image reader 100 at step 424 attempts to determine an in-focus lens setting based on collected row image data collected to that point. If at step 428a, image reader 100 determines that enough information has been collected to determine an in-focus position of lens 212, image reader 100 determines an in-focus setting for lens 212 and proceeds to step 428b to move lens 212 to the determined in-focus position. If sufficient information has not been collected, image reader 100 returns to step 432 to collect additional row information. Image reader 100 may continue to read and process row image data while moving lens 212 at step 428b, e.g., for purposes of confirming that the determined in-focus position is correct. When lens 212 has been moved to the determined in-focus position, image reader 100 proceeds to step 432 to enter a global electronic shutter operational mode of operation. At the time that image reader 100 enters the global shutter operating mode (step 432) image reader 100 may halt the motion of lens 212. The image reader then proceeds to step 436 to collect a full frame of image data, and then to step 438 to transfer image data to one of the dataform decode module 150 or autodiscriminating module 152.

In the embodiment of process 400 described with reference to FIG. 24, image reader 100 establishes an in-focus setting of lens 212 by assessing at step 424 present row data (the most recent collected row data) to determine whether the present row data indicates that image reader 100 is presently in-focus. If image reader 100 at step 428d determines that image reader 100 is presently not in focus, image reader 100 returns to step 420 to collect additional row information. If at step 420 image reader 100 determines that the reader is presently in an in-focus position, image reader 100 proceeds to step 432 to enter a global electronic shutter mode of operation. At the time that image reader 100 enters the global shutter operating mode, (step 432) image reader 100 may halt the motion of lens 212. The image reader 100 then proceeds to step 436 to collect a full frame of image data, and then to step 438 to transfer image data to one of the dataform decode module 150 or autodiscriminating module 152.

It will be understood with reference to process 400 or process 800 that image reader 100 in establishing an "in focus" position may designate a prospective or present position of lens 212 to be "in focus" on the basis of the prospective or present lens position rendering indicia in better focus that other available lens focus positions. Thus, where a lens focus position is not highly focused in a general sense, reader 100 may, nevertheless, designate the position as being "in focus" if it renders indicia more in focus than other available lens position. In one specific embodiment, lens 100 may be "toggled" between a limited number of discrete positions (e.g., two positions) when it is controlled to be in stepwise continuous motion. In such an embodiment, image reader 100 may designate one of the limited number of possible discrete positions to be the "in focus" positions if the lens position renders indicia more in focus than the remaining possible positions. Particularly in the configuration where lens 212 is "toggled" between a limited number of discrete positions, the focus determining steps may be omitted and the image data transferred directly to the decode module 150 or autodiscrimination module 152. Particularly when there are a limited number of alternate focus positions, the in-focus position can readily be discriminated based on which position the results in a successful decode. Discriminating an in-focus position by way of decode attempts may reduce average decode time.

In a variation of the invention, image reader 100 at step 420 reads out a predetermined number of rows of image data and analyzes the predetermined number of rows at step 424. The predetermined number of rows may be e.g., 2 rows, 3 rows, 10 rows or all of the rows (100+) rows of image sensor array 182. Image reader 100 at step 424 may select the best focused (e.g., highest contrast) row out of the plurality of rows and determine that the recorded focus setting associated with the best focused row is the "in-focus" setting of image reader 100. Alternatively, image reader 100 may calculate-in-focus setting data utilizing data image collected over several rows. When a focus setting has been determined, in any one of the above variations, image reader 100 may first enter global electronic shutter operational mode at step 432, and then move lens 212 into the determined focus position setting or else image reader 100 may alternatively move lens 212 to the determined lens setting prior to entering the global electronic shutter operational mode at step 432 or these two operations may occur at the same time.

In another embodiment of the automatic focusing operation, as described later in connection with FIGS. 25-30B, the global electronic shutter operational mode may be used during both the focusing period and the data collection period. According to process 800 as described herein, during the autofocusing period a limited, "windowed" frame of image data may be collected for each variation in the focus setting or position. For example, only the central region, or a central group of scan lines—such as the middle ten scan lines, of the image sensor is read out and analyzed by the focus determination algorithm. According to this embodiment, the limited frame of data provides adequate information for the focus determination algorithm while significantly decreasing the time required to collect the series of frames required to focus the image reader.

In alternative embodiments, the specific order of the steps in the process 400 or process 800 can be altered without departing from the inventive concepts contained therein. In various other embodiments, the circuitry implementing the rolling shutter operation and the circuitry implementing the global electronic shutter operation can be implemented on the same CMOS chip or one or both of the circuitry components can be implemented on separate dedicated chips. In an additional embodiment, the rolling shutter functionality and the global electronic shutter operation can be combined in a single module that includes hardware, software, and/or firmware.

In another embodiment of the image reader 100 that operates in either a rolling shutter or a global electronic shutter mode, the image reader 100 is able to dynamically shift between the global electronic shutter operational mode and the rolling shutter operational mode. In one such embodiment, the image reader 100 shifts from the default global electronic shutter operational mode to the rolling shutter operational mode when the integration time is shorter than a given threshold. Many commercially available imagers are implemented with light shields that allow some amount of light leakage into the storage element or with electronic switches that do not completely isolate the storage element from the photosensitive element. As a result of this, the contents of the storage element can be adversely influenced by the ambient illumination incident upon the imager after the charge has been transferred to the storage element. The following provides a numeric example of such operation.

In general, the shutter efficiency of a CMOS image sensor with global electronic shutter capabilities specifies the extent to which the storage area on the image sensor is able to shield stored image data. For example, if a shutter has an efficiency of 99.9%, then it takes an integration time (also known as exposure time) that is 1,000 times longer to generate the same amount of charge in the shielded portion as in the unshielded portion of the image sensor. Therefore, in an image capture cycle, the following equation provides an indication of the light irradiance on the imager from the ambient light that can be tolerated during the time period after the image is shifted into the storage region relative to the light irradiance on the imager from the object illuminated with the ambient illumination and the light sources 160 during the time period before the image is shifted into the storage region while not exceeding a desired degradation percentage. The equation can also address the case where the light incident upon the imager is the same during the entire imaging cycle. In both instances, one needs to know the minimum integration that can be used without the introduction of a maximum degradation.

$$(Amb.Irrad)*Tframe*(100\%-\%\ eff)=(Amb.Irrad+ Light\ Source\ Irrad)*Texposure*(\%\ deg)$$

In many instances the light on the imager is unchanged during the exposure period and during the remainder of the frame. In this situation the light irradiance on the imager is constant, and it is possible to solve for the minimum integration time that can be used without the light leakage excessively perturbing the desired image. Solving the equation in this case, allows the calculation of the minimum integration period for a specific degradation. The following constant irradiance numeric example is for a shutter efficiency of 99.9%, a frame rate of 20 ms, and a maximum tolerated degradation of 5%.

$$20\ ms*(100\%-99.9\%)=(Texposure*5\%)$$

or solving for the minimum exposure time that can be used without incurring a degration of more than 5%:

$$Texposure=0.4\ ms.$$

Thus if the integration time during image capture is shorter than 0.4 ms, then the degradation leakage (both optical or electrical) will cause an error to be introduced of 5% or greater.

Figure 14:
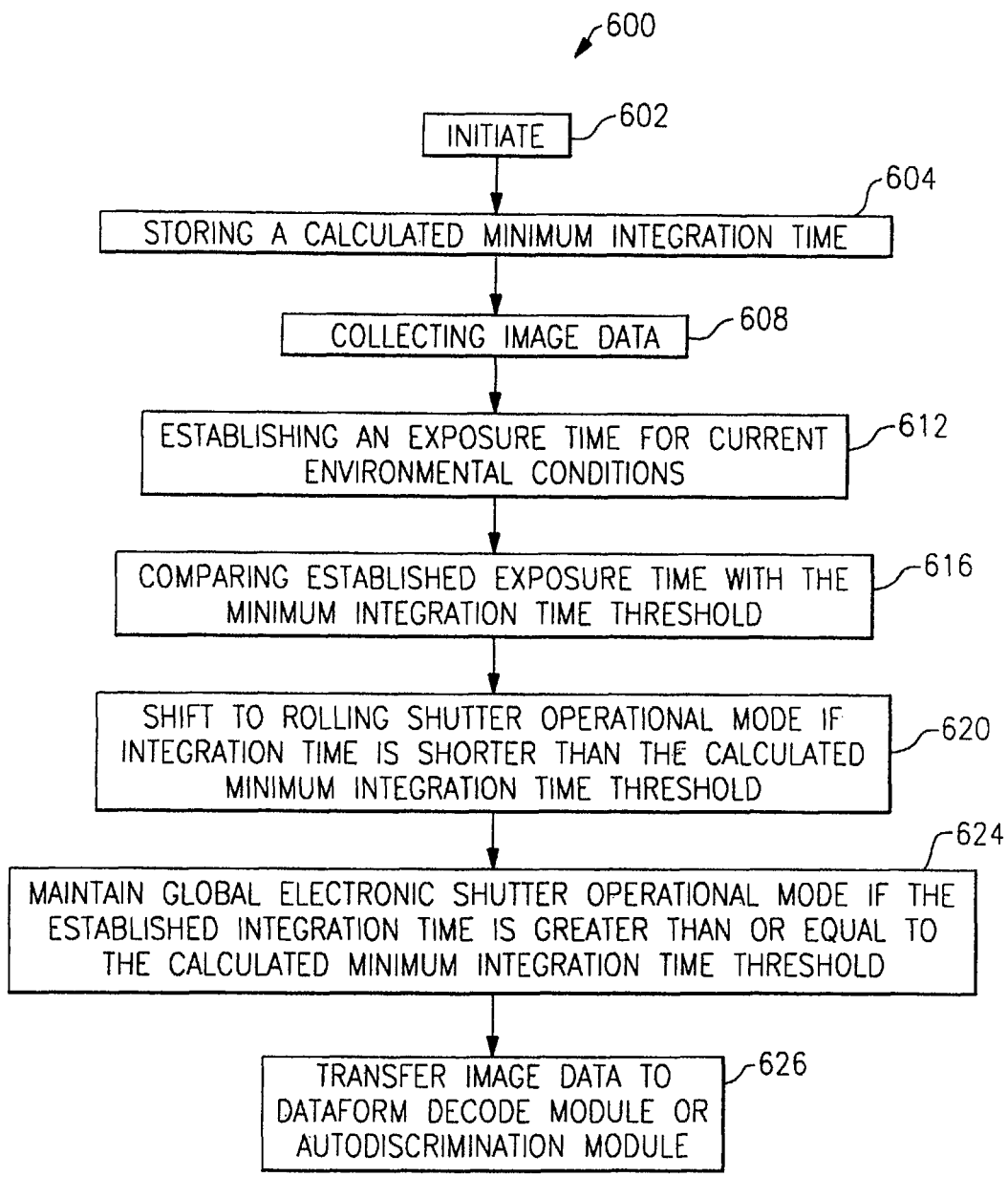
FIG. 14 is a flow chart illustrating one embodiment of a process for changing operational modes according to the principles of the invention.

In one embodiment that addresses image degradation introduced by excessive ambient light, the image reader 100 shifts to rolling shutter operation when the integration time becomes shorter than a level determined with respect to the frame rate, maximum allowable degradation and shutter efficiency of the image reader. A process 600 for shifting operational modes in response to short integration times is shown in FIG. 14. Actuation module 124 may generate a trigger signal to initiate process 600 in response to e.g., a depressing of a trigger 216 by operator or in response to an object being provided into a field of view of image reader 100. The process 600 includes storing (step 604) a calculated minimum integration time. In one embodiment, this threshold is determined in accordance with the equations presented above. Some of the inputs to these equations, such as the shutter efficiency, maximum acceptable image degradation leakage, and frame rate, can be configured in the image reader 100 as part of its initial setup or at a later time. The process 600 also includes collecting (step 608) image data. As part of the collection of image data, an exposure time for the current environmental conditions is established (step 612) by the sensor array control module 186. In various embodiments, this exposure time is established by the global electronic shutter control module 190, the optics module 178, or another appropriate module in the image reader 100. To determine whether the operational mode of the image reader 100 should shift from global shutter to rolling shutter, the established exposure time is compared (step 616) with the minimum integration time threshold. If the established integration time is shorter than the calculated minimum integration time threshold, then the operational mode of the image reader 100 is shifted (step 620) from global electronic shutter to rolling shutter. If the established integration time is greater than or equal to the calculated minimum integration time threshold, then the global electronic shutter operational mode (step 628) is maintained.

Further embodiments of the invention are described with reference to FIG. 15A, and the flow diagrams of FIGS. 31 and 32. As shown in FIG. 15A, image reader 100 can be configured to have user selectable configuration settings. For example, as shown in FIG. 15A, image reader 100 may present on display 504 a graphical user interface (GUI) menu option display screen 3170 which presents to an operator the user selectable configuration options of a rolling shutter operational mode and a global shutter operational mode. GUI display screens may be configured with tool kits associated with certain available operating systems such as WINDOWS CE, which may be installed on image reader 100. When reader 100 is configured to include a browser or is otherwise configured with suitable parsers and interpreters, GUI 3170 can be created using various open standard languages (e.g., HTML/JAVA, XML/JAVA). In the embodiment of FIG. 15A, GUI icon 3152 is a rolling shutter selection button and GUI icon 3154 is a global electronic shutter menu option. When icon 3152 is selected, image reader 100 is configured so that when image reader 100 receives a next trigger signal as described herein to initiate a decode attempt, image reader 100 collects image data utilizing a rolling shutter operating mode without utilizing the global electronic operational mode. When icon 3154 is selected, image reader 100 is configured so that when image reader 100 receives a next trigger signal to initiate a decode attempt, image reader 100 collects image data utilizing the global electronic shutter operational mode without utilizing the rolling shutter operational mode. GUI 3170 can be created to permit additional user selectable configuration options. In the embodiment of FIG. 15A, selection of button 3156 (which may be in text or icon form) configures image reader 100 so that process 300 is executed the next time a trigger signal is received. Selection of button 3158 configures image reader 100 so that process 400 is executed a next time a trigger signal is received. Selection of button 3160 configures image reader 100 so that process 600 is executed a next time a trigger signal is received. Selection of button 3162 configures image reader 100 so that process 800 is executed a next time a trigger signal is received. Selection of button 3164 configures image reader 100 so that image reader 100 is in "image capture" mode of operation such that a next time a trigger signal is received, image reader collects image data such as a 2D full frame of image data and outputs an image (e.g., to display 504 or a spaced apart device) without transferring the collected image data to module 150 or module 152. In shipping applications, it may be beneficial to capture images in an "image capture" mode corresponding to moving objects (e.g., a moving delivery vehicle, a package on an assembly line). Accordingly, it will be seen that execution of an image capture mode utilizing a global shutter operational mode of operation yields significant advantages, in that image distortion is reduced using a global shutter operational mode. The selection between a rolling shutter configuration and a global electronic shutter configuration or the configurations associated with buttons 3156, 3158, 3160, 3162, and 3164 can also be made with use of commands of a software development kit (SDK). A system can be created so that SDK-created commands (e.g., a "ROLLING SHUTTER" and a "GLOBAL SHUTTER" command) causing image reader 100 to be in one of a rolling shutter configuration and a global electronic shutter configuration can be selected at a host terminal spaced apart from image reader 100 and transmitted to image reader 100 to reconfigure reader 100.

Figure 31:
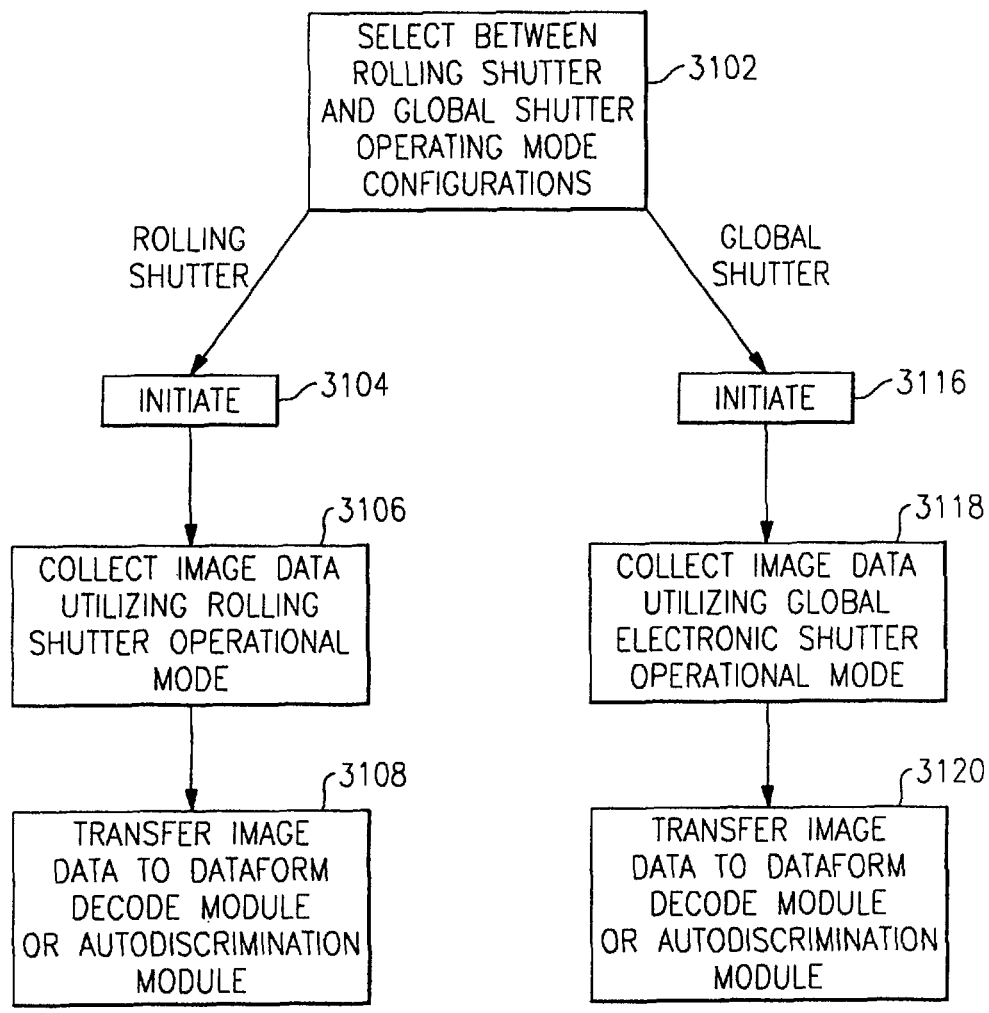
FIGS. 31 and 32 are flow diagrams illustrating additional processes which may be practiced in accordance with the invention.
Figure 32:
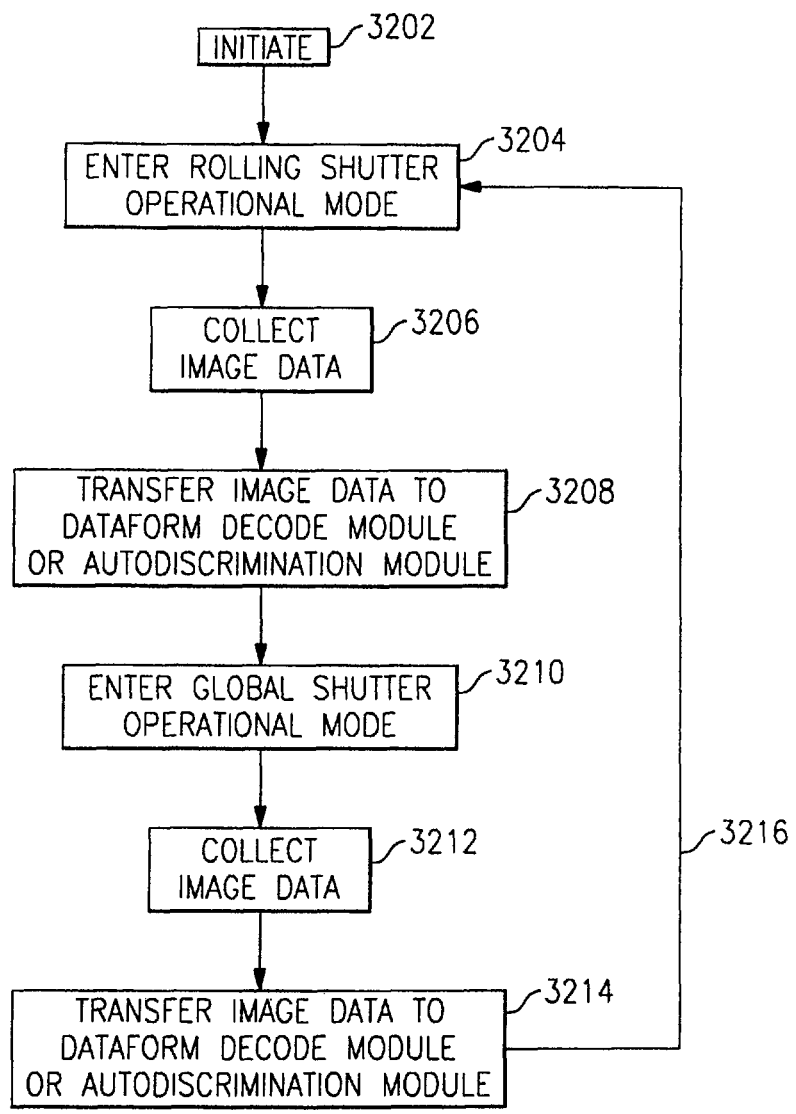

Referring to the flow diagram of FIG. 31, an operator selects between a rolling shutter configuration and a global electronic shutter configuration at step 3102. If an operator selects the rolling shutter configuration, image reader 100 proceeds to step 3104. At step 3104 image reader 100 is driven from an idle state to an active reading state by the generation of a trigger signal (e.g., by manual actuation of trigger 216 or another method) and then automatically executes steps 3106 and 3108. At step 3106 image reader 100 collects image data utilizing a rolling shutter operational mode and at step 3108 the image data collected at step 3106 is transferred to dataform decode module 150 or autodiscrimination module 152 to decode or otherwise process the image data. If at step 3102 a global electronic shutter mode is selected, image reader 100 proceeds to step 3118. At step 3118 image reader 100 is driven from an idle state to an active reading state by the generation of a trigger signal (e.g., by manual actuation of trigger 216 or another method) and then automatically executes steps 3118 and 3120. At step 3118 image reader 100 collects image data utilizing a global electronic shutter operational mode and at step 3122 the image data collected at step 3118 is transferred to dataform decode module 150 or autodiscrimination module 152 to decode or otherwise process the image data.

Another embodiment of the invention is described with reference to the flow diagram of FIG. 32. In the embodiment described with reference to the flow diagram of FIG. 32, image reader 100 is configured to collect image data and attempt to decode image data utilizing a rolling shutter operational mode and a global shutter operational mode. At step 3202 a trigger signal is generated as described herein (e.g., by manual actuation of trigger 216 or another method) to drive image reader 100 from an idle state to an active reading state and all of steps 3204, 3206 may be automatically executed thereafter. At step 3204 image reader 100 enters a rolling shutter operational mode. At step 3206 image reader 100 collects image data such as a full frame of image data or a windowed frame of image data utilizing the rolling shutter operational mode. At step 3208 image reader 100 transfers the image data collected at step 3206 to dataform decode module 150 and/or autodiscrimination module 152. Dataform decode module 150 or autodiscrimination module 152 may decode or otherwise process the image data collected and output a result (e.g., output a decoded bar code message to display 504 and or a spaced apart device). At step 3118 image reader 100 enters a global electronic shutter operational mode. At step 3212 image reader 100 collects image data utilizing the global electronic shutter operational mode. The image data collected at step 3212 may be full frame or a windowed frame image data. At step 3214 image reader 100 transfers the image data collected at step 3212 to dataform decode module 150 or autodiscrimination module 152. Dataform decode module 150 or autodiscrimination module 152 may decode or otherwise process the image data collected and output a result (e.g., output a decoded bar code message to display 540 and/or a spaced apart device). As indicated by control loop arrow 3216, image reader 100 may automatically repeat steps 3204, 3206, 3208, 3210, 3212, and 3214 until a stop condition is satisfied. A stop condition may be e.g., the generation of a trigger stop signal (as may be generated by the release of trigger 216) or the successful decoding a predetermined number of bar code symbols.

Another process according to the invention is described with reference to the flow diagram of FIG. 25. Process 800 is similar to process 400 in that it involves the processing of a limited amount of image data collected during a time that lens 212 is controlled to be in motion. With process 400 and with process 800 an in-focus position of lens 212 is quickly established. Whereas process 400 involves utilization of an image sensor array module 182 operated, at different times during the course of the process, in a first rolling shutter operational mode and a second, subsequently executed global electronic operational mode, process 800 may be implemented with use of one of the selectively addressable image sensor array modules described herein operated throughout the process in either one of a rolling shutter mode of operation or in a global electronic mode of operation.

With further reference to process 800, actuation module 124 at step 802 initiates process 800 by generating a trigger signal, e.g., in response to a depression of a trigger 216, a sensing of an object in a field of view of image reader or receipt of a command from a spaced apart device. At step 814 image reader 100 sets lens 212 into motion. At step 814 image reader 100 may control lens 212 to be in one of continuous motion or stepwise continuous motion.

Figure 28A:
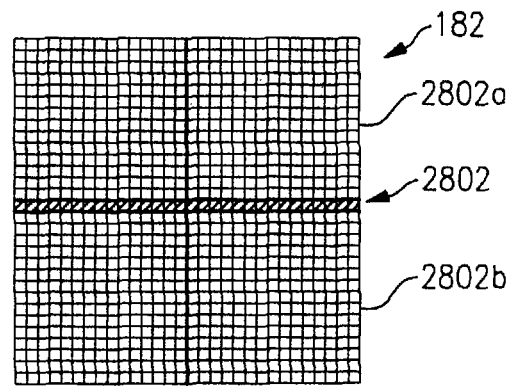
FIGS. 28A, 28B and 28C are representations of image sensor pixel array, wherein shaded regions indicate groups of positionally contiguous pixels that may be selectively addressed and read out when the image sensor array is operated in a windowed frame operating mode.
Figure 28B:
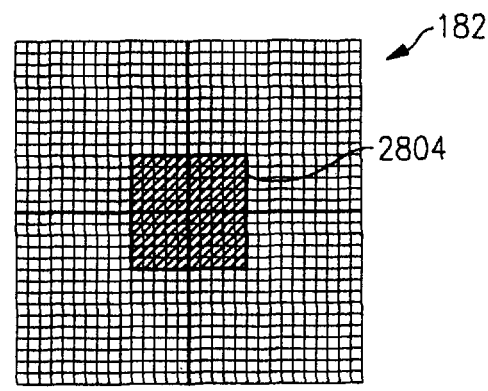
Figure 28C:
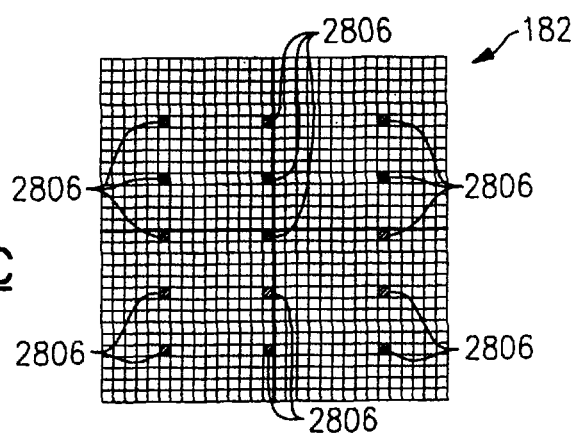

At step 820 image reader 100 reads out a "windowed frame" of image data from image sensor array module 182. CMOS image sensors can be operated in a windowed frame operating mode. In a windowed frame operating mode, image data corresponding to only a selectively addressed subset of all pixels of an image sensor array is read out. Examples of image reader 100 operating in windowed frame operating modes are described with reference to FIGS. 28A, 28B and 28C, wherein image sensor arrays are represented with each square of the grid representing a 10×10 block of pixels, and wherein shaded regions 2802, 2804, and 2806 represent pixels that are selectively addressed and selectively subjected to readout. In the embodiment of FIG. 28A, a windowed frame operating mode is illustrated wherein windowed image data is read out of image sensor array 182 by selectively addressing and reading out only centerline pattern of pixels consisting of a set of rows of pixels at a center of image sensor array module 182. Alternatively, in a windowed frame operating mode image reader 100 may selectively address and selectively read out image data from a single row of pixels of image sensor array module 182. Further, in a windowed frame operating mode, image reader 100 may selectively address, and selectively read out image data from rows 2802a and 2802b. In the embodiment of FIG. 28B, a windowed frame operating mode is illustrated wherein windowed image data is read out of image sensor array module 182 by selectively addressing and reading out only a collection of positionally contiguous pixels (i.e., a collection of pixels that are adjacent to one another) at a center of image sensor array module 182. In the embodiment of FIG. 28C, a windowed frame operating mode is illustrated wherein windowed image data is read out of image sensor array module 182 by selectively reading out spaced apart clusters of 10×10 blocks of positionally contiguous pixels. In all of the windowed frame operating modes described with reference to FIGS. 28A, 28B and 28C, image data corresponding to less than half of the pixels of the image sensor is selectively addressed and read out. When operating in a windowed frame operating mode image reader 100 may collect image data corresponding to light incident on pixels in one or more of the patterns illustrated in FIG. 28A, 28B or 28C or another pattern. Such collections of image data may include a collection of gray scale values and may be termed windowed frames of image data.

A windowed frame operating mode described herein is contrasted with an alternative operating mode in which a full frame of image data is stored into memory module 116, and then a portion of that full frame of image data is designated as a region of interest (i.e., a "sample" region) which is subject to further processing. In a windowed frame operating mode a frame of image data may collected in a fraction of the time required to collect a full frame of image data.

With further reference to process 800 image reader 100 at step 824 analyzes a windowed frame of image data to determine focus characteristics of image reader 100. The step of analyzing windowed frame image data to determine focus characteristics is further described with reference to the flow diagram of FIG. 29, and the histogram plots of FIG. 30A and FIG. 30B. At step 4102 image reader 100 may construct a histogram plot of pixel values of the present windowed frame of image data read out at step 820. FIG. 30A is a histogram plot of pixel values of a row of data corresponding to a bi-tonal image (such as in a bar code symbol on a monochrome substrate) that is acceptably focused. Histogram plot 4108 represents a high contrast image and includes numerous pixel values at the high end of the grey scale, numerous pixel values at the low end of the grey scale, and few pixel values at the center grey scale range. FIG. 30B is a histogram plot of pixel values of a windowed frame of image data corresponding to a poorly focused bi-tonal image. The image data summarized by histogram 4110 is "flatter," lower contrast image meaning that it has fewer pixel values at extremes of the grey scale and a larger number of pixel values at a center of the grey scale. Accordingly, it can be seen that a focus level of an image can readily be determined utilizing image contrast information.

At step 4104, image reader 100 assesses the collected histogram data. At block 4104 image reader 100 may either determine an appropriate in-focus setting for lens 212 or else determine whether the histogram data extracted from the present row of image data indicates that the image reader 100 is acceptably focused at the present lens position. Where image reader 100 at step 4104 determines a proper setting for lens 212 based on the collected histogram data, the histogram data may be from the present windowed frame of image data or based on a combination of present windowed frame of image data and preceding data of previously collected one or more frames of windowed image data. In a further aspect, position or setting values of lens 212 are recorded so that the histogram information of each row of image data that is read out and analyzed has associated lens position data indicating a position of lens 212 at the time at which the windowed frame of image data information was collected. At step 4104 a transfer function for determining an in-focus lens setting may utilize windowed frame contrast information as summarized in histogram plots, as well as lens position data indicating a position of lens 212 associated with each collected windowed frame of image data.

Referring to further steps of process 800, image reader 100 at step 814 may control lens 212 to be in either continuous motion or in stepwise continuous motion. When controlled to be in continuous motion, lens 212 moves continuously throughout a time that pixels corresponding to a windowed frame of image data are exposed and read out. When controlled to be in stepwise continuous motion, lens 212 repeatedly moves and stops throughout the time that pixels corresponding to a windowed frame of image data are exposed and read out. In one embodiment of an image reader 100 controlling lens 212 to be in stepwise continuous motion, image reader 100 continuously moves lens between two extreme points, a first further-field position and second, a nearer-field position. In another embodiment of an image reader 100 controlling lens 212 to be in stepwise continuous motion, image reader 100 continuously moves lens 212 between two extreme positions and intermittently stops lens 212 at one or more positions between the extreme positions. A lens 212 controlled to be stepwise continuous motion can be considered to have motion periods, i.e., the times during which the lens moves, and stop periods corresponding the time the lens is temporarily idle. In one embodiment of the invention, the motion of the lens 212 and a reading out of image data from rows of pixels are coordinated. For example, the stepwise movement of lens 212 and control of image sensor array module 182 can be coordinated such that a stop period of a lens in stepwise continuous motion occurs during an exposure period for exposing pixels corresponding to a windowed frame of image data and motion periods occur before and after such an exposure period. Further, while processing of image data corresponding to pixels exposed during motion periods of lens 212 is useful in certain embodiments, image reader 100 can be configured so that image data corresponding to pixels exposed during motion periods of lens 212 are discarded, e.g., during analysis step 824.

Figure 25:
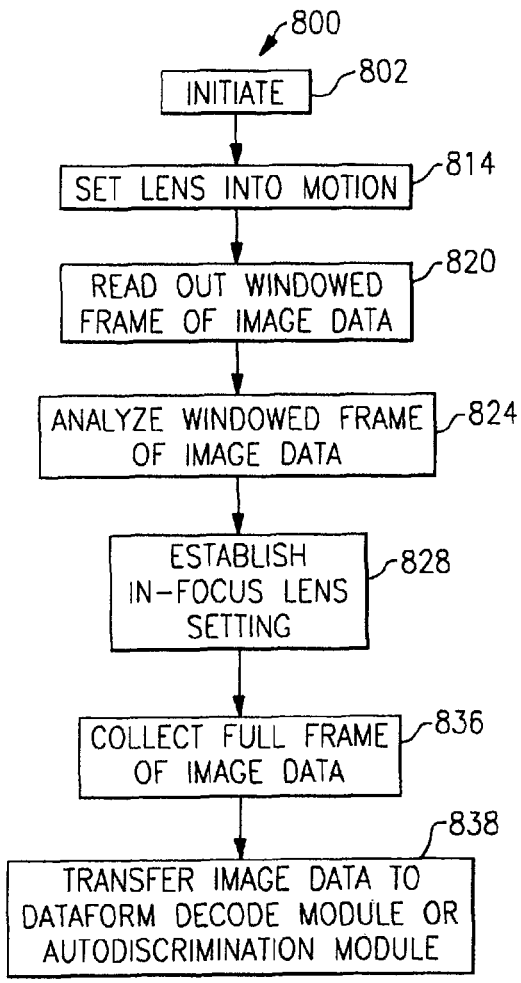
Figure 26:
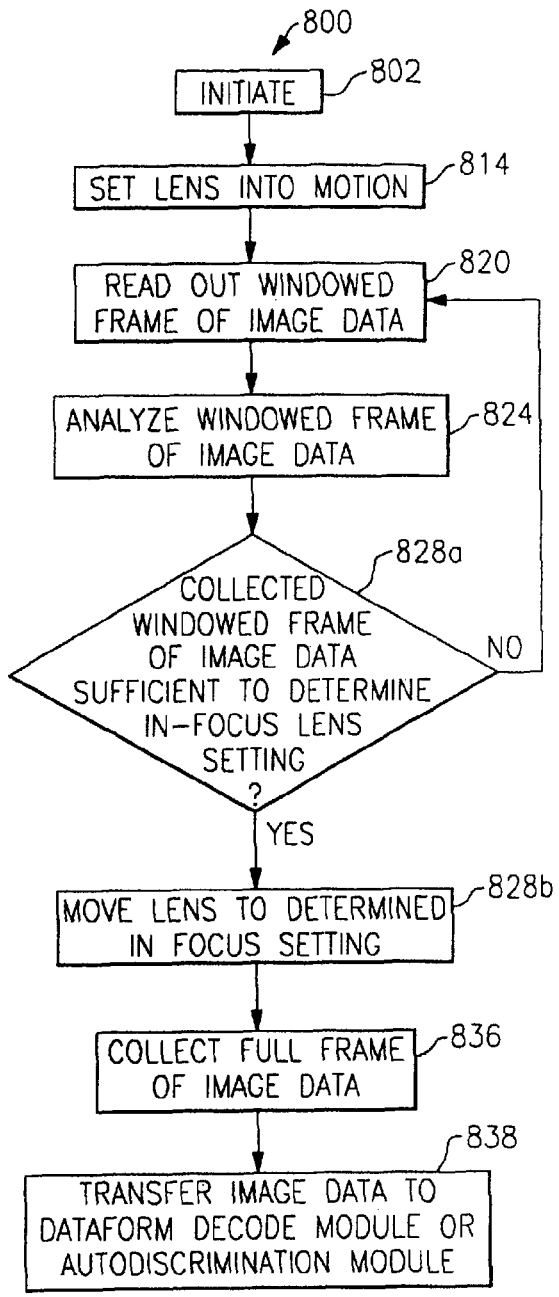
Figure 27:
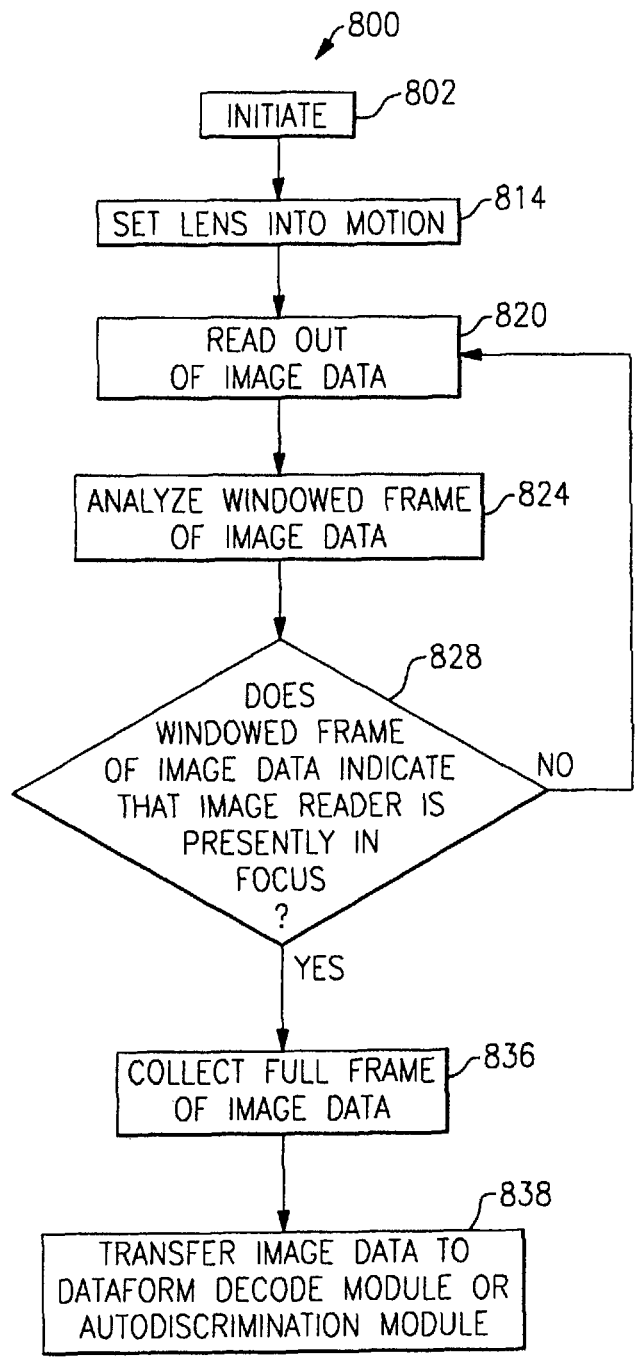

Specific embodiments of the process 800 generically described with reference to FIG. 25 are described with reference to the flow diagrams of FIGS. 26 and 27. In the embodiment of FIG. 26, image reader 100 at step 824 attempts to determine an in-focus setting based on collected windowed frame image data collected to that point. If at block 828a image reader 100 determines that enough information has been collected to determine an in-focus position of image reader 100, image reader 100 proceeds to step 828b to move the lens to the determined in-focus position. If sufficient information has not been collected, image reader returns to step 820 to collect additional windowed frame information. Image reader 100 may continue to read and process windowed frame image data while moving lens 212 at step 828b, e.g., for purposes of confirming that the determined in-focus position is correct. When lens 212 has been moved to the determined in-focus position image reader 100 proceeds to step 836 to collect a full frame of image data (e.g., in accordance with process 300), and then proceeds to step 838 to transfer the collected image data to one of dataform decode module 150 or autodiscriminating module 152.

In the embodiment of process 800 described with reference to FIG. 27, image reader 100 establishes an in-focus setting of lens 212 by assessing at step 824 present windowed frame image data (the most recent collected windowed frame data) to determine whether the present windowed frame image data indicates that image reader 100 is presently in-focus. If image reader 100 at step 828c determines that image reader 100 is presently not in focus, image reader 100 returns to step 820 to collect additional windowed frame information. If at step 828 image reader 100 determines that the reader is presently in an in-focus position, image reader 100 proceeds to step 836 to collect a full frame of image data, (e.g., in accordance with process 300), and then proceeds to step 838 to transfer the collected image data to one of dataform decode module 150 or autodiscriminating module 152.

In a variation of the invention, image reader 100 at step 820 may read out a predetermined number of windowed frames of image data, and at step 824 may analyze a predetermined number of windowed frames of image data. The windowed frames of image data may have the same pattern (e.g., always the pattern of FIG. 28A) or may have alternating patterns (e.g., first the pattern of FIG. 28A, next the pattern of FIG. 28B, and next the pattern of FIG. 28C). In another variation, image reader 100 may transfer each collected windowed frame of image data, subsequent to collection, to dataform decode module 150 and/or autodiscrimination module 152. At step 824, image reader 100 analyzes the predetermined number of frames of image data in order to determine an in-focus setting of image reader 100. In determining an in-focus setting, image reader 100 may select the in-focus setting associated with the best focused (highest contrast) windowed frame of image data out of the plurality of windowed frames of image data or else image reader 100 may calculate a focus setting utilizing image data from the plurality of windowed frames collected. In any of the variations of process 800, image reader 100 may collect a full frame of image data at step 836 after determining an in-focus setting of image reader 100 before or after moving lens 212 to the determined setting position to establish an in-focus setting.

It will be understood with reference to process 400 and process 800 that image reader 828 in establishing an "in focus" position may designate a prospective or present position of lens 212 to be "in focus" on the basis of the prospective or present lens position rendering target indicia in better focus than other available lens focus positions. Thus, where a lens focus position is not highly focused in a general sense reader 100 may, nevertheless, designate the position as being "in focus" if it renders target indicia more in focus than other available lens position. In one specific embodiment, lens 212 may be "toggled" between a limited number of discrete positions (e.g., two positions) when it is controlled to be in stepwise continuous motion. In such an embodiment, image reader 100 may designate one of the limited number of possible discrete positions to be the "in-focus" position if the lens position renders target indicia more in focus than the remaining possible positions. Particularly in the configuration where lens 212 is "toggled" between a limited number of discrete positions, the focus determining steps may be omitted and the image data transferred directly to the decode module 150 or autodiscrimination module 152. Particularly when there are a limited number of alternate focus positions, the in-focus position can readily be discriminated based on which position the results in a successful decode. Discriminating an in-focus position by way of decode attempts may reduce average decode time.

It is recognized that some available image sensor arrays have configurations or operation modes in which a limited number of edge columns/and or rows are not read out because of packaging concerns (e.g., edge pixels are covered by packaging material of the chip) or because of a configuration to a particular aspect ratio. Where image data from an image sensor is read out from all of the pixels of the image sensor or substantially all the pixels excluding a limited number of row and/or column edge pixels, such image data collecting is regarded herein as a collecting of a full frame of image data.

With reference to process 400 and process 800, it has been described that lens 212 can be controlled to be in one of continuous motion or stepwise continuous motion. It will be seen that when lens 212 is controlled to be in continuous motion, a focus setting of image reader 100 is controlled to vary over time. When lens 212 is controlled to be in stepwise continuous motion, a focus setting of lens 212 and, therefore, of image reader 100 is controlled to vary stepwise over time. Further, when lens 212 in accordance with process 400 or process 800 is in a motion period while being controlled to be in stepwise continuous motion, a focus setting of lens 212 is in a varying state. During a stop period of lens 212 while lens 212 is being controlled to be in stepwise continuous motion, a focus setting of image reader 100 is in a temporarily idle state.

Referring again to FIG. 1A, the following description provides additional details on modules in the image reader 100 presented above. In various embodiments, the control module 112 can include a central processing unit including on-chip fast accessible memory, application specific integrated circuits (ASICs) for performing specialized operations, as well as software, firmware and digitally encoded logic. The memory module 116 can comprise any one or more of read-only (ROM), random access (RAM) and non-volatile programmable memory for data storage. The ROM-based memory can be used to accommodate security data and image reader operating system instructions and code for other modules. The RAM-based memory can be used to facilitate temporary data storage during image reader operation. Non-volatile programmable memory may take various forms, erasable programmable ROM (EPROM) and electrically erasable programmable ROM (EEPROM) being typical. In some embodiments, non-volatile memory is used to ensure that the data is retained when the image reader 100 is in its quiescent or power-saving "sleep" state.

The I/O module 120 is used to establish potentially bi-directional communications between the image reader 100 and other electronic devices. Examples of elements that can comprise a portion of the I/O module 120 include a wireless or wired Ethernet interface, a dial-up or cable modem interface, a USB interface, a PCMCIA interface, a RS232 interface, an IBM Tailgate Interface RS485 interface, a PS/2 keyboard/mouse port, a specialized audio and/or video interface, a CompactFlash interface, a PC Card Standard interface, a Secure Digital standard for memory, a Secure Digital Input Output for input/output devices and/or any other standard or proprietary device interface. A CompactFlash interface is an interface designed in accordance with the CompactFlash standard as described in the CompactFlash Specification version 2.0 maintained at the website http://www.compactflash.org. The CompactFlash Specification version 2.0 document is herein incorporated by reference in its entirety. A PC Card Standard interface is an interface designed in accordance with the PC Card Standard as described by, for example, the PC Card Standard 8.0 Release—April 2001 maintained by the Personal Computer Memory Card International Association (PCMCIA) and available through the website at http://www.pcmcia.org. The PC Card Standard 8.0 Release—April 2001 Specification version 2.0 document is hereby herein incorporated by reference in its entirety.

The actuation module 124 is used to initiate the operation of various aspects of the image reader 100 such as data collection and processing in accordance with process 300, process 400, process 600 or process 800 as described herein. All of the steps of process 300, process 400, process 600 and process 800 may be automatically executed in response to an initiation of the respective process by actuation module 124. Image reader 100 may be configured so that the steps of process 300, process 400, process 600, and process 800 continue automatically when initiated until a stop condition is satisfied. A stop condition may be e.g., the generation of a trigger stop signal (as may be generated by the release of trigger 216) or the successful decoding a predetermined number of bar code symbols. In the hand held image reader 100*a* discussed above, the actuation module comprises the trigger 216 which, when depressed, generates a trigger signal received by control module 112 which, in turn, sends control signals to appropriate other modules of image reader 100. In one embodiment of a fixed mounted embodiment of the image reader 100, the actuation module 124 comprises an object sensing module that generates a trigger signal to initiate the operation of the image reader 100 when the presence of an object to be imaged is detected. When a trigger signal is generated, image reader 100 is driven from an idle state to an active reading state. Actuation module 124 may also generate a trigger signal in response to receipt of a command from a local or remote spaced apart device.

The user feedback module 128 is used to provide sensory feedback to an operator. In various embodiments, the feedback can include an auditory signal such as a beep alert, a visual display such as an LED flashing indicator, a mechanical sensation such as vibration in the image reader 100, or any other sensory feedback capable of indicating to an operator the status of operation of the image reader 100 such as a successful image capture.

The display module 132 is used to provide visual information to an operator such as the operational status of the image reader 100 including, for example, a remaining battery and/or memory capacity, a mode of operation, and/or other operational or functional details. In various embodiments, the display module 132 can be provided by a LCD flat panel display with an optional touch-pad screen overlay for receiving operator tactile input coordinated with the display.

The user interface module 134 is used to provide an interface mechanism for communication between an operator and the image reader 100. In various embodiments, the user interface module 134 comprises a keypad, function specific or programmable buttons, a joystick or toggle switch and the like. If the display module 132 includes a touch-pad screen overlay as mentioned above, the display module can incorporate some of the input functionality alternatively provided by elements in the user interface module 134.

In some embodiments, the RFID module 136 is an ISO/IEC 14443 compliant RFID interrogator and reader that can interrogate a RFID contactless device and that can recover the response that a RFID tag emits. The International Organization for Standardization (ISO) and the International Electrotechnical Commission (IEC) are bodies that define the specialized system for worldwide standardization. In other embodiments, the RFID module 136 operates in accordance with ISO/IEC 10536 or ISO/IEC 15963. Contactless Card Standards promulgated by ISO/IEC cover a variety of types as embodied in ISO/IEC 10536 (Close coupled cards), ISO/IEC 14443 (Proximity cards), and ISO/IEC 15693 (Vicinity cards). These are intended for operation when very near, nearby and at a longer distance from associated coupling devices, respectively. In some embodiments, the RFID module 136 is configured to read tags that comprise information recorded in accordance with the Electronic Product Code (EPC), a code format proposed by the Auto-ID Center at MIT. In some embodiments, the RFID module 136 operates according to a proprietary protocol. In some embodiments, the RFID module 136 communicates at least a portion of the information received from an interrogated RFID tag to a computer processor that uses the information to access or retrieve data stored on a server accessible via the Internet. In some embodiments, the information is a serial number of the RFID tag or of the object associated with the RFID tag.

In some embodiments, the smart card module 140 is an ISO/IEC 7816 compliant smart card reader with electrical contact for establishing communication with a suitably designed contact chip based smart card. The smart card module 140 is able to read and in some cases write data to attached smart cards.

In some embodiments, the magnetic stripe card module 144 is a magnetic stripe reader capable of reading objects such as cards carrying information encoded in magnetic format on one or more tracks, for example, the tracks used on credit cards. In other embodiments, the magnetic stripe card module 144 is a magnetic character reading device, for reading characters printed using magnetic ink, such as is found on bank checks to indicate an American Bankers Association routing number, an account number, a check sequence number, and a draft amount. In some embodiments, both types of magnetic reading devices are provided.

In some embodiments of the image reader 100, the functionality of the RFID module 136, the smart card module 140, and the magnetic stripe card module 144 are combined in a single tribrid reader module such as the Panasonic's Integrated Smart Card Reader model number ZU-9A36CF4 available from the Matsushita Electrical Industrial Company, Ltd. The ZU-9A36CF4 is described in more detail in the Panasonic Specification number MIS-DG60C194 entitled, "Manual Insertion Type Integrated Smart Reader" dated March 2004 (revision 1.00). This document is hereby herein incorporated by reference in its entirety.

The decoder module 150 is used to decode target data such as one and two-dimensional bar codes such as UPC/EAN, Code 11, Code 39, Code 128, Codabar, Interleaved 2 of 5, MSI, PDF417, MicroPDF417, Code 16K, Code 49, Maxi-Code, Aztec, Aztec Mesa, Data Matrix, Qcode, QR Code, UCC Composite, Snowflake, Vericode, Dataglyphs, RSS, BC 412, Code 93, Codablock, Postnet (US), BPO4 State, Canadian 4 State, Japanese Post, KIX (Dutch Post), Planet Code, OCR A, OCR B, and the like. In some embodiments, the decoder module also includes autodiscrimination functionality that allows it to automatically discriminate between a plurality of bar code such as those listed above. Certain functionality of the decoder 150, such as the measurement of characteristics of decodable indicia, is described in the related U.S. Applications No. 10/982,393, filed Nov. 5, 2004, entitled "Device and System for Verifying Quality of Bar Codes." This application is hereby herein incorporated by reference in its entirety.

Another example of an image reader 100 constructed in accordance with the principles of the invention is the portable data terminal 100*b* shown in different perspective drawings in FIGS. 15A, 15B, and 15C. FIG. 15A shows a top perspective, FIG. 15B shows a front perspective view, and FIG. 15C shows a back perspective view. As shown, the portable data terminal 100*b* in one embodiment includes interface elements including a display 504, a keyboard 508, interface buttons 512 for example for positioning a cursor, a trigger 216, and a stylus 520 with a stylus holder 524 (not shown). The portable data terminal 100*b* further includes a lens 212*b* and light sources 160*b*. In additional embodiments, the portable data terminal can have its functionality enhanced with the addition of multiple detachable computer peripherals. In various embodiments, the computer peripherals can include one or more of a magnetic stripe reader, a biometric reader such as a finger print scanner, a printer such as a receipt printer, a RFID tag or RF payment reader, a smart card reader, and the like. In various embodiments, the portable data terminal 100*b* can be a Dolphin 7200, 7300, 7400, 7900, or 9500 Series Mobile Computer available from Hand Held Products, Inc., of 700 Visions Drive, Skaneateles Falls, N.Y. and constructed in accordance with the invention. Various details of a hand held computer device, in particular the device's housing, are described in more detail in the related U.S. application Ser. No. 10/938,416, filed Sep. 10, 2004, entitled "Hand Held Computer Device." This application is hereby herein incorporated by reference in its entirety.

The portable data terminal 100*b* further includes an electro-mechanical interface 532 such as a dial-up or cable modem interface, a USB interface, a PCMCIA interface, an Ethernet interface, a RS232 interface, an IBM Tailgate Interface RS485 interface, a CompactFlash interface, a PC Card Standard interface, a Secure Digital standard for memory interface, a Secure Digital Input Output for input/output devices interface and/or any other appropriate standard or proprietary device interface. In various embodiments, the electro-mechanical interface 532 can be used as part of attaching computer peripherals.

Figure 16:
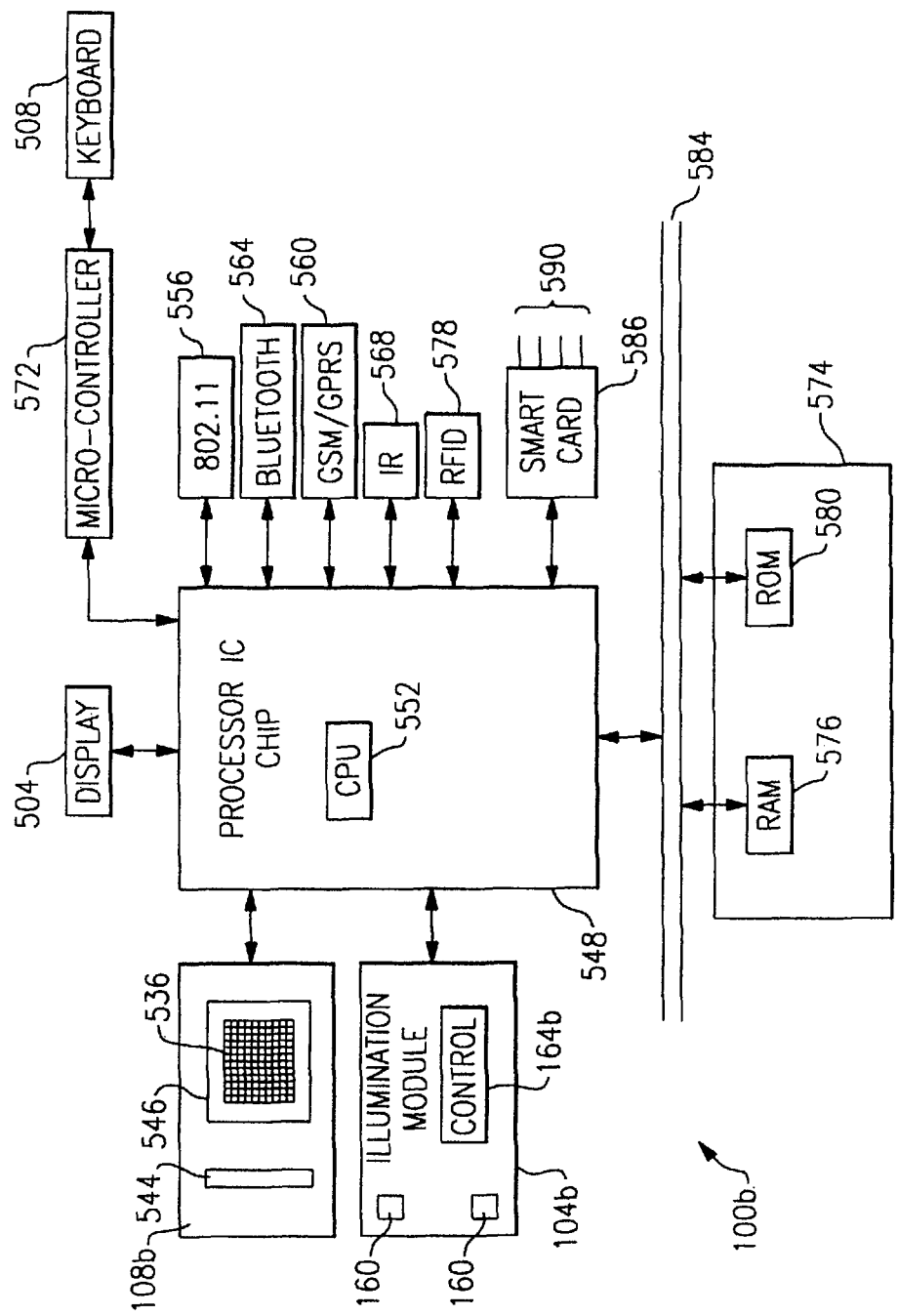
FIG. 16 is an electrical block diagram of one embodiment of the portable data terminal image reader of FIGS. 15A, 15B, and 15C.

An electrical block diagram of one embodiment of the portable data terminal 100*b* is shown in FIG. 16. In the embodiment of FIG. 16, an image collection module 108*b* includes an image engine including two-dimensional image sensor 536 provided on image sensor chip 546 and associated imaging optics 544. The associated imaging optics 544 includes the lens 212*b* (not shown). Image sensor chip 546 may be provided in an IT4000 or IT4200 image engine of the type available from Hand Held Products, Inc. of Skaneateles Falls, N.Y. constructed in accordance with the invention and may be a suitable commercially available chip such as the Kodak KAC-0311 or the Micron MT9V022 image sensor array described above. The portable data terminal 100*b* also includes an illumination module 104*b* including the light sources 160*b* and an illumination control module 164*b*. These illumination modules are also an integral part of the IT4000 and IT4200 image engines referenced above. The portable data terminal 100*b* further includes a processor integrated circuit (IC) chip 548 such as may be provided by, for example, an INTEL Strong ARM RISC processor or an INTEL PXA255 Processor. Processor IC chip 548 includes a central processing unit (CPU) 552. For capturing images, the processor IC chip 548 sends appropriate control and timing signals to image sensor chip 546, as described above. The processor IC chip 548 further manages the transfer of image data generated by the chip 546 into RAM 576. Processor IC chip 548 may be configured to partially or entirely carry out the functions of one or more of the modules, e.g., modules 104, 108, 112, 116, 120, 124, 128, 132, 134, 136, 140, 144, 150, 152, 165, 168 as described in connection with FIG. 1A.

As indicated above, the portable data terminal 100*b* may include a display 504, such as a liquid crystal display, a keyboard 508, a plurality of communication or radio transceivers such as a 802.11 radio communication link 556, a Global System for Mobile Communications/General Packet Radio Service (GSM/GPRS) radio communication link 560, and/or a Bluetooth radio communication link 564. In additional embodiments, the portable data terminal 100*b* may also have the capacity to transmit information such as voice or data communications via Code Division Multiple Access (CDMA), Cellular Digital Packet Data (CDPD), Mobitex cellular phone and data networks and network components. In other embodiments, the portable data terminal 100*b* can transmit information using a DataTAC™ network or a wireless dial-up connection.

The portable data terminal 100*b* may further include an infrared (IR) communication link 568. The keyboard 508 may communicate with IC chip 548 via microcontroller chip 572. The portable data terminal 110*b* may further include RFID circuitry 578 as described above for reading or writing data to a RFID tag or token and smart card circuitry 586 including electrical contacts 590 for establishing electrical communication with a smart card such as a circuitry enabled credit card. The portable data terminal 100*b* further includes a memory 574 including a volatile memory and a non-volatile memory. The volatile memory in one embodiment is provided in part by the RAM 576. The non-volatile memory may be provided in part by flash ROM 580. Processor IC chip 548 is in communication with the RAM 576 and ROM 580 via a system bus 584. Processor IC chip 548 and microcontroller chip 572 also include areas of volatile and non-volatile memory. In various embodiments where at least some of the modules discussed above, such as the elements in the control module 112, are implemented at least in part in software, the software components can be stored in the non-volatile memories such as the ROM 580. In one embodiment, the processor IC chip 548 includes a control circuit that itself employs the CPU 552 and memory 574. Non-volatile areas of the memory 574 can be used, for example, to store program operating instructions.

In various embodiments, the processor IC chip 548 may include a number of I/O interfaces (not all shown in FIG. 16) including several serial interfaces (e.g., general purpose, Ethernet, blue tooth), and parallel interfaces (e.g., PCMCIA, Compact Flash).

In one embodiment, the processor IC chip 548 processes frames of image data to, for example, decode a one or two-dimensional bar code or a set of OCR characters. Various bar code and/or OCR decoding algorithms are commercially available, such as by the incorporation of an IT4250 image engine with decoder board, available from Hand Held Products, Inc. In one embodiment, the decoder board decodes symbologies such as UPC/EAN, Code 11, Code 39, Code 128, Codabar, Interleaved 2 of 5, MSI, PDF417, MicroPDF417, Code 16K, Code 49, MaxiCode, Aztec, Aztec Mesa, Data Matrix, Qcode, QR Code, UCC Composite, Snowflake, Vericode, Dataglyphs, RSS, BC 412, Code 93, Codablock, Postnet (US), BPO4 State, Canadian 4 State, Japanese Post, KIX (Dutch Post), Planet Code, OCR A, OCR B, and the like.

Among other operations, the infrared transceiver 568 facilitates infrared copying of data from a portable data terminal 100b in a broadcasting mode to a portable data terminal 100b in a receiving mode. Utilization of infrared transceiver 568 during a data copying session allows data broadcast from a single broadcast device to be simultaneously received by several receiving devices without any of the receiving devices being physically connected to the broadcasting device.

In an additional further embodiment, the image reader 100 can be contained in a transaction terminal such as the Transaction Terminal Image Kiosk 8870 available from Hand Held Products, Inc., of 700 Visions Drive, Skaneateles Falls, N.Y. and constructed in accordance with the invention. In a further embodiment, the image reader 100 can be contained in a fixed mount system such as the IMAGETEAM 3800E linear image engine or the IMAGETEAM 4710 two-dimensional reader available from Hand Held Products, Inc. of 700 Visions Drive, Skaneateles Falls, N.Y.

In various embodiments, the modules discussed above including the illumination module 104, the image collection module 108, the control module 112, the memory module 116, the I/O module 120, the actuation module 124, the user feedback module 128, the display module 132, the user interface module 134, the RFID module 136, the smart card module 140, the magnetic stripe card module 144, the decoder module 150, the illumination control module 164, the power module 168, the interface module 172, the optics module 178, the sensor array module 182, the sensor array control module 186, the global electronic shutter control module 190, the row and column address and decode module 194, and the read out module 198, the rolling shutter control module 202, and the auto-focusing module can be implemented in different combinations of software, firmware, and/or hardware.

Machine readable storage media that can be used in the invention include electronic, magnetic and/or optical storage media, such as magnetic floppy disks and hard disks, a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two-dimensional bar codes.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope and spirit of the following claims.

We claim:
1. An image reader comprising:
an integrated circuit including at least an image sensor array, the image sensor array providing a signal;
a rolling shutter control module configured to sequentially expose a plurality of lines of pixels in the image sensor array;
a global electronic shutter control module configured to simultaneously expose the plurality of lines of pixels in the image sensor array,
wherein the image reader is configured to identify a data type represented in collected image data;
wherein the image reader is operative in rolling shutter configuration in which the rolling shutter control module is active, and wherein the image reader is operative in a global electronic shutter configuration in which the global shutter control module is active;
wherein the image reader is characterized by one or more of (a) each of the rolling shutter configuration and the global electronic shutter configuration is operator selectable, (b) each of the rolling shutter configuration and the global electronic shutter configuration is operator selectable with use of a user interface of the image reader and (c) each of the rolling shutter configuration and the global electronic shutter configuration is selectable using a command received from a host external from image reader.

2. The image reader of claim 1, wherein each of the rolling shutter configuration and the global electronic shutter configuration is operator selectable with use of a user interface of the image reader.

3. The image reader of claim 2, wherein the image reader includes a display, and wherein the user interface is a graphical user interface.

4. The image reader of claim 2, wherein the image reader includes a display, and wherein the user interface is a graphical user interface having a first displayed menu option for selection of the rolling shutter configuration and a second displayed menu option for selection of the global electronic shutter configuration.

5. The image reader of claim 1, wherein each of the rolling shutter configuration and the global electronic shutter configuration is selectable using a command received from a host external from bar code reading device.

6. The image reader of claim 1, wherein the image reader is configurable using a software development kit having a command for selection of the rolling shutter configuration and a command for selection of the of the global shutter configuration.

7. The image reader of claim 1, wherein the image reader is configured to be hand held.

8. The image reader of claim 7, wherein each of the rolling shutter configuration and the global electronic shutter configuration is operator selectable with use of a user interface of the image reader.

9. The image reader of claim 8, wherein the image reader includes a display, and wherein the user interface is a graphical user interface.

10. The image reader of claim 8, wherein the image reader includes a display, and wherein the user interface is a graphical user interface having a first displayed menu option for selection of the rolling shutter configuration and a second displayed menu option for selection of the global electronic shutter configuration.

11. The image reader of claim 7, wherein each of the rolling shutter configuration and the global electronic shutter configuration is selectable using a command received from a host external from bar code reading device.

12. The image reader of claim 7, wherein the image reader is configurable using a software development kit having a command for selection of the rolling shutter configuration and a command for selection of the of the global shutter configuration.

13. The image reader of claim 1, wherein the image reader is operative to identify a data type selected from the group consisting of a signature, a barcode symbol, handwritten text, typed text, machine readable text, OCR data, a graphic, a picture, a form, an ID card, and a biometric.

14. The image reader of claim 1, wherein the image reader is operative to identify a data type selected from the group consisting of a signature, a barcode symbol, handwritten text, typed text, and machine readable text.

\* \* \* \* \*